US007295717B2

(12) United States Patent
Hersch et al.

(10) Patent No.: US 7,295,717 B2
(45) Date of Patent: Nov. 13, 2007

(54) SYNTHESIS OF SUPERPOSITION IMAGES FOR WATCHES, VALUABLE ARTICLES AND PUBLICITY

(75) Inventors: Roger D. Hersch, Epalinges (CH); Sylvain Chosson, Ecublens (CH); Ran Seri, Aix en Provence (FR); Pascal Fehr, Brent (CH)

(73) Assignee: Ecole polytechnique fédérale de Lausanne (EPFL), Lausanne (CH)

( * ) Notice: Subject to any disclaimer, the term of this patent is extended or adjusted under 35 U.S.C. 154(b) by 0 days.

(21) Appl. No.: 11/589,240

(22) Filed: Oct. 30, 2006

(65) Prior Publication Data

US 2007/0041611 A1 Feb. 22, 2007

Related U.S. Application Data

(63) Continuation-in-part of application No. 11/349,992, filed on Feb. 9, 2006, said application No. 11/589,240 is a continuation-in-part of application No. 11/149,017, filed on Jun. 10, 2005, which is a continuation-in-part of application No. 10/879,218, filed on Jun. 30, 2004, which is a continuation-in-part of application No. 10/270,546, filed on Oct. 16, 2002, now Pat. No. 7,194,105.

(51) Int. Cl.
*G06K 9/36* (2006.01)

(52) U.S. Cl. ........................................ 382/276; 283/94

(58) Field of Classification Search ................ 382/276, 382/279, 100; 380/51, 54; 283/17, 57, 72, 283/73, 93, 94, 902; 359/84, 87; 356/605, 356/606, 618; 358/533; 705/50
See application file for complete search history.

(56) References Cited

U.S. PATENT DOCUMENTS 3,321,905 A 5/1967 Krebs (Continued)

OTHER PUBLICATIONS

United Kingdom Patent No. 1,138,011, Dec. 1968, Improvements in printed matter for the purpose of rendering counterfeiting more difficult.

(Continued)

*Primary Examiner*—Samir Ahmed
*Assistant Examiner*—Abolfazl Tabatabai

(57) ABSTRACT

The present invention aims at synthesizing superposition images formed either by band moire shapes or by shape level lines for making the information forwarded by valuable articles or by time pieces such as watches and clocks more dynamic, as well as for improving their attractiveness and aesthetics. A further application is publicity. For synthesizing band moiré images, the present invention relies on a band moiré image layout model allowing to obtain the layout of the base the band grating, given the layouts of the band moire image and of the revealing line grating. Base and revealing layer layouts may be conceived to create band moiré image shapes whose patterns move e.g. radially, circularly, or according to a spiral trajectory. Shape level lines occur in a superposition image when e.g. a base layer comprising modified sets of lines is superposed with a revealing layer comprising a line grating. Such a base layer embeds a shape elevation profile generated from an initial motif shape image (e.g. typographic characters, words of text, symbols, logo, ornament). By moving the revealing layer in superposition with the base layer, shape level lines move dynamically between the initial motif shape boundaries and shape foreground centers, respectively shape background centers, thereby growing and shrinking. The movement of the shape level lines creates visually attractive pulsing motif shapes, e.g. a pulsing heart or pulsing text. Categories of embodiments comprise (1) visually attractive articles having moving parts (watches, clocks, vehicles, publicity display devices, fashion clothes), (2) articles such as cosmetics, drugs, perfumes and wines, where one part is moved in respect to a second part, e.g. bottles having a lid or labels composed of two layers, (3) articles where the base layer and the revealing line grating are separated by a gap and form a fixed composed layer, and (4) articles where at least one of the layers is an electronic display.

30 Claims, 64 Drawing Sheets

U.S. PATENT DOCUMENTS

| | | | | |
|---|---|---|---|---|
| 3,890,777 | A | | 6/1975 | Stanish |
| 4,653,930 | A | | 3/1987 | Schmid |
| 4,761,253 | A | | 8/1988 | Antes |
| 5,396,559 | A | * | 3/1995 | McGrew ..................... 380/54 |
| 5,694,229 | A | | 12/1997 | Drinkwater et al. |
| 5,708,717 | A | | 1/1998 | Alasia |
| 5,712,731 | A | | 1/1998 | Drinkwater et al. |
| 5,790,703 | A | * | 8/1998 | Wang ....................... 358/3.28 |
| 5,995,638 | A | * | 11/1999 | Amidror et al. ........... 382/100 |
| 5,999,280 | A | | 12/1999 | Huang |
| 6,249,588 | B1 | | 6/2001 | Amidror et al. |
| 6,273,473 | B1 | | 8/2001 | Taylor et al. |
| 6,494,491 | B1 | | 12/2002 | Zeiter et al. |
| 6,819,775 | B2 | | 11/2004 | Amidror et al. |
| 7,054,038 | B1 | | 5/2006 | Ostromoukhov et al. |

OTHER PUBLICATIONS

U.S. Appl. No. 10/270,546 (Hersch, Chosson), Authentication of documents and articles by moiré patterns, filed Oct. 16, 2002.

U.S. Appl. No. 10/879,218 (Hersch, Chosson), Model-based synthesis of band moire images for authenticating security documents and valuable articles, filed Jun. 30, 2004.

U.S. Appl. No. 10/995,859 (Steenblik, Hurt, Jordan).

U.S. Appl. No. 09/810,971 (Huang, Wu), Optical watermark , filed Mar. 16, 2001.

U.S. Appl. No. 11/149,017, Authentication of secure items by shape level lines, inventors Chosson and Hersch. filed Jun. 10, 2005.

U.S. Appl. No. 11/349,992, entitled "Model-based synthesis of band moiré images for authentication purposes", inventors Hersch and Chosson. filed Feb. 9, 2006.

I. Amidror and R.D. Hersch, Fourier-based analysis and synthesis of moirés in the superposition of geometrically transformed periodic structures, Journal of the Optical Society of America A, vol. 15, 1998; pp. 1100-1113.

I. Amidror, The Theory of the Moiré Phenomenon, Kluwer Academic Publishers, 2000, Chapter 11, Problems 11.4 and 11.5., pp. 370-371.

I. Amidror, R.D. Hersch, Quantitative analysis of multichromatic moiré effects in the superposition of coloured periodic layers, Journal of Modern Optics, vol. 44, No. 5, 1997, 883-899.

J.W. Harris and H Stocker, Handbook of Mathematics and Computational Science, Springer Verlag1998, 319-329.

R. D. Hersch and S. Chosson, Band Moiré Images, SIGGRAPH'2004, ACM Computer Graphics Proceedings, vol. 23, No. 3, Aug. 2004, pp. 239-248.

J. Huck, Mastering Moirés. Investigating Some of the Fascinating Properties of Interference Patterns, 2003 (http://pages.sbcglobal.net/joehuck/Pages/kit.html) Paper available by contacting the author.

J.F. Moser, Document Protection by Optically Variable Graphics in Optical Document Security, Ed. R.L. Van Renesse, Artech House, London, 1998, pp. 247-266.

K. Patorski, The moiré Fringe Technique, Elsevier 1993, pp. 14-16.

G. Oster, M. Wasserman and C. Zwerling, Theoretical Interpretation of Moiré Patterns. Journal of the Optical Society of America, vol. 54, No. 2, 1964, 169-175.

J.S. Marsh, Contour Plots using a Moiré Technique, American Journal of Physics, vol. 48, Jan. 1980, 39-40.

A.K. Jain, Fundamentals of Digital Image Processing, Prentice Hall, 1989, sections "Skeleton algorithms" and "thinning algorithms", pp. 382-383 and section "Morphological Processing", pp. 384-389.

A. Rosenfeld and J. Pfaltz, "Sequential operations in digital picture processing," Journal of the Association for Computing Machinery, vol. 13, No. 4, 1966, pp. 471-494.

R.L. Van Renesse (Ed.), Optical Document Security, 2nd ed. 1998, Artech House, sections section 9.3.1 Parallax Images and section 9.3.2, Embossed Lens Patterns, pp. 207-210.

* cited by examiner

SYNTHESIS OF SUPERPOSITION IMAGES FOR WATCHES, VALUABLE ARTICLES AND PUBLICITY

The present invention is a continuation in part of the following U.S. patent applications:

(a) patent application Ser. No. 10/270,546, filed Oct. 16, 2002, issued Mar. 20, 2007 now U.S. Pat. No. 7,194,105 entitled "Authentication of documents and articles by moiré patterns", (b) patent application Ser. No. 10/879,218, filed 30 Jun. 2004 entitled "Model-based synthesis of band moiré images for authenticating security documents and valuable products", (c) patent application Ser. No. 11/349,992, filed Feb. 9, 2006, entitled "Model-based synthesis of band moiré images for authentication purposes", and (d) patent application Ser. No. 11/149,017 filed Jun. 10, 2005, entitled "Authentication of secure items by shape level lines".

BACKGROUND OF THE INVENTION

While the parent applications relate mainly to the field of anti-counterfeiting and authentication methods and devices, the present invention aims mainly at synthesizing band moiré images (called "moiré patterns" in patent application Ser. No. 10/270,546) and shape level lines (patent application Ser. No. 11/149,017) for making the information forwarded by time pieces such as watches and clocks, and by valuable articles (cosmetics, perfumes, drugs, jewelry, bikes, cars, publicity display devices, postcards and fashionable clothes) more dynamic, as well as for improving their attractiveness and aesthetics. As described in the parent patent applications, the synthesized band moiré and shape level line images also provide a strong protection against counterfeiting attempts.

Publicity can also benefit from the visually striking message forwarded by dynamically evolving superposition images resulting from the superposition of a base layer and a revealing layer, with one of the layers being in movement in respect to the other layer.

The theory on which the present invention relies has been partly published at the beginning of August 2004, as a scientific contribution: "Band Moiré Images", by R. D. Hersch and S. Chosson, SIGGRAPH'2004, ACM Computer Graphics Proceedings, Vol. 23, No. 3. pp. 239-248.

Moiré and phase effects have been used in the prior art for the authentication of documents. For example, thanks to the phase modulation effect, it is possible to make visible a hidden pattern image encoded within a document (see background of U.S. Pat. No. 5,396,559 to McGrew, background of U.S. Pat. No. 5,901,484 to Seder, U.S. Pat. No. 5,708,717 to Alasia and U.S. Pat. No. 5,999,280 to Huang). When a line grating or a grating of lenticular lenses is superposed on such a document, the pre-designed latent image becomes clearly visible. This phase effect has the particularity that the latent image does not move. When moving the revealing layer on top of the base layer, the latent image foreground becomes alternatively dark and highlight. A further variation of the phase shift technique using conjugate halftone screens is described in U.S. Pat. No. 5,790,703 to Shen-ge Wang. Additional variations of the phase sampling techniques comprising screen element density, form, angle position, size and frequency variations are described in U.S. Pat. No. 6,104,812 to Koltai et. al. A further variation of the phase shift technique consists in having similar line segments printed in registration on two sides of a thick transparent layer: thanks to the parallax effect, the superposition of both layers can be viewed either in phase or out of phase depending on the observation angle, see U.S. Pat. No. 6,494,491 B1 to P. Zeiter et al.

The disclosed band moiré image synthesizing methods (parent U.S. patent application Ser. Nos. 10/270,546, 10/879,218 and 11/349,992) completely differ from the above mentioned phase shift techniques since no latent image is present when generating a band moiré image and since the band moiré image shapes resulting from the superposition of a base band grating and a revealing line grating are a geometric transformation of the original shapes embedded within each band of the base band grating. This geometric transformation comprises always an enlargement, and possibly a rotation, a shearing, a mirroring, and/or a bending transformation. In addition, in the present invention, specific base band grating and revealing line grating layers can be created which upon translation, respectively rotation of the revealing layer in superposition with the base layer, yield a displacement of the band moiré image shapes. Phase based modulation techniques allowing to hide latent images within a base layer are not capable of smoothly displacing and possibly transforming the revealed latent image when moving the revealing layer on top of the base layer.

In U.S. Pat. No. 5,712,731 (Drinkwater et al.) a moiré based method is disclosed which relies on a periodic 2D array of microlenses. This last disclosure has the disadvantage of being limited to the case where the superposed revealing structure is a microlens array and the periodic structure on the document is a constant 2D array of identical dot-shapes replicated horizontally and vertically. Thus, in contrast to the present invention, that invention excludes the use of gratings of lines as the revealing layer. A similar 2D array of microlenses is disclosed in patent application Ser. No. 10/995,859 to Steenblik et. al., filed Nov. 22, 2004. Both inventions also consider a fixed setup of microlens array and dot shape array separated by a gap, where changing the observation orientation has the effect of moving and changing the size of the resulting 2D moiré patterns.

Other moiré based methods disclosed by Amidror and Hersch in U.S. Pat. No. 6,249,588, its continuation-in-part U.S. Pat. No. 5,995,638 and U.S. Pat. No. 6,819,775, rely on the superposition of arrays of screen dots, possibly geometrically transformed, which yields a moiré intensity profile indicating the authenticity of the document. These inventions are based on specially designed 2D structures, such as dot-screens (including variable intensity dot-screens such as those used in real, gray level or color halftoned images), pinhole-screens, or microlens arrays, which generate in their superposition periodic moiré intensity profiles of chosen colors and shapes (typographic characters, digits, the country emblem, etc.) whose size, location and orientation gradually vary as the superposed layers are rotated or shifted on top of each other. These methods making use of the moiré intensity profile to authenticate documents have two limitations. The first limitation is due to the fact that the revealing layer is made of dot screens, i.e. of a set (2D array) of tiny dots laid out on a 2D surface. When dot screens are embodied by an opaque layer with tiny transparent dots or holes (e.g. a film with small transparent dots), only a limited amount of light is able to traverse the dot screen and the resulting moiré intensity profile is not easily visible. The second limitation is due to the fact that the base layer is made of a two-dimensional array of similar dots (dot screen)

where each dot has a very limited space within which only a few tiny shapes such as a few typographic characters or a single logo can be placed.

In parent U.S. patent application Ser. No. 10/270,546 (filed 16 Oct. 2002, "Authentication of documents and articles by moiré patterns", inventors Hersch and Chosson), a significant improvement was made by the discovery that a rectilinear base band grating incorporating original shapes superposed with a revealing straight line grating yields rectilinear moiré bands comprising moiré shapes which are a linear transformation of the original shapes incorporated within the base band grating. These moiré bands form a band moiré image. Since band moiré images have a much better light efficiency than moiré intensity profiles relying on dots screens, band moiré images can be advantageously used in all case where the previous disclosures relying on 2D screens fail to show strong enough moiré shapes. In particular, the base band grating incorporating the original shapes may be printed on a reflective support and the revealing line screen may simply be a film with thin transparent lines. Due to the high light efficiency of the revealing line screen, the band moiré shapes representing the transformed original base band shapes are clearly revealed. A further advantage of band moiré images resides in the fact that it may comprise a large number of shapes, for example one or several words, one or several sophisticated logos, one or several symbols, and one or several signs.

U.S. patent application Ser. No. 10/270,546 (inventors: Hersch and Chosson), describes the layout of rectilinear band moiré images, when the layouts of base layer and the revealing layer are known. However it does not tell in which direction and at which speed the moiré shape moves when translating the rectilinear revealing layer in superposition with the rectilinear base layer. Furthermore, since it does not disclose a model for predicting the layout of the moiré image that can be produced when superposing a curvilinear base layer and a curvilinear revealing layer, band moirés image relying on curvilinear base or revealing layers need to be generated by a trial and error procedure. Furthermore, U.S. patent application Ser. No. 10/270,546 (Hersch and Chosson) does neither give a precise technique for generating a reference rectilinear band moiré image layout with curvilinear base and revealing layer layouts nor does it give a means of generating a desired reference curvilinear band moiré image layout with a predetermined rectilinear or curvilinear revealing layer layout.

The band moiré synthesizing method, drawn from parent U.S. patent application Ser. No. 10/879,218 (inventors: Hersch and Chosson), relies on a band moiré image layout model allowing to compute not only the layout of a rectilinear band moiré image produced by superposing a rectilinear base band layer and a rectilinear revealing layer, but also in which direction and at which speed the rectilinear moiré shapes move when translating a the rectilinear revealing layer in superposition with the rectilinear base layer. For a curvilinear base layer and a curvilinear or rectilinear revealing layer, that model computes exactly the layout of the resulting rectilinear or curvilinear band moiré image obtained by superposing the base and revealing layers. Furthermore, one may specify a desired rectilinear or curvilinear band moiré image, as well as one of the layers and the model is able to compute the layout of the other layer. In addition, one may specify the direction in which band moiré image moves when translating or rotating the revealing layer.

In the prior art, the properties of the moiré produced by the superposition of two line gratings are well known (see for example K. Patorski, The moiré Fringe Technique, Elsevier 1993, pp. 14-16). Moiré fringes (moiré lines) produced by the superposition of two line gratings (i.e. set of lines) are exploited for example for the authentication of banknotes as disclosed in U.S. Pat. No. 6,273,473, Self-verifying security documents, inventors Taylor et al. Curved moiré fringes (moiré lines) produced by the superposition of curvilinear gratings are also known (see for example Oster G, Wasserman M., Zwerling C. Theoretical Interpretation of Moiré Patterns. Journal of the Optical Society of America, Vol. 54, No. 2, 1964, 169-175) and have been exploited for the protection of documents by a holographic security device (U.S. Pat. No. 5,694,229, issued Dec. 2, 1997, K. J. Drinkwater, B. W. Holmes).

In parent U.S. patent application Ser. Nos. 10/270,546, 10/879,218, and 11/349,992, as well as in the present application, instead of using a line grating as base layer, we use as base layer a band grating incorporating in each band an image made of one-dimensionally compressed original patterns of varying shapes, sizes, intensities and possibly colors. Instead of obtaining simple moiré fringes (moiré lines) when superposing the base layer and the revealing line grating, we obtain a band moiré image which is an enlarged and transformed instance of the original base band image.

Joe Huck, a prepress professional, in his publication (2003) entitled "Mastering Moirés. Investigating Some of the Fascinating Properties of Interference Patterns, see also http://pages.sbc-global.net/joehuck", created band moiré images, both for artistic purposes and for creating designs incorporating moiré shapes floating within different perceived depth planes thanks to parallax effects. His publication only reports about vertically replicated horizontal base bands and a revealing layer made of horizontal lines, thereby generating moiré shapes moving only in the vertical direction. In contrast to the present invention, he did not provide a general-purpose framework for predicting the geometry of band moiré images as a function of base and revealing layer layouts, nor did he consider geometric transformations of base and revealing layers. In addition, he didn't consider using band moiré images for displaying information on watches and valuable articles by creating a displacement between base and revealing layer.

The described elevation profile embedding method, drawn from parent U.S. patent application Ser. No. 11/149,017 also distinguishes itself from prior art phase shift techniques by the fact that it does not embed a hidden latent image within an image and therefore also does not reveal such a latent image. The elevation profile is embedded within a base layer sets of lines and reveals, thanks to a corresponding matching revealing layer, the elevation profile's level lines.

Chapter 10 of the book by I. Amidror, The Theory of the Moiré Phenomenon, Kluwer, 2000, entitled "Moiré between repetitive non-periodic layers" describes the theory of the superposition of curvilinear line gratings by relying on Fourier series decomposition and spectral domain analysis. Chapter 11 of the same book gives an overview over the indicial method enabling obtaining the geometric layout of the superposition of curved line gratings. In problems 11.4 and 11.5 of Chapter 11 and in the paper by J. S. Marsh, Contour Plots using a Moiré Technique, American Journal of Physics, Vol. 48, January 1980, 39-40, a moiré technique is described for drawing the contour plot of a function g(x,y) which relies on the superposition of a straight line grating and of a curved line grating whose lines have been laterally shifted by an amount equal to g(x,y). These book chapters, together with problems 11.4, 11.5 and the paper by J. S.

Marsh however (a) do not consider generating a shape elevation profile from a preferably bilevel motif shape image, (b) do not mention the possibility of having level lines moving between shape borders and the shape centers and (c) do not consider contour plots as a means of creating pulsing shapes enhancing the attractiveness of valuable articles.

The geometric properties of the moiré produced by the superposition of two rectilinear or curvilinear line gratings are described by K. Patorski, The moiré Fringe Technique, Elsevier 1993, pp. 14-16. Moiré fringes (moiré lines) produced by the superposition of two line gratings (i.e. set of lines) are exploited for example for the authentication of bank notes as disclosed in U.S. Pat. No. 6,273,473, Self-verifying security documents, inventors Taylor et al. Neither Patorski's book, nor U.S. Pat. No. 6,273,473 consider modifying a line grating according to a shape elevation profile nor do they consider generating a shape elevation profile from an initial, preferably bilevel, motif shape image. They also don't mention the possibility of having, by superposing base and revealing layers, level lines moving between motif shape boundaries and motif shape centers.

The well-known parallax effect has been described in U.S. Pat. No. 5,901,484 to R. B. Seder in the context of creating a display device for displaying a plurality of images. Parallax images and the parallax effect is also described in the book by R. L. Van Renesse, Optical Document Security, 2nd ed., 1998, Artech House, section 9.3.1 Parallax Images and section 9.3.2, Embossed Lens Patterns, pp. 207-210, hereinafter referenced as [VanRenesse98]. In section 9.3.2 of that book, FIG. 9.5 shows an example of embossed cylindrical microlenses (also called lenticular lenses), where the lenses have a diameter of 300 μm and are embossed on a visually transparent plastic sheet of about 400 μm thickness. Due to the focusing effect of the lenses, only small strips of the bottom layer are visible while the exact location of these strips depends on the viewing angle.

U.S. Pat. No. 6,494,491, to Zeiter et. al. "Object with an optical effect", teaches a composed layer formed by two images separated by a gap, where due to the relative phase between the two images, a given overall image is perceived at a certain viewing angle and an altered image at other angles. This invention relies on different darkness levels generated by superposed aligned or respectively non-aligned mutually rotated strokes.

There have been attempts to improve the aesthetic quality of watches by incorporating elements having an aesthetic component possibly combined with a functional component such as the watch hands. According to U.S. Pat. No. 4,653,930 to Marlyse Schmid, "it has long been known to add an attractive or original function to the functions of time indication in a timepiece, such as a watch or clock, by causing the appearance of the timepiece to change in the course of time according to the relative position of the indicator members". U.S. Pat. No. 3,321,905 to Krebs describes a clock display comprising polarization layers where the rotation of one of the layers performed in synchronization with the clock hands creates a visual effect. U.S. Pat. No. 3,890,777 to Stanish describes disks rotating in synchronization with the hour and minutes hands, comprising radial transparent or colored sections, which at certain time points yield a flash illuminating the hour and minute hands. U.S. Pat. No. 4,653,930 to Marlyse Schmid, teaches a timepiece comprising a stationary decorative face with transparent zones and a rotating display bearing the same decorative design. The decorative design appears in the superposition of the stationary face and the rotating display when the two are exactly superimposed.

In respect to watches and clocks, the present invention also uses the rotating mechanisms present in a watch, such as the mechanisms rotating the second-hand for rotating one of the layers, e.g. the revealing layer, in superposition with the fixed base layer located for example on the face of the watch, thereby generating dynamically evolving superposition images such as evolving band moiré images or shape level line images.

SUMMARY

The present invention aims at creating visually attractive superposition images formed either by band moiré shapes or by shape level lines in order (a) to make the information forwarded by valuable articles (e.g. watches, clocks, cosmetics, perfumes, drugs, jewelry, bikes, cars, publicity display devices, postcards and fashionable clothes) more dynamic, as well as in order to improve the articles visual attractiveness and aesthetics. A further application is publicity, which benefits from the visually striking message forwarded by dynamically evolving superposition images resulting from the superposition of a base layer and a revealing layer in relative movement one to another. Thanks to the large variety of possible geometric transformations, creating counterfeits of the geometrically transformed base and revealing layers without knowing the parameters of the transformations is difficult. Therefore the moiré shapes, respectively the shape level lines generated by the superposition of geometrically transformed base and revealing layers offer a means of checking that a visually attractive article is authentic.

For synthesizing band moiré images, the present invention relies on a band moiré image layout model capable of predicting the band moiré image layout produced when superposing a base band grating comprising specific base band shapes having a given layout and a revealing line grating having a given, possibly different layout. Both the base band grating and the revealing line grating may have a rectilinear or a curvilinear layout. The resulting band moiré image layout may also be rectilinear or curvilinear. Thanks to the band moiré image layout model, one can choose the layout of two layers selected from the set of base band grating layer, revealing line grating layer and band moiré image layer and obtain the layout of the third layer by computation, i.e. automatically. In the present invention, one may simply define the band moiré image layout as well as the revealing line grating layout and compute the corresponding base band grating layout, which when superposed with the specified revealing line grating layout generates the specified band moiré image layout.

The present disclosure also describes methods for computing the direction and speed at which rectilinear moiré shapes move when displacing the corresponding rectilinear revealing line grating layer in superposition with the rectilinear base band grating layer. Furthermore, in the case of a circular band moiré image, the base band grating layer and revealing line grating layer layouts may be produced according to geometric transformations, which, upon relative displacement of the position sampled by the revealing layer on the base layer, yield a band moiré image whose moiré shapes move either radially, circularly or along a spiral trajectory, depending on the orientation of the base band replication vector in the original non-transformed base layer space.

Shape level lines occur in a superposition image when a base layer comprising modified sets of lines is superposed with a revealing layer comprising a line grating. The layer with the modified sets of lines embeds a shape elevation profile generated from an initial, preferably bilevel, motif shape image (e.g. typographic characters, words of text, symbols, logo, ornament). By modifying the relative superposition phase of the revealing layer in superposition with the base layer or vice-versa (e.g. by a translation, a rotation or another relative superposition phase transformation, according to the geometric transformation applied to the base and revealing layers), one may observe shape level lines moving dynamically between the initial motif shape boundaries (shape borders) and shape foreground centers, respectively shape background centers, thereby growing and shrinking. The movement of the shape level lines across the motif shape creates visually attractive pulsing motif shapes, for examples pulsing symbols such as a pulsing heart or pulsing text.

The base and revealing layers may be printed on various supports, opaque or transparent materials. The revealing layer may be embodied by a line grating imaged on an transparent support or by other means such as cylindric microlenses, also called lenticular lenses. Such cylindric microlenses offer a high light efficiency and allow to reveal band moiré image shapes whose base band grating shapes are imaged at a high frequency on the base band layer. The base band grating layer may also be reproduced on an optically variable device and revealed either by a line grating imaged on a transparent support or by cylindric microlenses.

The base band layer and the revealing line grating layer may be separated by a small gap and form a fixed composed layer, where, thanks to the well-known parallax effect, by tilting the composed layer in respect to an observer, or equivalently by moving the eyes across the revealing layer line grating of the composed layer, different successive positions of the base layer are sampled. This creates an apparent displacement between base layer and revealing layer yielding dynamically evolving superposition images such as moiré shapes moving along a given trajectory or level lines moving between motif shape boundaries and respectively motif shape foreground and motive shape background centers.

Many embodiments of the present invention are possible. A first category of embodiments concerns valuable, visually attractive, articles which have moving parts, for example time pieces such as watches and clocks, vehicles such as bikes and cars or mechanical publicity display devices. Dynamic superposition images such as moving band moiré shapes or moving shape level lines (yielding a pulsing shape) are achieved by transmitting the mechanical movement present in the article either onto the base layer, or onto the revealing layer or onto both. A second category of embodiments concerns valuable, visually attractive articles comprising two at least partly superposed parts, with one part being the base layer and the second part being the revealing layer. The displacement of one of the layers creates a dynamic superposition image, such as moving band moiré shapes or moving shape level lines. The displacement may be induced by an external intervention, such as a person slightly moving one of the layers, e.g. in the case of a product label made of two parts, in the case of a package comprising two sliding parts or in the case of a bottle comprising rotating top (lid). The displacement may also be induced by forces that are applied to these layers. For example, in the case of a dress made of superposed parts, the movements of the person wearing that dress create relative displacements between the base layer and revealing layer parts. A third category of embodiments deals with valuable articles where the base layer and the revealing line grating are separated by a gap and form a fixed composed layer, where, thanks to the parallax effect, by tilting the composed layer in respect to an observer, successive positions of the base layer are sampled, yielding a dynamically evolving superposition image, either moving moiré shapes or shape level lines creating the impression of pulsing shapes. Such a valuable article just needs a surface for placing the composed layer. This category of valuable articles comprises watches, clocks, cosmetics, perfumes, drugs, jewelry, bikes, cars, publicity articles, and postcards. A last category of embodiments comprises electronic devices where either the base layer or the revealing or both layers are created on a display by a computer program. By electronically generating successive images of one of the layer moving in respect to the other, a dynamic superposition image is formed by moving moiré shapes, by moving shape level lines, or by both. It is possible to have a fixed base layer superposed with an electronic transmissive revealing layer or vice-versa. This last category of embodiments comprises electronic displays, and more specifically, electronic watches, electronic clocks, and game devices.

BRIEF DESCRIPTION OF THE DRAWINGS

For a better understanding of the present invention, one may refer by way of example to the accompanying drawings, in which.

DETAILED DESCRIPTION OF THE INVENTION

Figure 1:
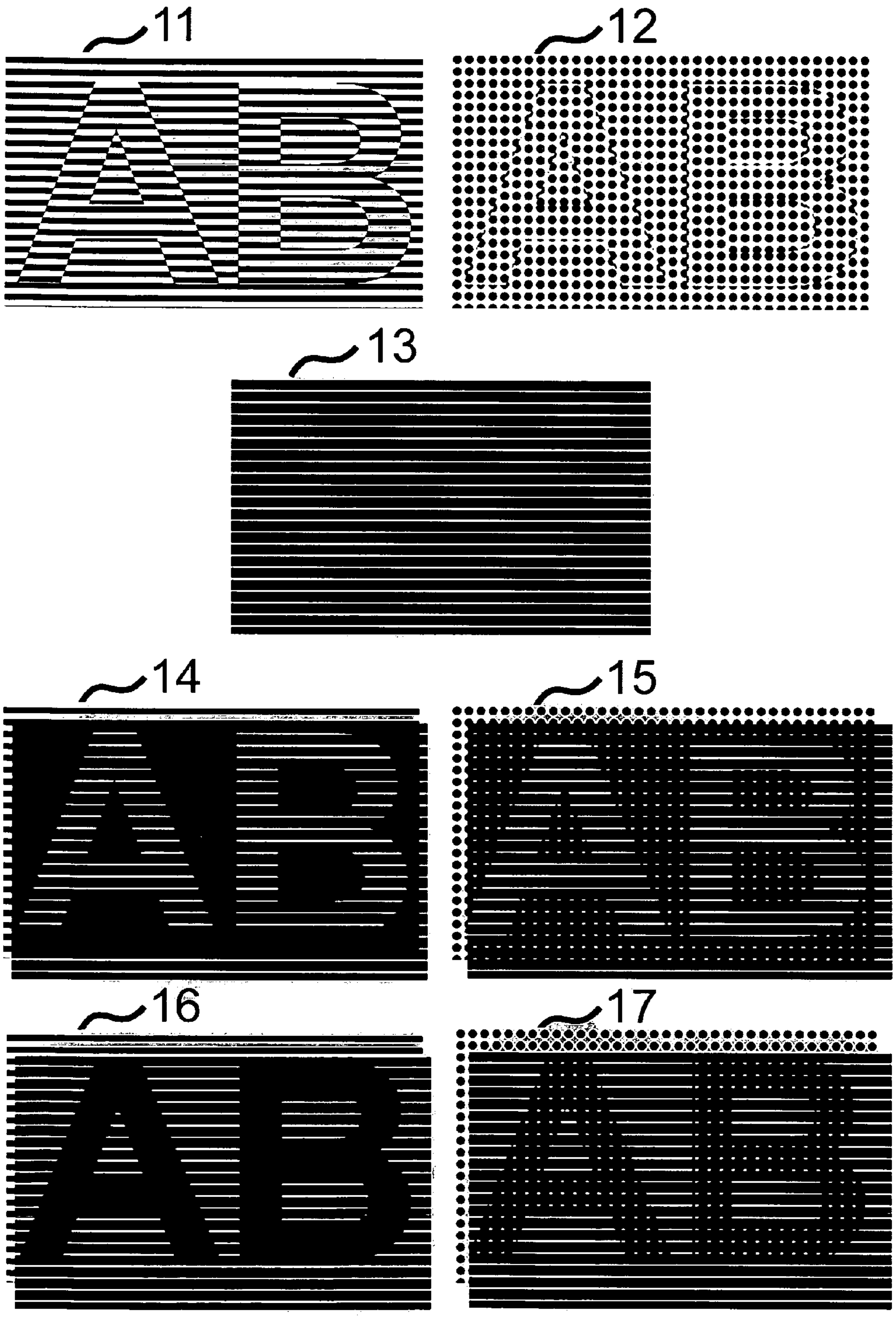
FIG. 1 (prior art)
FIG. 1 shows prior art "phase-shift" based methods of hiding a latent binary image.

In the present patent application, superposition images resulting from the superposition of a base layer and of a revealing layer made of a grating of transparent lines are used in time pieces such as watches and clocks and in valuable visually attractive articles, in order to increase the aesthetics of the watch, respective valuable article. Superposition images are either band moiré images, shape level line images or both.

Virtually all adult humans and many children wear some type of watch. Most watches and clocks have mechanical parts even if time is maintained by electronics. The present invention aims at using the mechanical movements present in a watch or a clock in order to provide movement to the revealing layer (or the base layer) and induce a dynamic superposition image carrying its own specific message, for example the digits present on the face of the watch, text, a logo, a symbol, or an ornament.

Valuable visually attractive articles such as clothes (e.g. dress, skirt, blouse, jacket and pants) may also provide, thanks to the movement of the human body, continuous displacements between superposed cloth elements. Vehicles such as bikes and cars have rotating wheels, which may provide movement to either the base or the revealing layer and therefore induce dynamically evolving superposition images. Publicity may also benefit from superposition images by having either the base or the revealing layer moving in respect to the other layer and generating a dynamically evolving superposition effect, for example in the front window of a shop.

In order to clearly illustrate the difference between prior art phase shift based methods and the present band moiré image and shape elevation profile embedding method, we first give an example of the prior art phase shift method.

We then introduce, according to the parent patent application Ser. Nos. 10/270,546, 10/879,218, and 11/349,992, methods for generating band moiré images according to desired moiré image apparence parameters (moiré base line orientation, letter bar orientation, moiré displacement vector, geometric transformation of moiré image, geometric transformation of revealing line grating and corresponding geometric transformation of base band grating). Band moiré images may, when integrated into visually attractive articles such as watches or a clocks, increase their attractiveness by for example by displaying dynamically evolving information or by providing time related effects and messages.

We then introduce parent patent application Ser. No. 11/149,017 which describes how to generate a base layer and a revealing layer, whose superposition generates the level lines of a shape elevation profile embedded into the base layer. By modifying the relative superposition phase of the revealing layer in respect to the base layer or vice-versa (e.g. by a translation, a rotation or another relative superposition phase transformation, according to the geometric transformation applied to the base and revealing layers), one may observe shape level lines moving dynamically between the shape boundaries and their foreground, respectively background centers (or skeletons), thereby growing and shrinking.

We then give examples of base and revealing layers integrated into a watch (or a clock), into valuable products or for publicity, where the movement of one of the layers generates superposition images which provide additional dynamics for example by having constantly evolving number and letter shapes. The generated superposition images represent either dynamic band moiré images or evolving shape level lines or a combination of both.

Prior Art: Example of the Phase Shift Method

FIG. 1 shows an example of the prior art method of hiding a latent binary image within a line grating (see background of U.S. Pat. No. 5,396,559 to McGrew) or within a dot screen (similar to U.S. patent application Ser. No. 09/810,971 Assignee Trustcopy). The line grating 11, respectively dot screen 12, is, within the borders of the latent binary image shifted by a fraction of a period, e.g. half a period. In FIG. 1, the foreground of the latent image, formed by the alphanumeric characters is shifted by half a period in respect to the latent image background. The transparent parts of the revealing layer 13 sample (14, respectively 15) the white surface parts located in the foreground of the characters and the black surface parts located in the background of the characters. When the revealing layer is moved, its transparent lines sample (16 and respectively 17) the white surface parts of the background and the black surface parts of the foreground of the characters. In both cases, the phase shift between background and foreground shape creates a contrast which reveals the shape of the latent image.

Model-Based Band Moiré Images

Figure 3:
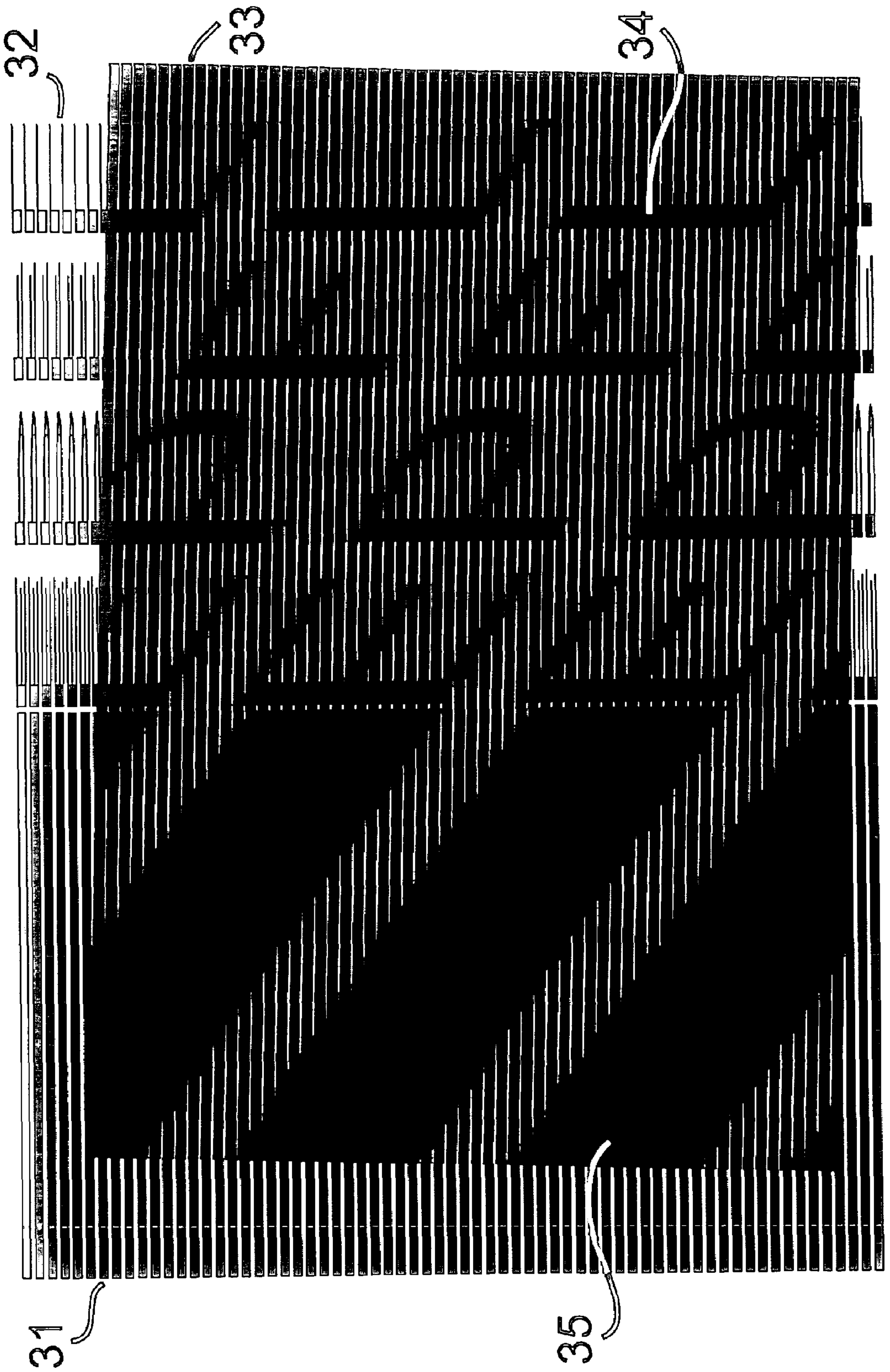
FIG. 3 shows the moiré fringes and band moiré shapes generated by the superposition of a revealing line grating and of a base layer incorporating a grating of lines on the left side and base bands with the shapes "EPFL" on the right side (U.S. patent application Ser. No. 10/270,546, Hersch & Chosson)
Figure 4:
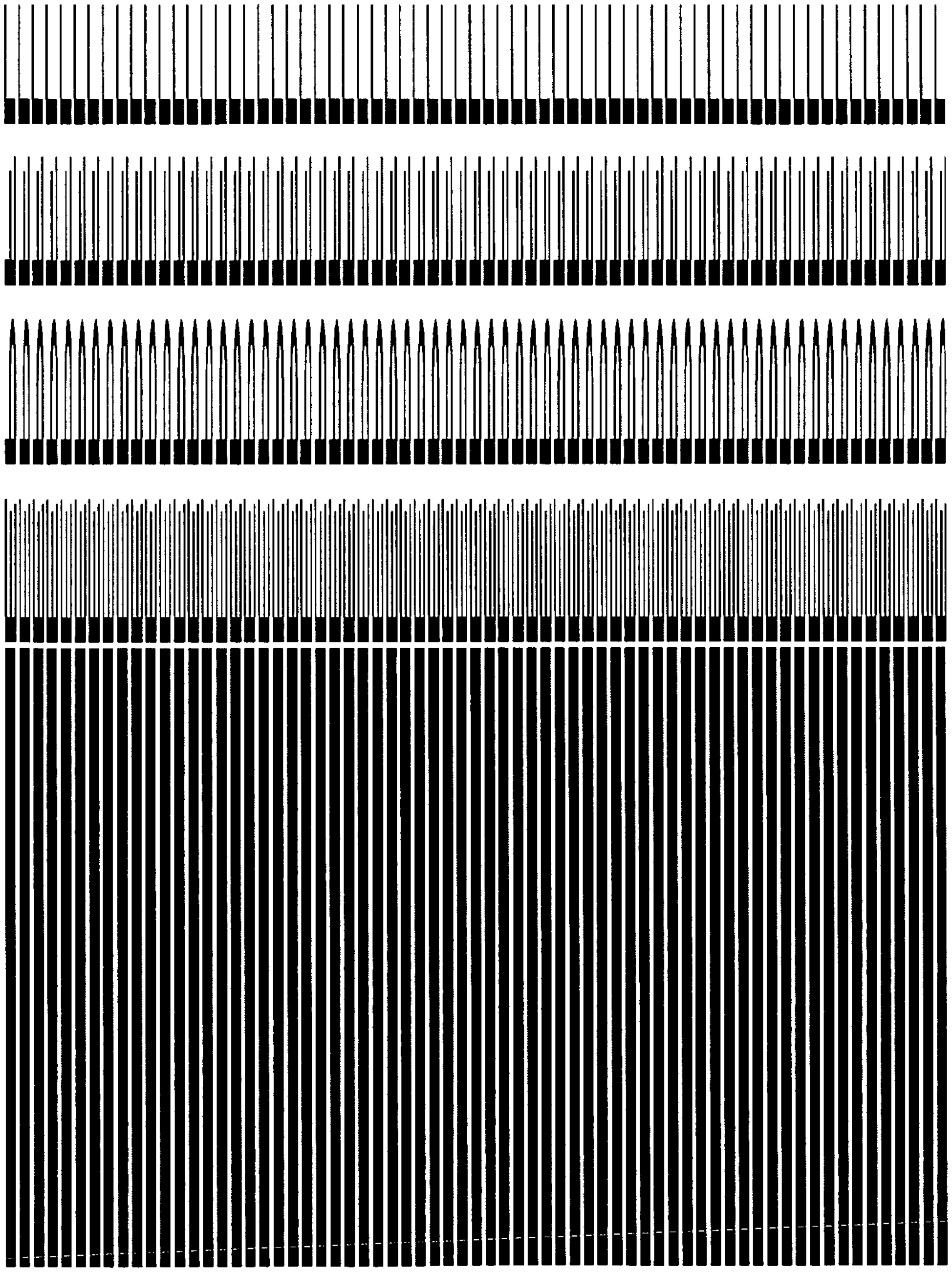
FIG. 4 shows separately the base layer of FIG. 3.
Figure 5:
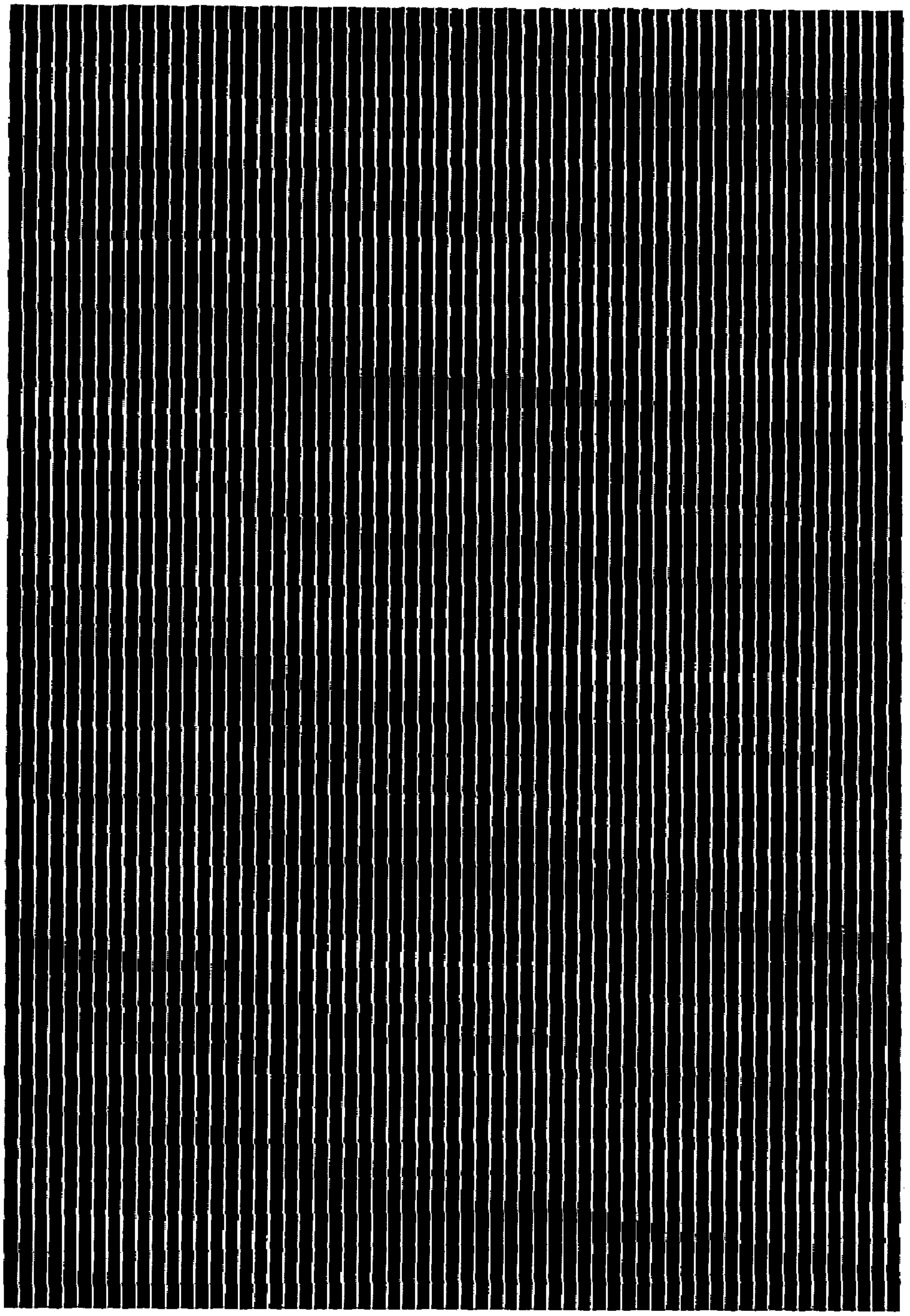
FIG. 5 shows separately the revealing layer of FIG. 3.

In U.S. patent application Ser. No. 10/270,546 (Hersch & Chosson), the present inventors proposed to use a line grating as revealing layer and to introduce as base layer a base band grating made of replicated bands comprising freely chosen flat shapes or flat images (FIGS. 3, 4, 5). In U.S. patent application Ser. No. 10/879,218, (Hersch & Chosson) the present inventors disclose a model (hereinafter called "band moiré image layout model") allowing the computation of the direction and the speed in which rectilinear band moiré image shapes move when translating a rectilinear revealing layer in superposition with a rectilinear base layer. Furthermore, given any layout of rectilinear or curvilinear base and revealing layers, the band moiré layout model computes the layout of the resulting rectilinear or curvilinear band moiré image obtained by superposing the base and revealing layers. In addition, one may specify a desired rectilinear or curvilinear band moiré image as well as one of the layers and the band moiré layout model is able to compute the layout of the other layer.

Figure 2A:
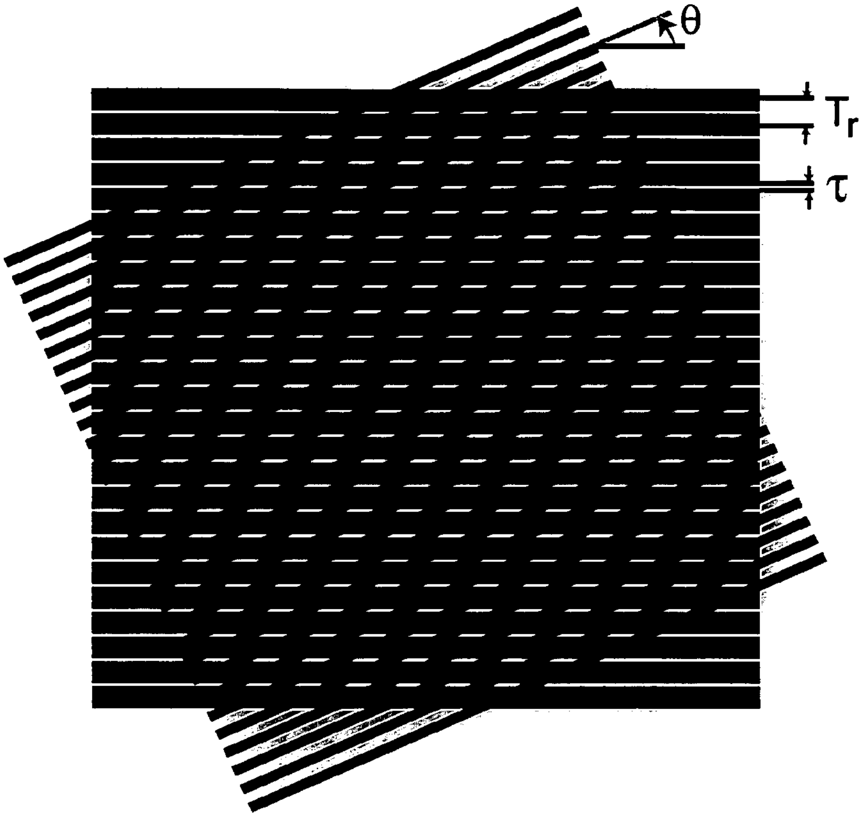
FIGS. 2A and 2B show the generation of moiré fringes when two line gratings are superposed (prior art)
Figure 2B:
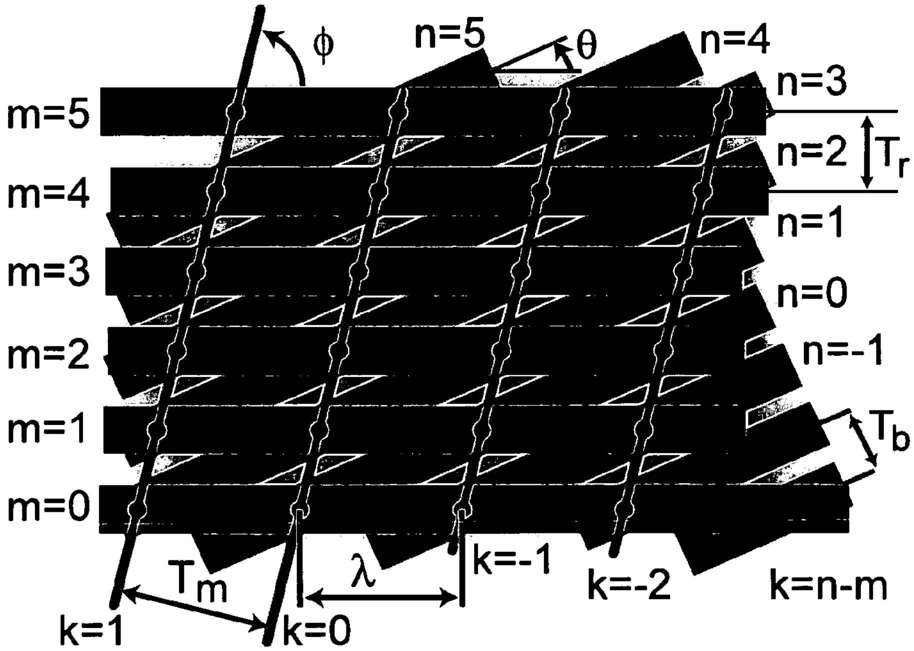

It is well known from the prior art that the superposition of two line gratings generates moiré fringes, i.e. moiré lines as shown in FIG. 2A (see for example K. Patorski, The Moiré Fringe Technique, Elsevier 1993, pp. 14-16). One prior art method of analyzing moiré fringes relies on the indicial equations of the families of lines composing the base and revealing layer line gratings. The moiré fringes formed by the superposition of these indexed line gratings form a new family of indexed lines whose equation is deduced from the equation of the base and revealing layer line families (see Oster G., Wasserman M., Zwerling C. Theoretical Interpretation of Moiré Patterns. Journal of the Optical Society of America, Vol. 54, No. 2, 1964, 169-175, hereinafter referenced as [Oster 64]). FIG. 2B shows the oblique base lines with indices n=−1, 0, 1, 2, 3, . . . , the horizontal revealing layer lines with indices m=0, 1, 2, 3, 4, . . . and the moiré lines with indices k=1, 0, −1, −2 . . . . The moiré fringes comprise highlight moiré lines connecting the intersections of oblique and horizontal base lines and dark moiré lines located between the highlight moiré lines. Each highlight moiré line can be characterized by an index $$k=n-m \tag{1}$$

The family of oblique base lines is described by $$y=\tan\theta\cdot x+n\cdot\lambda\cdot\tan\theta \tag{2}$$

where θ is the angle of the oblique base lines and λ the horizontal spacing between successive base lines (FIG. 2B).

The family of horizontal revealing lines is described by $$y=m\cdot T_r \tag{3}$$

By expressing indices n and m as a function of x and y, $$n=\frac{y-x\cdot\tan\theta}{\lambda\cdot\tan\theta} \qquad m=\frac{y}{T_r} \tag{4}$$

and by expressing k according to equation (1)

$$k=n-m=\frac{y\cdot T_r-x\cdot T_r\cdot\tan\theta-y\cdot\lambda\cdot\tan\theta}{\lambda\cdot T_r\cdot\tan\theta} \tag{5}$$

we deduce the equation describing the family of moiré lines $$y=x\cdot\frac{T_r\cdot\tan\theta}{T_r-\lambda\cdot\tan\theta}+k\cdot\frac{T_r\cdot\lambda\cdot\tan\theta}{T_r-\lambda\cdot\tan\theta} \tag{6}$$

Equation (6) fully describes the family of subtractive moiré lines: the moiré line orientation is given by the slope of the line family and the moiré period can be deduced from the vertical spacing between two successive lines of the moiré line family. In the section on curvilinear band moirés, we make use of indicial equation (6) in order to deduce the transformation of the moiré images whose base and revealing layers are geometrically transformed.

Both in U.S. patent application Ser. No. 10/270,546 and in the present invention, we extend the concept of line grating to band grating. A band of width $T_b$ corresponds to one line instance of a line grating (of period $T_b$) and may incorporate as original shapes any kind of patterns, which may vary along the band, such as black white shapes (e.g. typographic characters), variable intensity shapes and color shapes. For example, in FIG. 3, a line grating 31 and its corresponding band grating 32 incorporating in each band the vertically compressed and mirrored letters EPFL are shown. When revealed with a revealing line grating 33, one can observe on the left side the well known moiré fringe 35 and on the right side, band moiré shapes 34 (EPFL), which are an enlargement and transformation of the letters located in the base bands. These band moiré shapes 34 have the same orientation and repetition period as the moiré fringes 35. FIG. 4 shows the base layer of FIG. 3 and FIG. 5 shows its revealing layer. The revealing layer (line grating) may be photocopied on a transparent support and placed on top of the base layer. The reader may verify that when shifting the revealing line grating vertically, the band moiré shapes also undergo a vertical shift. When rotating the revealing line grating, the band moiré shapes are subject to a shearing and their global orientation is accordingly modified.

FIG. 3 also shows that the base band layer (or more precisely a single set of base bands) has only one spatial frequency component given by period $T_b$. Therefore, while the space between each band is limited by period $T_b$, there is no spatial limitation along the band. Therefore, a large number of shapes, for example a text sentence, may be placed along each band. This is an important advantage over the prior art moiré profile based authentication methods relying on two-dimensional structures (U.S. Pat. No. 6,249,588, its continuation-in-part U.S. Pat. No. 5,995,638, U.S. patent application Ser. No. 09/902,445, Amidror and Hersch, and in U.S. patent application Ser. No. 10/183,550, Amidror).

Figure 7:
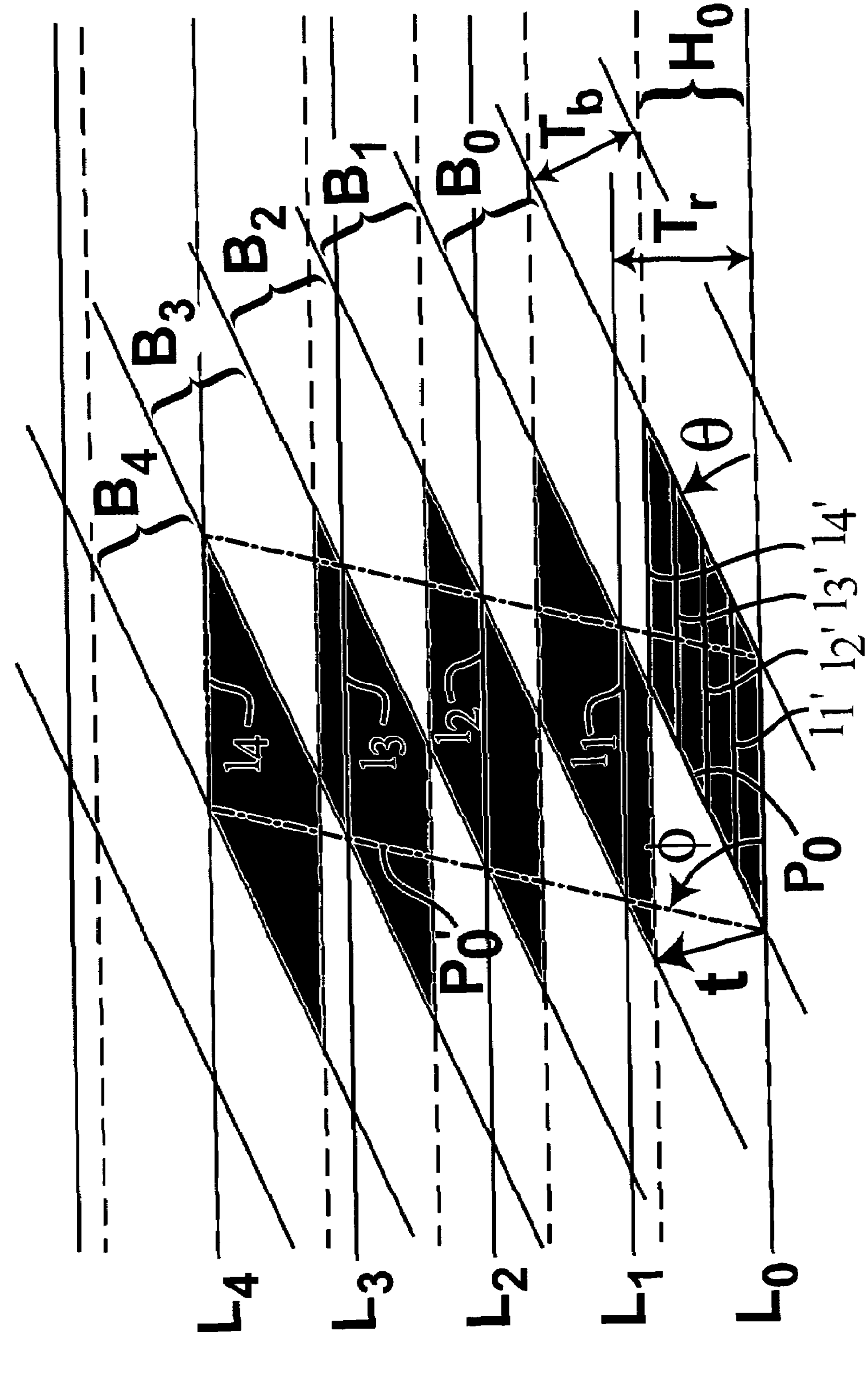
FIG. 7 shows schematically the superposition of oblique base bands and of a revealing line grating (horizontal continuous lines)

In the section "Geometry of rectilinear band grating moirés", we establish the part of the band moiré image layout model which describes the superposition of a rectilinear base band grating layer and a rectilinear revealing line grating layer. The base band layer comprises base bands replicated according to any replication vector t (FIG. 7). This part of the model gives the linear transformation between the one-dimensionally compressed image located within individual base bands and the band moiré image. It also gives the vector specifying the orientation along which the band moiré image moves when displacing the revealing layer on top of the base layer or vice-versa. The linear transformation comprises an enlargement (scaling), possibly a rotation, possibly a shearing and possibly a mirroring of the original shapes.

Terminology

The term "watch" means any device capable of showing the current time. In also includes clocks. In the present invention, a preferred embodiment concerns watches having at least one rotating wheel, which can provide transmit the rotation to the revealing layer, possibly after transforming the rotation into a different movement such as a displacement. Embodiment are also possible with partly or fully electronic watches, where the base layer or/and the revealing layer are embodied by electronically displayed images.

The term valuable article means any article which has been created according to aesthetic considerations, and whose attractive look contributes to its value. Aesthetically looking superposition images forwarding a visual message of their own may contribute to make such valuable articles more attractive.

The term "band moiré image" refers to the image obtained when superposing a base band grating layer and a revealing line grating layer. The terms "band moiré image", "band moiré image layer", "moiré image" or "band moiré" are used interchangeably. The term "band moiré shapes" or simply "moiré shapes" refers to the shapes obtained when superposing a base band grating layer and a revealing line grating layer. The terms "moiré shapes" and "moiré patterns" are equivalent and used interchangeably.

Each base band (FIG. 6, 62) of a base band grating comprises a base band image. The base band image may comprise various patterns, e.g. the "EPFL" pattern in base band 62, black-white, gray or colored, with pattern shapes forming possibly typographic characters, logos, symbols or line art. These shapes are revealed as band moiré image shapes (or simply band moiré shapes) within the band moiré image (FIG. 6, 64) produced when superposing the revealing line grating layer and the base band grating layer.

A base layer comprising a repetition of base bands is called base band grating layer, base band grating, or base band layer. Similarly, a revealing layer made of a repetition of revealing lines is called revealing line grating layer or simply revealing line grating. Both the base band grating and the revealing line grating may either be rectilinear or curvilinear. If they are rectilinear, the band borders, respectively the revealing lines, are straight. If they are curvilinear, the band borders, respectively the revealing lines, are curved.

In the present invention, curvilinear base band gratings and curvilinear revealing line gratings are generated from their corresponding rectilinear base band and revealing line gratings by geometric transformations. The geometric transformations transform the gratings from transformed coordinate space (simply called transformed space) to the original coordinate space (simply called original space). This allows to scan pixel by pixel and scanline by scanline the base grating layer, respectively the revealing line grating layer in the transformed space and find the corresponding locations of the corresponding original base grating layer, respectively revealing line grating layer within the original space.

In the present invention, we use the term line gratings in a generic way: a line grating may be embodied by a set of transparent lines on an opaque or partially opaque support, by cylindric microlenses (also called lenticular lenses) or by diffractive devices (Fresnel zone plates) acting as cylindric microlenses. The terms "line grating" and "grating of lines" are equivalent. In addition, lines gratings need not be made of continuous lines. A revealing line grating may be made of interrupted lines and still produce a clearly visible superposition image (band moiré image or shape level line image).

In the literature, line gratings are often sets of parallel lines, where the white (or transparent) part ($\tau$ in FIG. 2A) is half the full width, i.e. with a ratio of $\tau/T=1/2$. In the present invention, regarding the line gratings used as revealing layers, the relative width of the transparent part (aperture) is generally lower than 1/2, for example 1/5, 1/8, 1/10, 1/15, 1/20 or 1/30.

The formulation "displacement of the revealing layer in superposition with the base layer" means that successive parts of the base layer are sampled at successive relative displacements of the revealing layer. It does not necessarily require a physical movement between the layers. When there is a small gap between base and revealing layer, changing the observation angle is sufficient to sample successively different parts of the base layer and therefore to induce an apparent displacement of the revealing layer on top of the base layer. Hereinafter, the term "displacement of the revealing layer" in respect to the base layer means "displacement of the position sampled by the revealing layer on the base layer". It therefore also comprises apparent displacements between revealing layer and base layer.

The term "shape level lines" or "shape elevation level lines" are equivalent. They move between the "shape foreground center, respectively shape background center and the shape boundaries" or in other words, between the "shape foreground skeleton, respectively the shape background skeleton". Depending on the context the singular term "shape" or the plural term "shapes" is used. They are equivalent.

The Geometry of Rectilinear Band Moiré Images

Figure 6:
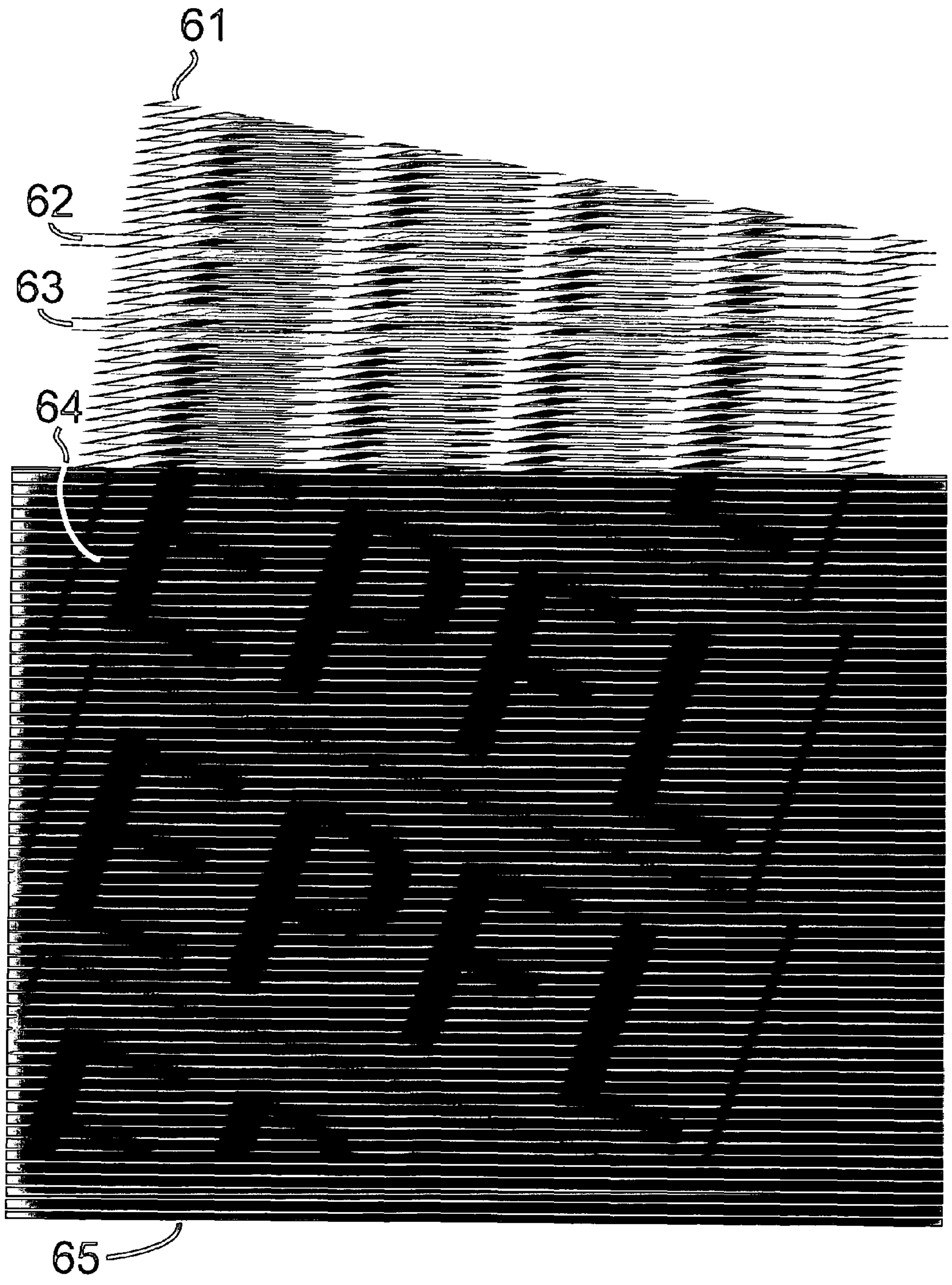
FIG. 6 shows that the produced band moiré shapes are a transformation of the original base band shapes.

FIG. 6 shows the superposition of an oblique base band grating and of a horizontal revealing line grating. Since the superposition of a base band grating and revealing line grating with any freely chosen orientations can always be rotated so as to bring the revealing line grating in the horizontal position, we will in the following explanations consider such a layout, without loss of generality. FIG. 6 shows that the moiré shapes are a transformation of the original base band shapes 61 that are located in the present embodiment within each repetition of the base bands 62 of the base band layer. FIG. 6 also shows the equivalence between the original oblique base band 61 and the derived horizontal base band 63, parallel to the horizontally laid out revealing layer 65.

The geometric model we are describing relies on the assumption that the revealing line grating is made of transparent straight lines with a small relative aperture, i.e. the revealing line grating can be assimilated to a grating of sampling lines. Let us analyze how the revealing line grating (dashed lines in FIG. 7) samples the underlying base layer formed by replications of oblique base band $B_0$, denoted as base bands $B_1$, $B_2$, $B_3$, $B_4$ (FIG. 7).

Base bands are replicated with replication vector t. Oblique base bands $B_1$, $B_2$, $B_3$, $B_4$ are by construction exact replicates of base band $B_0$. The gray parallelograms located respectively in bands $B_1$, $B_2$, $B_3$, $B_4$ (FIG. 7) are therefore exact replicates of the base parallelogram $P_0$ located in band $B_0$. The revealing line grating (revealing lines $L_0$, $L_1$, $L_2$, $L_3$, $L_4$, FIG. 7), superposed on top of the base layer samples the replicated base bands and produces a moiré image (FIG. 3). The intersections of the revealing lines (sampling lines) with replica of base band parallelogram $P_0$, i.e. the sampled line segments $l_1$, $l_2$, $l_3$, $l_4$ are identical to the sampled line segments $l_1'$, $l_2'$, $l_3'$, $l_4'$ within base band parallelogram $P_0$. We observe therefore a linear transformation mapping base band parallelogram $P_0$ to moiré parallelogram $P_0'$. The transformation depends on the relative angle θ between base bands and revealing lines, on the base band replication vector t, and on the revealing line period $T_r$(FIG. 7).

Figure 8:
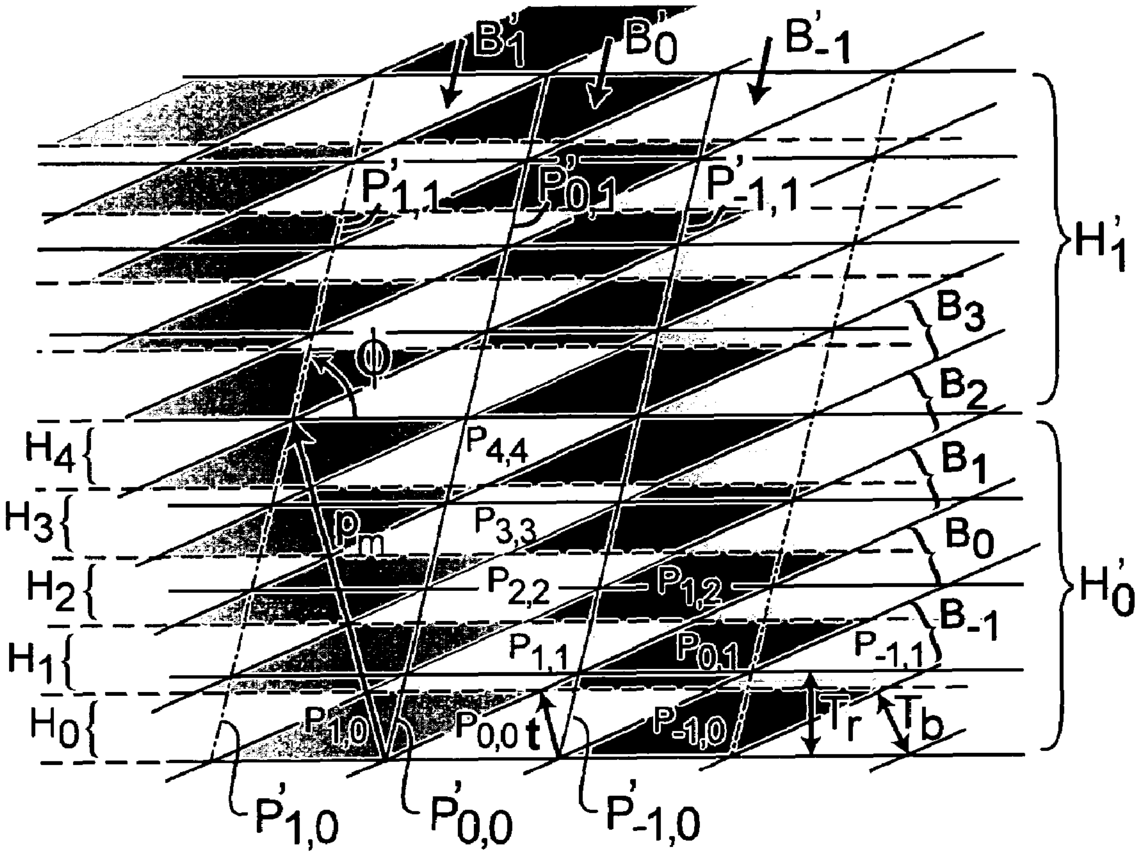
FIG. 8 shows oblique base bands $B_i$, horizontal base bands $H_i$, corresponding oblique moiré bands $B_i'$ and corresponding horizontal moiré bands $H_i'$.
Figure 10:
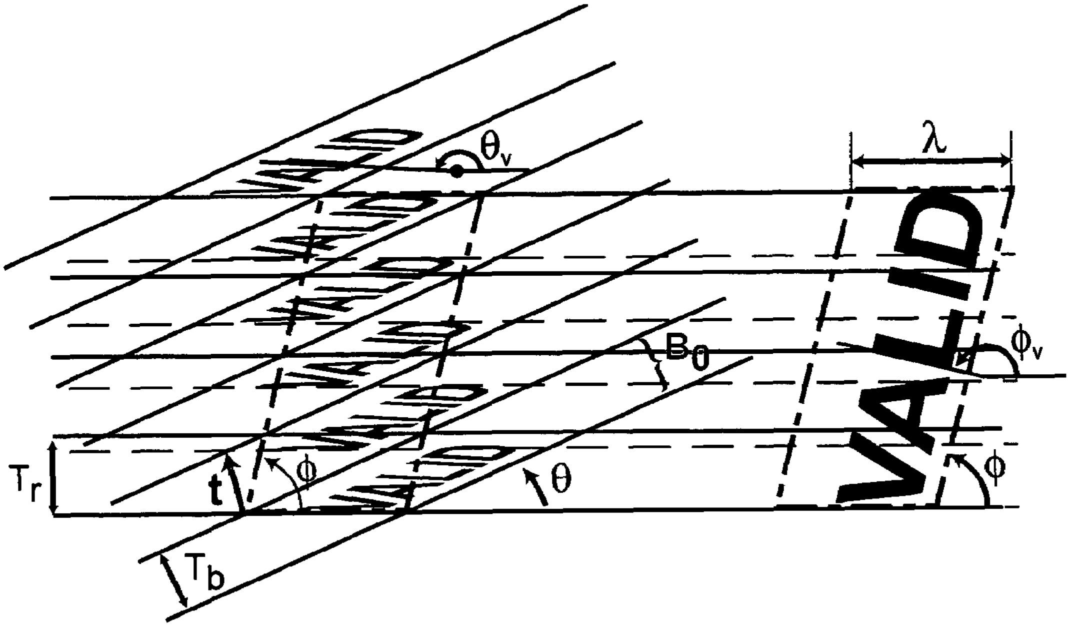
FIG. 10 shows a possible layout of text shapes along the oblique base bands and the corresponding revealed band moiré text shapes.

The observed linear transformation also applies to all other base band parallelograms which are horizontal neighbors of base band parallelogram $P_0$ and which form a horizontal band $H_0$ parallel to the revealing lines. Successive horizontal bands are labelled $H_0$, $H_1$, $H_2$, $H_3$ (FIG. 8). Base band parallelograms at the intersection of oblique base band u and horizontal band v are now denominated $P_{u,v}$. Neighboring parallelograms within a horizontal band [ . . . , $P_{1,0}$, $P_{0,0}$, $P_{-1,0}$, . . . ] are mapped to horizontal moiré neighbor parallelograms [ . . . , $P_{1,0}'$, $P_{0,0}'$, $P_{-1,0}'$, . . . ]. Neighboring parallelograms within an oblique base band [ . . . , $P_{0,0}$, $P_{0,1}$, . . . ] are mapped to oblique moiré neighbor parallelograms [ . . . , $P_{0,0}'$, $P_{0,1}$, . . . ] Therefore, horizontal base bands $H_0$, $H_1$ are mapped onto horizontal moiré bands $H_0'$, $H_1'$ and oblique base bands $B_0$, $B_1$ are mapped onto oblique moiré bands $B_0'$, $B_1'$ (FIG. 10).

Since base band parallelograms $P_{i,i}$ are replica, corresponding moiré parallelograms $P_{i,i}'$ are also replica. When displacing the revealing line grating down with a vertical translation of one period $T_r$, the moiré parallelograms $P_{u,v}'$ move to the position of the moiré parallelograms $P_{u+1,v-1}'$ (e.g. in FIG. 8, parallelogram $P_{0,0}'$ moves to the position of parallelogram $P_{1,1}'$).

Figure 9:
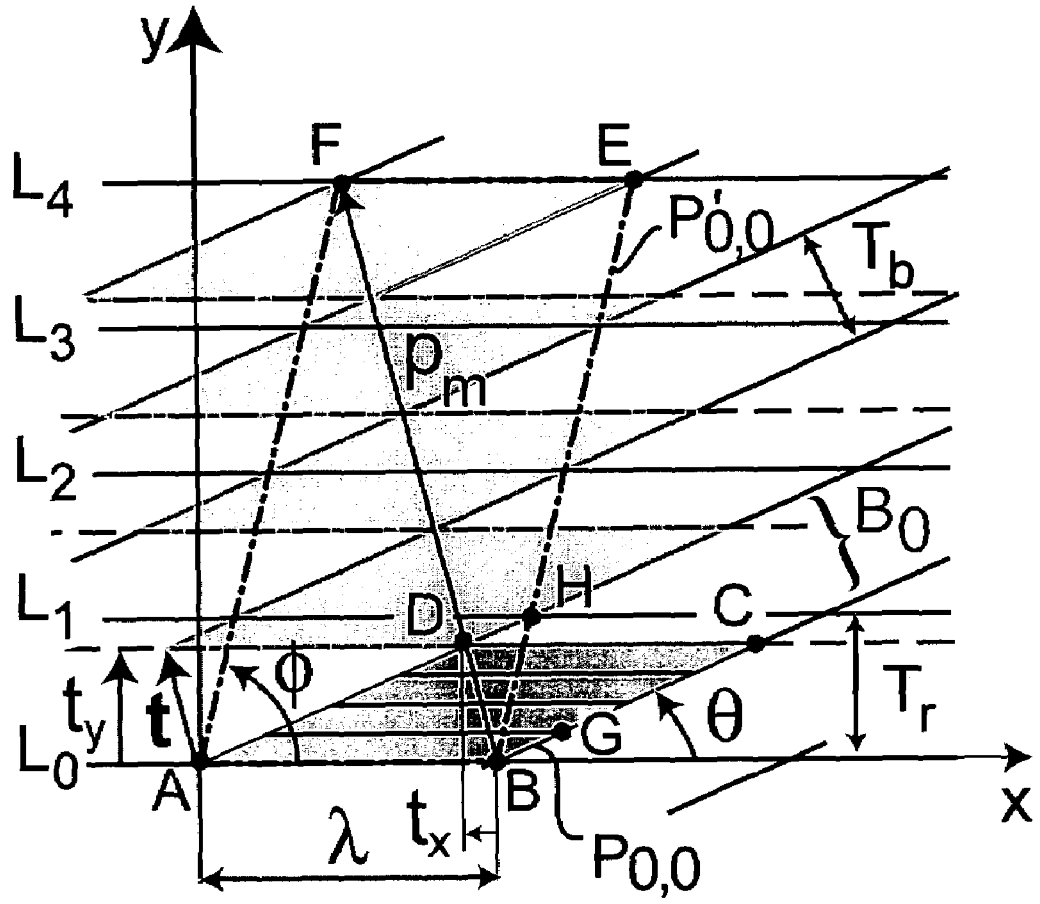
FIG. 9 shows the linear transformation between the base band parallelogram ABCD and the moiré parallelogram ABEF.

Let us establish the parameters of the linear transformation mapping base band parallelograms to moiré parallelograms. According to FIG. 9, points A and B of the base band parallelogram remain fix points and point G of the base band parallelogram $P_{0,0}$ is mapped into point H of the moiré parallelogram $P_{0,0}'$. The coordinates of point H are given by the intersection of revealing line $L_1$ and the upper boundary of oblique base band $B_0$. One obtains the coordinates of point G by subtracting from the coordinates of point H the replication vector $t=(t_x, t_y)$. We obtain $$H=(T_r/\tan\theta, T_r)$$

and $$G=(T_r/\tan\theta-t_x, T_r-t_y) \tag{7}$$

With B as fix point, i.e. (λ,0)->(λ,0), and with G->H, we obtain the linear transformation mapping base band parallelograms to moiré parallelograms $$\begin{bmatrix} x' \\ y' \end{bmatrix} = \begin{bmatrix} p & q \\ r & s \end{bmatrix} \begin{bmatrix} x \\ y \end{bmatrix} = \begin{bmatrix} 1 & \dfrac{t_x}{T_r - t_y} \\ 0 & \dfrac{T_r}{T_r - t_y} \end{bmatrix} \begin{bmatrix} x \\ y \end{bmatrix} \tag{8}$$

Interestingly, with a constant replication vector t, the linear transformation parameters remain constant when modifying angle θ between the base band and the revealing line grating. However, the orientation ϕ of the moiré parallelogram depends on θ. The moiré parallelogram angle can be derived from line segment $\overline{BH}$, where point B has the coordinates (λ,0) and where $\lambda=(t_y/\tan\theta)-t_x$. With point H given by Eq. (7), we obtain for the moiré parallelogram orientation ϕ

$$\tan\phi = \frac{T_r}{\dfrac{T_r}{\tan\theta} - \lambda} \tag{9}$$

Expressed as a function of its oblique base band width $T_b$, with $\lambda=T_b/\sin\theta$, the moiré parallelogram orientation is $$\tan\phi = \frac{T_r \cdot \sin\theta}{T_r \cdot \cos\theta - T_b} \tag{10}$$

Since both the oblique and the horizontal moiré parallelogram bands are replica (FIG. 8), let us deduce the moiré band replication vector $p_m$. Since base bands are replicated by replication vector $t=(t_x, t_y)$ and since there is a linear mapping between base band parallelogram $P_{0,0}$ and moiré parallelogram $P_{0,0}'$, whose diagonal is the moiré band replication vector $p_m$ (FIG. 9), by mapping point $(t_x, t_y)$ according to the linear transformation given by the system of equations (6), we obtain replication vector $p_m$ $$p_m = \left(t_x + t_y \cdot \frac{t_x}{T_r - t_y},\ t_y \cdot \frac{T_r}{T_r \cdot t_y}\right) = \frac{T_r}{T_r - t_y} \cdot t \quad (11)$$

The orientation of replication vector $p_m$ gives the angle along which the moiré band image travels when displacing the horizontal revealing layer in superposition with the base layer. This moiré band replication vector is independent of the oblique base band orientation, i.e. one may, for the same base band replication vector $t=(t_x, t_y)$ conceive different oblique base bands yielding the same moiré band replication vector. However, differently oriented oblique base bands will yield differently oriented oblique moiré bands. Corresponding moiré parallelograms will be different, but they will all have replication vector $p_m$ as their diagonal.

When rotating either the base band layer or the revealing layer, we modify angle θ and the linear transformation changes accordingly (Eq. 6). When translating the base band layer or revealing layer, we just modify the origin of the coordinate system. Up to a translation, the band moiré shapes remain identical.

In the special case where the band grating (base layer) and the revealing layer have the same orientation, i.e. $t_x=0$ and θ=0, according to Eq. (10), the moiré shapes are simply a vertically scaled version of the patterns embedded in the replicated base bands, with a vertical scaling factor of $T_r/(T_r-t_y)=1/(1-t_y/T_r)$. In that case, the width $T_b$ of the base band grating is equal to the vertical component $t_y$ of the replication vector t.

Synthesis of Rectilinear Band Moiré Images

By considering the revealing line grating as a sampling line array, we were able to define the linear transformation between the base layer and the moiré image. The base layer is formed by an image laid out within a single base band replicated with vector t so as to cover the complete base layer space. In order to better understand the various moiré image design alternatives, let us try to create a text message within the base layer according to different layout alternatives.

One may for example conceive vertically compressed microtext (or graphical elements) running along the oblique base bands at orientation θ (FIG. 10, left). In the moiré image, the corresponding linearly transformed enlarged microtext will then run along the oblique moiré bands at orientation φ (FIG. 10, right). The microtext's vertical orientation can also be chosen. With equation (9) expressing the relationship between orientations within the base band layer and orientations within the moiré image layer, one may compute the vertical bar orientation (angle $\theta_v$ of the vertical bar of letter "L" in FIG. 10, left) of the microtext which in the moiré image yields an upright text, i.e. a text whose vertical orientation (angle $\phi_v=\phi+90°$) is perpendicular to its baseline (FIG. 10, right). We first express $\theta_v$ as a function of $\phi_v$, replace $\phi_v$, by φ+90°, and finally express φ as a function of θ. We obtain the microtext's vertical orientation $\theta_v$ yielding an upright text in the moiré image $$\cot\theta_v = \frac{1}{\frac{\lambda}{T_r} - \cot\theta} + \frac{\lambda}{T_r} \quad (12)$$

Clearly, the orientation of the revealed moiré text baseline (angle φ) is given by the orientation of the oblique band (angle θ). The height of the characters depends on the oblique base band base λ or, equivalently, on its width $T_b$. The moiré band repetition vector $p_m$ which defines how the moiré image is translated when displacing the revealing layer up and down, depends according to Eq. (11) on replication vector $t=(t_x,t_y)$. Once the moiré text baseline orientation θ and oblique band base λ are chosen, one may still modify replication vector t by moving its head along the oblique base band border. By choosing a vertical component $t_y$ closer to $T_r$, the vertical enlargement factor s becomes larger according to Eq. (8) and the moiré image becomes higher, i.e. the text becomes more elongated.

Alternatively, instead of designing the microtext within the oblique base bands, one may design microtext within a horizontal base band (FIG. 11) whose height is given by the vertical component $t_y$ of base band replication vector $t=(t_x, t_y)$. By replicating this horizontal base band with replication vector t, we populate the base layer.

The vertical orientation of the microtext can be freely chosen. It defines the layout of the corresponding oblique bands and therefore, the vertical orientation φ of the revealed moiré text image (linearly transformed enlarged microtext). The selected replication vector t defines the vertical size of the moiré band $H_0'$ (FIG. 11), i.e. the vertical extension of the revealed moiré text image and its displacement direction $p_m$ when the revealing layer moves in superposition with the base layer (Eq. 11).

The choice of the revealing line period $T_r$ depends on the base layer resolution. Generally the period $T_r$ of the revealing line grating is between 5% to 10% smaller or larger than the horizontal base band layer width $t_y$. Considering equation (8), factor $s=T_r/(T_r-t_y)$ defines the vertical enlargement between the image located within a horizontal base band ($H_0$ in FIG. 11) and the moiré image located within the corresponding moiré horizontal band $H_0'$. The horizontal base band width $t_y$ should offer enough resolution to sample the vertically compressed text or graphical design (vertical compression factor: s). At 1200 dpi, a horizontal base band width of half a millimeter corresponds to 24 pixels. This is enough for displaying text or line graphics. Therefore, at a resolution between 1200 dpi and 600 dpi, we generally select a revealing line grating period between one half to one millimeter. The aperture of the revealing layer, i.e. the width of its transparent lines is between 10% to 15% of its period $T_r$.

Figure 11:
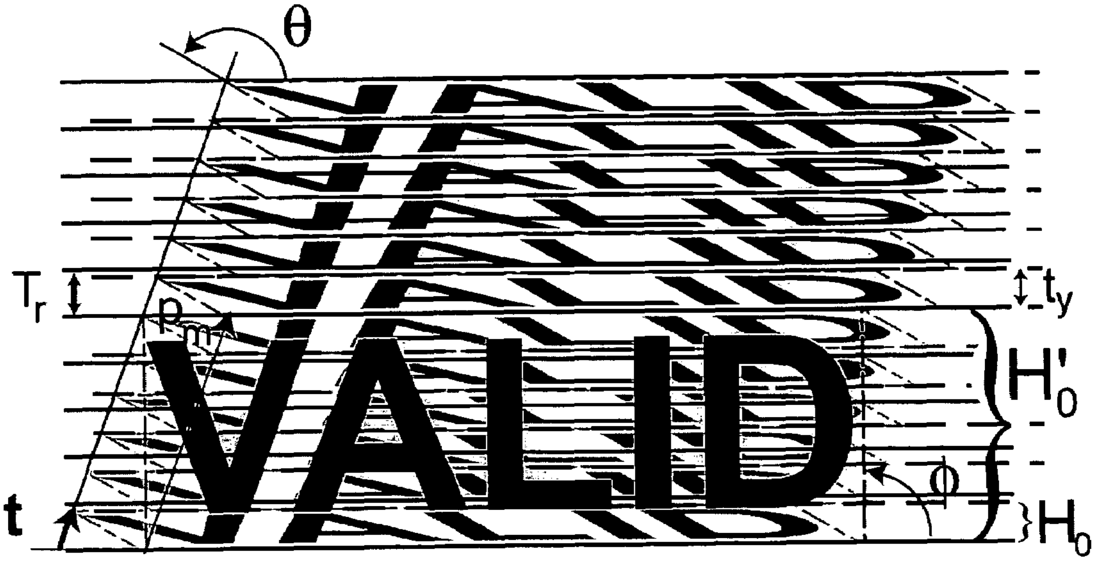
FIG. 11 shows another layout of text shapes along the horizontal base bands, and the corresponding moiré text shapes.

The creation of moiré images does not necessarily need a sophisticated computer-aided design system. Let us illustrate the moiré image creation procedure in the case of a microtext laid out within a horizontal base band. One may simply start by defining the period $T_r$ of the revealing layer. Then one creates the desired "moiré" image within a horizontal parallelogram, whose sides define the orientation φ of the oblique moiré band borders (FIG. 10). The horizontal parallelogram height defines the vertical size of the moiré band $H_0'$, i.e. the vertical component of replication vector $p_m$ and therefore according to Eq. (11) the vertical component $t_y$ of replication vector t. One needs then to linearly transform the horizontal moiré image parallelogram in order to fit it within a horizontal band of height $t_y$. This "flattening" operation has one degree of freedom, i.e. point F (FIG. 9) may be freely mapped to a point D located at the top border of the horizontal base band. The mapping between point F and point D yields the value of λ and the horizontal component $t_x$ of replication vector t. By modifying the position of point D along the top border of the horizontal base band, one modifies the horizontal component $t_x$ of vector t and therefore the orientation $p_m$ along which the moiré parallelogram moves when translating the revealing layer in superposition with the base layer (FIG. 11).

Examples of Rectilinear Moiré Images

Figure 12B:
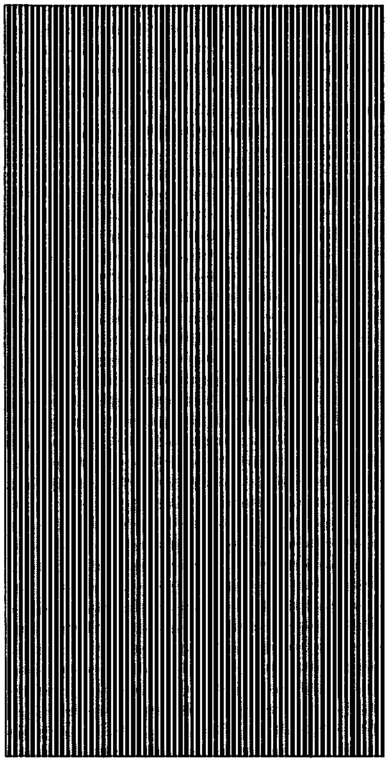
FIG. 12B shows a rectilinear revealing layer.
Figure 12D:
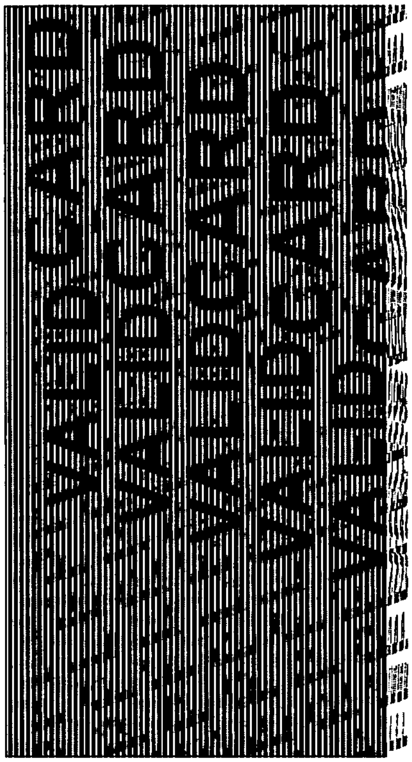
FIG. 12D shows the same superposition as in FIG. 12C, but with a translated revealing layer.
Figure 12A:
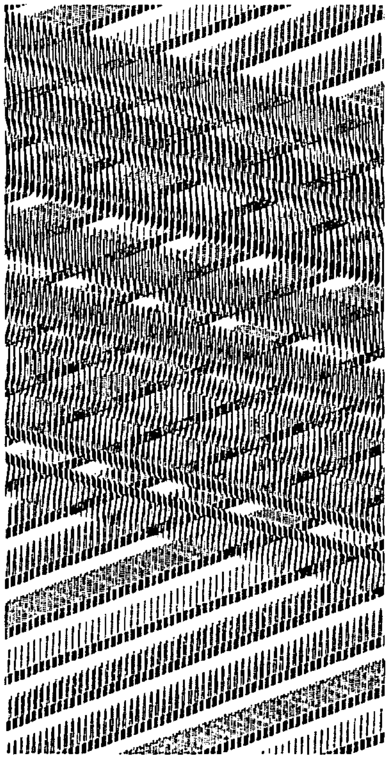
FIG. 12A shows a base layer comprising three sets of rectilinear base bands with different periods and orientations.
Figure 12C:
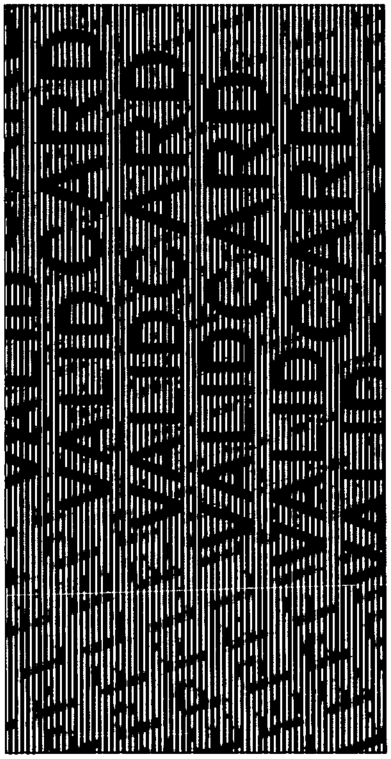
FIG. 12C shows the superposition of the rectilinear revealing layer shown in FIG. 12B and of the base layer shown in FIG. 12A.

We first consider the simple text strings "EPFL", "VALID" and "CARD". Each text string has a specific layout and a specific replication vector t. All distance values are given in pixels at 1200 dpi. "EPFL" is laid out within an oblique band of orientation θ=−1.8°, $t_x$=−15.65, $t_y$=43. "VALID" and "CARD" are each laid out within a horizontal band, with respective replication vectors ($t_x$=9.64, $t_y$=36) and ($t_x$=11.25, $t_y$=42) and respective character verticals at orientations θ=162.7° and θ=14.92° (FIG. 12A). The revealing layer has a period $T_r$=39 (FIG. 12B, top right). The corresponding base layers superposed with the single revealing layer yield a moiré image composed of 3 differently oriented text pieces traveling up or down along different directions at different relative speeds (FIG. 12C and FIG. 12D). FIG. 12D shows that a translation of the revealing layer in superposition with the base layer (or vice-versa) yields, up to a vertical translation, the same band moiré image. When the revealing layer moves vertically by one period, the moiré bands also move by one period along their displacement orientation given by vector $p_m$ (Eq. 11). With a revealing layer displacement speed of u revealing lines per second perpendicular to the revealing lines, the moiré displacement speed vector is therefore $u \cdot p_m$ per second. According to Eq. 11 the speed amplification a between revealing layer and moiré band image displacement speeds is $a=T_r/(T_r-t_y)$.

Model for the Layout of Geometrically Transformed Band Moiré Images

In this section, we describe the geometric transformation that a moiré image undergoes, when its base band grating and its revealing line grating are subject to a geometric transformation. We then derive conditions and equations of the geometric transformations to be applied either to the rectilinear base band grating and/or to the revealing line grating in order to obtain a desired geometric moiré image transformation.

Starting with a rectilinear base band grating and a rectilinear revealing line grating, one may apply to them either the same or different non-linear geometric transformations. The curvilinear band moiré image we obtain is a transformation of the original band moiré image obtained by superposing the rectilinear base band and revealing layers. We derive the geometric transformation which gives the mapping between the resulting curvilinear band moiré image and the original rectilinear band moiré image. This mapping completely defines the layout of the curvilinear band moiré image.

Figure 13A:
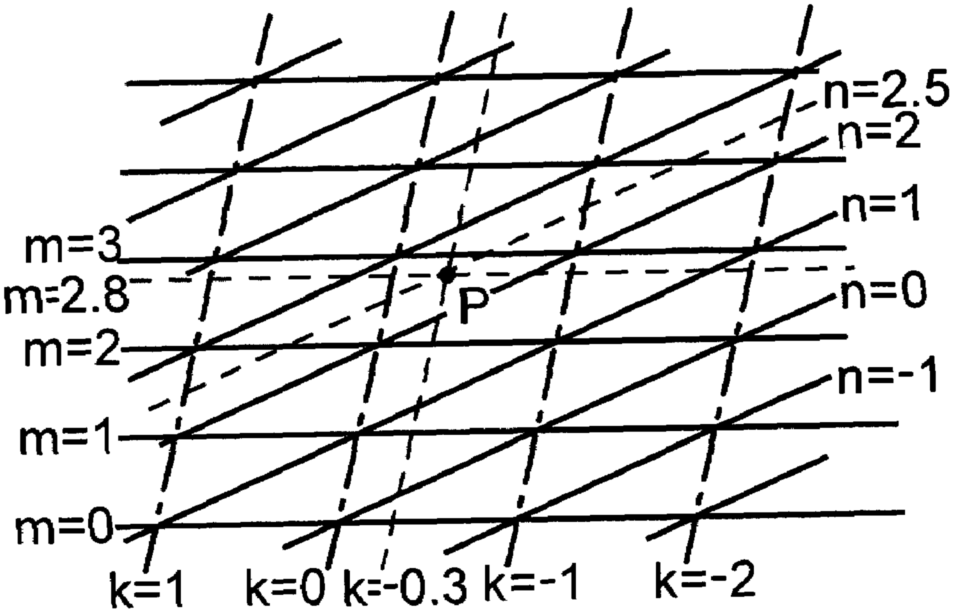
FIGS. 13A and 13B show the indices of oblique base band borders n, of revealing lines m and of corresponding moiré band border lines k before (FIG. 13A) and after (FIG. 13B) applying the geometric transformations.
Figure 13B:
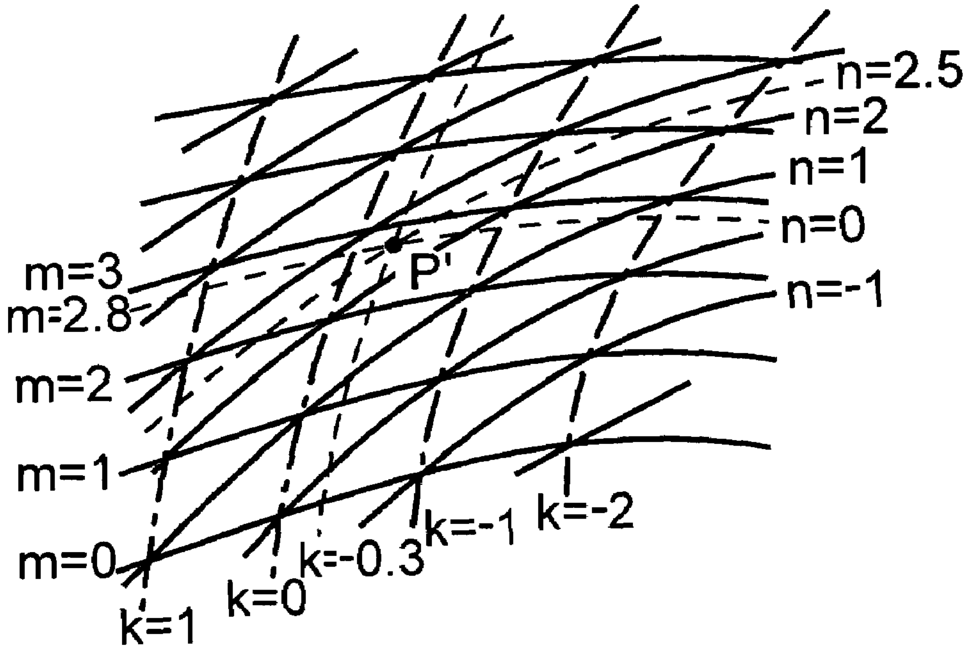

The key element for deriving the transformation between curvilinear and original moiré images is the determination of parameters within the moiré image, which remain invariant under the layer transformations, i.e. the geometric transformation of base and revealing layers. One parameter remaining invariant is the index k of the moiré parallelogram oblique border lines (FIG. 13A), which correspond to the moiré lines shown in FIG. 2B. The curved (transformed) moiré parallelograms are given by the intersections of curved base band borders and curved revealing lines (FIG. 13B). According to the indicial approach, we may describe any point within the base layer space or respectively within the revealing layer space as being located on one oblique base band line of index n (n being a real number) or respectively on one revealing grating line of index m (m being a real number). Clearly, under a geometric transformation of their respective layers, indices n and m remain constant. The intersection between the family of oblique base band lines of index n and of revealing grating lines of index m yields the family of moiré image lines of index k=n−m (k being a real number), both before applying the geometric transformations and after applying these transformations.

Eq. (4) gives the family of moiré image lines parallel to the borders of the moiré parallelogram before applying the geometric transformations. Let us define the geometric transformation between transformed base layer space $(x_t,y_t)$ and original base layer space (x,y) by $$x=h_1(x_t,y_t);\ y=h_2(x_t,y_t) \tag{13}$$

and the geometric transformation between transformed revealing layer space $(x_t,y_t)$ and original revealing layer space (x,y) by $$y=g_2(x_t,y_t) \tag{14}$$

Note that any superposition of original base and revealing layers can be rotated so as to obtain a horizontal revealing layer, whose line family equation depends only on the y-coordinate. The transformation from transformed space to original space comprises therefore only the single function $y=g_2(x_t,y_t)$.

We can insert these geometric transformations into respectively the oblique line equation (2) and the revealing line equation (3), and with equation (5), we obtain the implicit equation of the moiré lines in the transformed space according to their indices k.

$$n=\frac{h_2(x_t,y_t)-h_1(x_t,y_t)\cdot\tan\theta}{\lambda\cdot\tan\theta}; \tag{15}$$

$$m=\frac{g_2(x_t,y_t)}{T_r}$$

$$k=n-m=\frac{h_2(x_t,y_t)\cdot T_r-h_1(x_t,y_t)\cdot T_r\cdot\tan\theta-g_2(x_t,y_t)\cdot\lambda\cdot\tan\theta}{\lambda\cdot T_r\cdot\tan\theta}$$

Since the moiré line indices k are the same in the original (Eq. 5) and in the transformed spaces (Eq. 15), by equating them and bringing all terms into the same side of the equation, we obtain an implicit equation establishing a relationship between transformed and original moiré space coordinates having the form $F_k(x_t,y_t,x,y)=0$.

$$F_k(x_t,y_t,x,y)=h_2(x_t,y_t)\cdot T_r-h_1(x_t,y_t)\cdot T_r\cdot\tan\theta-g_2(x_t,y_t)\cdot\lambda\cdot\tan\theta+x\cdot T_r\cdot\tan\theta+y\cdot(\lambda\cdot\tan\theta-T_r)=0 \tag{16}$$

To completely specify the mapping between each point of the transformed moiré space and each point of the original moiré space, we need an additional implicit equation relating transformed and original moiré image layer coordinates.

Figure 14:
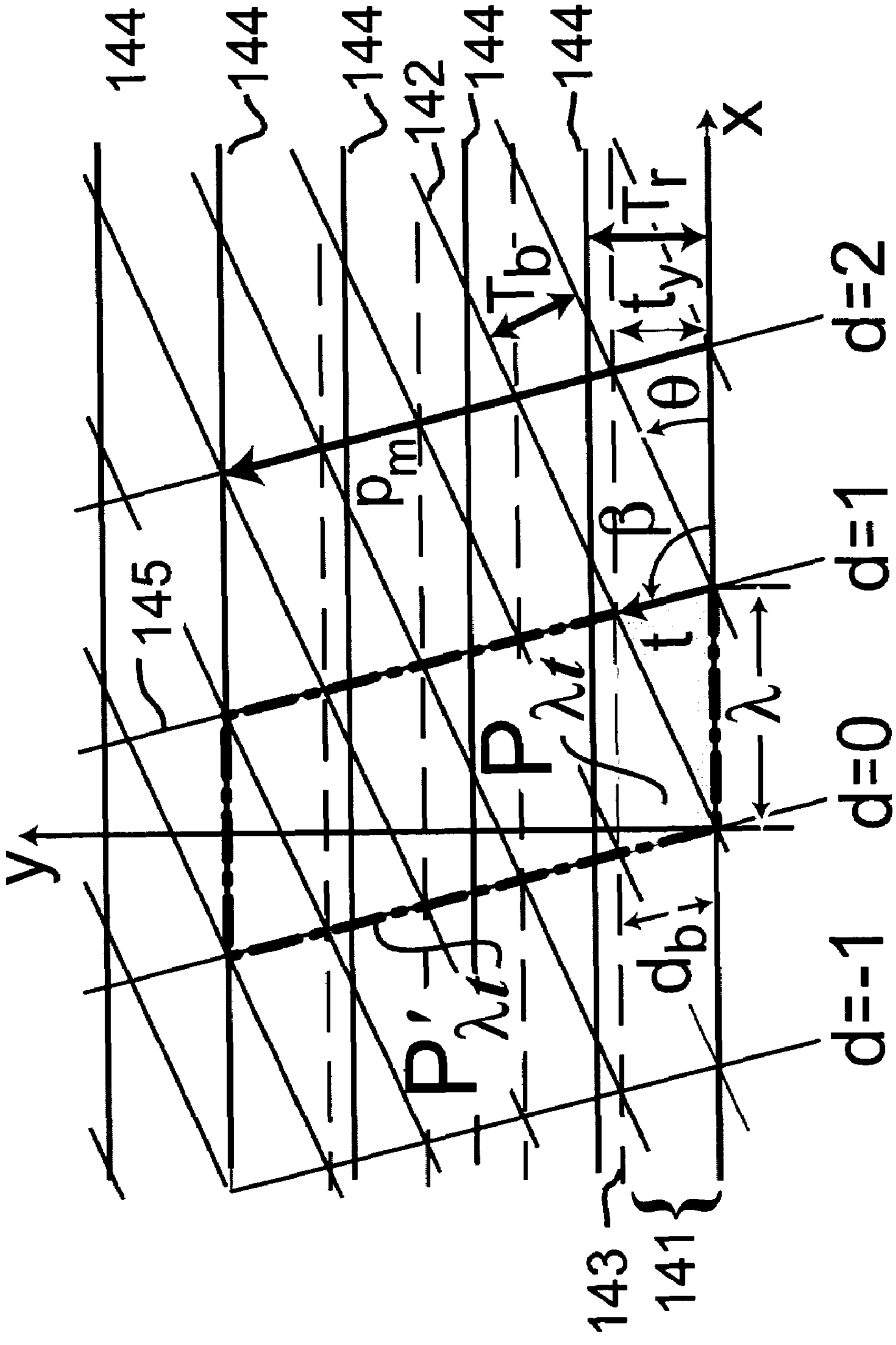
FIG. 14 shows a base band parallelogram $P_{\lambda,t}$ of orientation t linearly transformed into a moiré parallelogram $P_{80\ t}'$ of the same orientation.

We observe that replicating oblique base bands with the replication vector t is identical to replicating horizontal base bands with replication vector t (FIG. 8). We can therefore concentrate our attention on the moiré produced by superposing the horizontal revealing line grating (FIG 14, continuous horizontal lines) and the horizontal base bands (FIG. 14, horizontal base bands separated by dashed horizontal lines).

Clearly, base band parallelogram $P_{\lambda,t}$ with base $\lambda$ and with replication vector t as parallelogram sides is mapped by the linear transformation (Eq. 8) into the moiré parallelogram $P_{\lambda,t}'$ having the same base $\lambda$ and parallelogram sides given by moiré band replication vector $p_m$. Note that successive vertically adjacent replica of moiré parallelogram $P_{\lambda,t}'$ are mapped by the linear transformation into identical replica of the base band parallelogram $P_{\lambda,t}$ Therefore, within the moiré image, each infinite line of orientation $p_m$, called d-line is only composed of replica of a single line segment $d_b$ parallel to t within the base band. This is true, independently of the value of the revealing grating period $T_r$.

This d-line becomes therefore the moiré line located at the intersections between oblique base band borders and revealing lines 144. This moiré line (d-line 145) remains identical when the oblique base band borders are intersected with a geometrically transformed revealing line layer. Therefore, d-lines within the moiré image space remain invariant under geometric transformation of the revealing layer. For example, when superposing the base layer of FIG. 12A with the revealing layer of FIG. 12B and applying to the revealing layer a rotation, a translation or any other transformation, points of the original moiré image move only along their respective d-lines.

Under geometric transformation of the base layer, straight d-lines are transformed into curved d-lines. In the moiré image space, a point located on a straight d-line will remain, after application of a geometric transformation to the revealing layer and of a (generally different) geometric transformation to the base layer, on the corresponding transformed curved d-line.

By numbering the d-lines according to d-parallelogram borders (FIG. 14), we can associate every point within the moiré image to a d-line index (real number). Since the d-line indices are the same in the original and in the transformed moiré image, we can equate them and establish an implicit equation of the form $F_d(x_t,y_t,x,y)=0$. The d-line family equations in the original and transformed spaces are respectively $$y = x\cdot\tan\beta + d\cdot\lambda\cdot\tan\theta \tag{17}$$

and $$h_2(x_t,y_t) = h_1(x_t,y_t)\cdot\tan\beta + d\cdot\lambda\cdot\tan\theta \tag{18}$$

where $\beta$ is the angle of replication vector t with the horizontal and where d is the d-line index. If we extract the line index d from equation (17) and also from equation (18), by equating them, we obtain the following implicit equation $$F_d(x_t,y_t,x,y) = h_2(x_t,y_t) - h_1(x_t,y_t)\cdot\tan\beta + x\cdot\tan\beta - y - 0 \tag{19}$$

We can now solve for x and y the equation system formed by $F_k(x_t,y_t,x,y)=0$ (Eq. 16) and $F_d(x_t,y_t,x,y)=0$ (Eq. 19) and obtain, by replacing respectively in equations (16) and (19)

$$\lambda = t_y \cot\theta - t_x \tan\beta = t_y/t_x \tag{20}$$

the transformation $(m_1(x_t,y_t), m_2(x_t,y_t))$ of the moiré image from transformed moiré space to original moiré space $$x = m_1(x_t, y_t) = h_1(x_t, y_t) + (h_2(x_t, y_t) - g_2(x_t, y_t))\cdot\frac{t_x}{T_r - t_y} \tag{21}$$

$$y = m_2(x_t, y_t) = h_2(x_t, y_t)\cdot\frac{T_r}{T_r - t_y} - g_2(x_t, y_t)\cdot\frac{t_y}{T_r - t_y}$$

The transformation $(m_1(x_t,y_t), m_2(x_t,y_t))$ is independent of the oblique base band orientation. Relevant parameters are the revealing layer line period $T_r$ and the base band replication vector $t=(t_x, t_y)$.

Equations (21) define the transformation M: $(x_t,y_t)\text{->}(x,y)$ of the moiré image from transformed moiré space to original moiré space as a function of the transformation of the base band grating H: $(x_t,y_t)\text{->}(x,y)$, and of the transformation of the revealing line grating G: $(x_t,y_t)\text{->}(x,y)$ from transformed space to the original space. In the present formulation, according to Eq.(21), $M(x_t,y_t)=(m_1(x_t,y_t, m_2(x_t,y_t))$, $H(x_t,y_t)=(h_1(x_t,y_t, h_2(x_t,y_t))$, and $G(x_t,y_t)=(x, g_2(x_t,y_t)$, where x takes all real values. However, different formula equivalent to equation (21) may be associated to the transformations M, H, and G.

Equations (21) show that when the transformations of base layer and revealing layer are identical i.e. $(h_2(x_t,y_t)=g_2(x_t,y_t)$, the moiré transformation is identical to the transformation of the base layer, i.e. $m_1(x_t,y_t)=h_1(x_t,y_t)$ and $m_2(x_t,y_t)=h_2(x_t,y_t)$.

Having obtained the full expression for the induced moiré transformation when transforming base and revealing layers, we can select a given moiré transformation i.e. $m_1(x_t,y_t)$ and $m_2(x_t,y_t)$, select either the revealing layer transformation $g_2(x_t,y_t)$ or the base layer transformation given by $h_1(x_t,y_t)$, $h_2(x_t,y_t)$ and derive, by solving equation system (21) the other layer transformation. The easiest way to proceed is to freely define the moiré transformation $m_1(x_t,y_t)$ and $m_2(x_t,y_t)$ and the revealing layer transformation $g_2(x_t,y_t)$, and then deduce the base layer transformation given by $h_1(x_t,y_t)$ and $h_2(x_t,y_t)$.

$$h_1(x_t, y_t) = (g_2(x_t, y_t) - m_2(x_t, y_t))\cdot\frac{t_x}{T_r} + m_1(x_t, y_t) \tag{22}$$

$$h_2(x_t, y_t) = g_2(x_t, y_t)\cdot\frac{t_y}{T_r} + m_2(x_t, y_t)\cdot\frac{T_r - t_y}{T_r}$$

Equations (22) express the transformation H of the base band grating layer from transformed space to original space as a function of the transformations M and G transforming respectively the band moiré image and the revealing line grating from transformed space to original space.

The transformations M, G and H, embodied by the set of equations (21) or equivalently, by the set of equations (22), form a band moiré image layout model completely describing the relations between the layout of the base band grating layer, the layout of the revealing line grating layer and the layout of the resulting band moiré image layer. The layout of two of the layers may be freely specified and the layout of the third layer may then be computed thanks to this band moiré image layout model.

In some of the examples given in the next section, we freely choose a revealing layer transformation $g_2(x_t,y_t)$, and require as band moiré image transformation the identity transformation, i.e. $m_1(x_t,y_t)=x_t$ and $m_2(x_t,y_t)=y_t$. This allows us to generate the same band moiré image before and after the layer transformations. We obtain periodic band moiré images, despite the fact that both the base layer and the revealing layer are curved, i.e. non-periodic. We then show examples, where we freely chose the revealing layer and require the band moiré image transformation to be a known geometric transformation, for example a transformation yielding circularly laid out band moiré shapes.

Band Moiré Design Variants with Curvilinear Base and Revealing Layers

Let us now apply the knowledge disclosed in the previous section and create various examples of rectilinear and curvilinear band moirés images with at least one the base or revealing layers being curvilinear.

EXAMPLE A

Rectilinear Band Moiré Image and a Cosinusoidal Revealing Layer

Figure 15B:
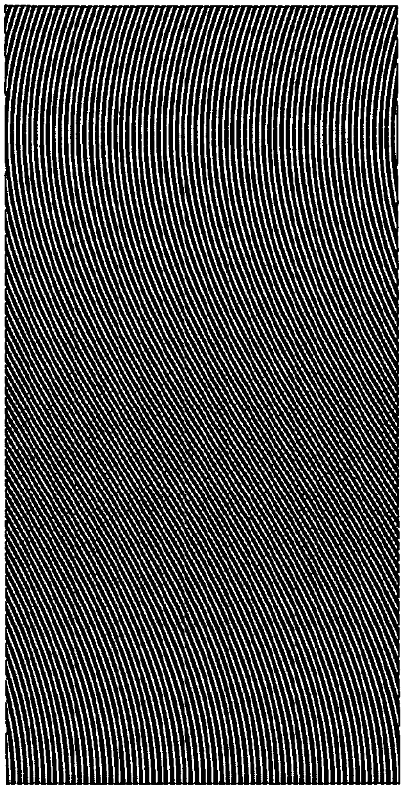
FIGS. 15A and 15B shows respectively the geometrically transformed base and revealing layers of respectively FIGS. 12A and 12B with a revealing layer transformation producing cosinusoidal revealing lines.
Figure 15D:
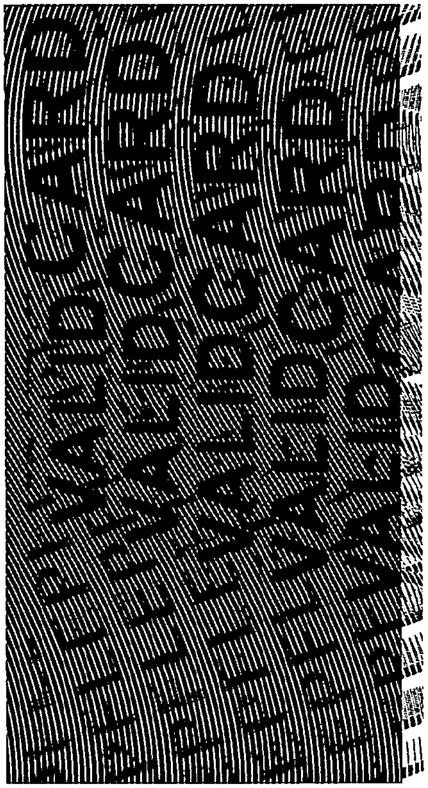
FIGS. 15C and 15D show the rectilinear moiré images induced by the superposition of the transformed layers shown in FIGS. 15A and 15B for two different relative vertical positions.
Figure 15A:
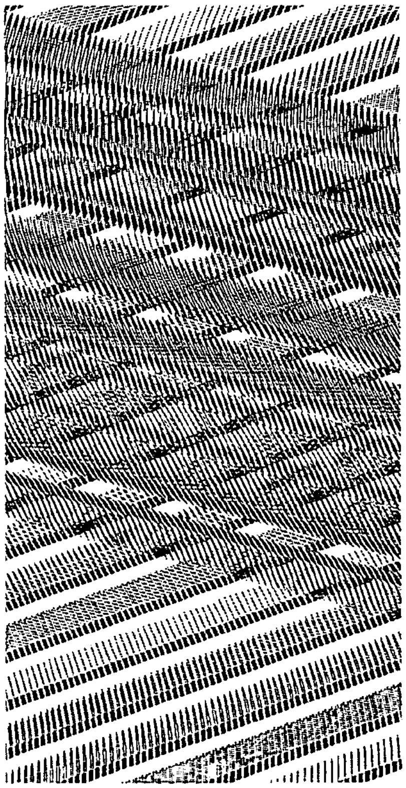
Figure 15C:
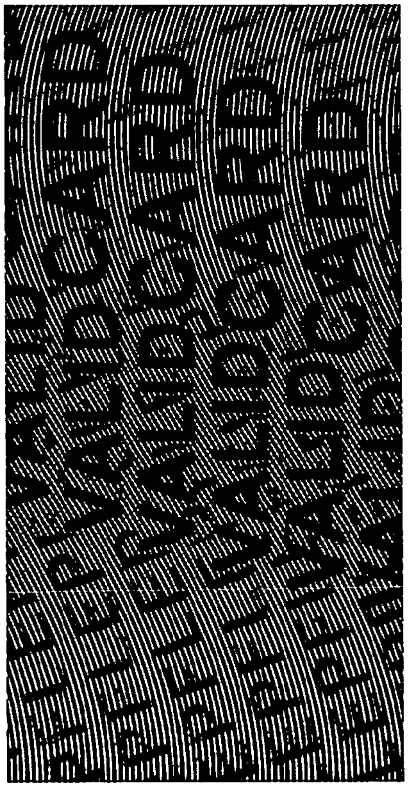

In order to generate a rectilinear moiré image with a cosinusoidal revealing layer, we transform the original base and revealing layer shown in FIGS. 12A and 12B. We want the superposition of the transformed base and revealing layer to yield the same rectilinear moiré image (FIG. 15C) as the moiré image formed by the original rectilinear layers (FIG. 12C), i.e. $m_1(x_t,y_t)=x_t$ and $m_2(x_t,y_t)=y_t$. We define the revealing layer transformation $$g_2(x_t,y_t)=y_t+c_1\cos(2\pi(x_t+c_3)/c_2) \quad (23)$$

with $c_1$, $c_2$ and $c_3$ representing constants and deduce from equations (22) the geometric transformation to be applied to the base layer, i.e.

$$h_1(x_t,y_t)=x_t+c_1\cos(2\pi(x_t+c_3)/c_2)(t_x/T_r)$$

$$h_2(x_t,y_t)=y_t+c_1\cos(2\pi(x_t+c_3)/c_2)(t_y/T_r) \quad (24)$$

We can move the revealing layer (FIG. 15B) up and down on top of the base layer (FIG. 15A), and the moiré image shapes (FIG. 15C) will simply be translated (FIG. 15D) without incurring deformations. We can verify that such a vertical translation does not, up to a translation, modify the resulting moiré image (presently an identity) by inserting into equations (21) the transformations $g_2$ (Eq. 23) and $h_1$, $h_2$ (Eqs. 24) and by replacing in $g_2(x_t,y_t)$ coordinate $y_t$ by its translated version $y_t+\Delta y_t$. We obtain $$m_1(x_t,y_t)=x_t-t_x\Delta y_t/(T_r-t_y) \text{ and}$$

$$m_2(x_t,y_t)=y_t-t_y\Delta y_t/(T_r-t_y) \quad (25)$$

i.e. the original moiré image is simply translated according to vector $t=(t_x,t_y)$, scaled by the relative vertical displacement $\Delta y_t/(T_r-t_y)$.

EXAMPLE B

Rectilinear Band Moiré Image and a Circular Revealing Layer

Figure 16A:
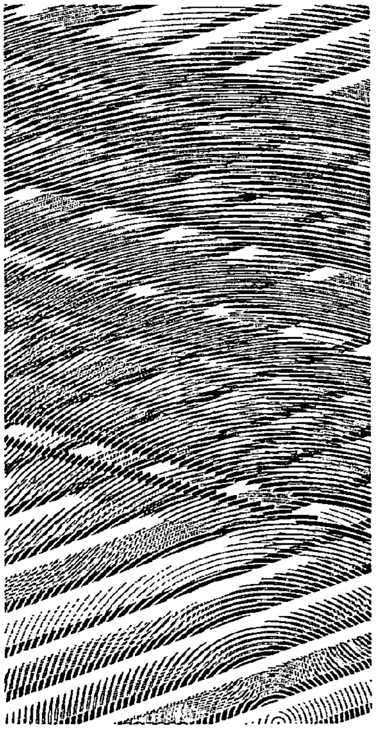
FIGS. 16A and 16B show respectively the geometrically transformed base and revealing layers of respectively FIG. 12A and 12B with a revealing layer transformation producing a circular revealing layer.
Figure 16B:
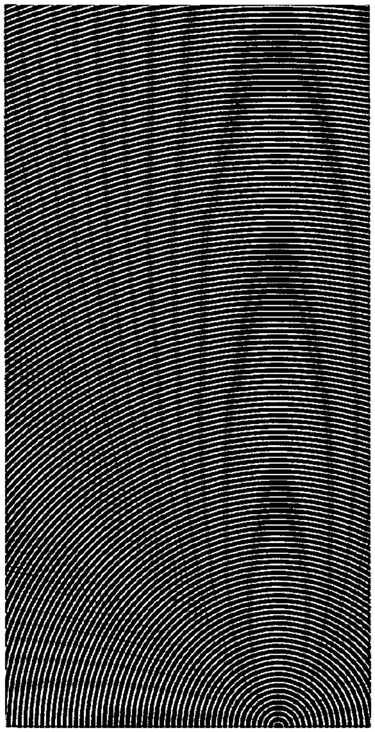

We introduce a revealing layer transformation yielding a perfectly circular revealing line grating (FIG. 16B)

$$g_2(x_t,y_t)=c_1\sqrt{(x_t-c_x)^2+(y_t-c_y)^2} \quad (26)$$

where $c_x$ and $c_y$ are constants giving the center of the circular grating and $c_1$ is a scaling constant. In order to obtain a rectilinear moiré image, we define the base layer transformations according to Eq. 22

$$h_1(x_t,y_t)=x_t+\left(c_1\sqrt{(x_t-c_x)^2+(y_t-c_y)^2}-y_t\right)\cdot\frac{t_x}{T_r} \quad (27)$$

$$h_2(x_t,y_t)=c_1\sqrt{(x_t-c_x)^2+(y_t-c_y)^2}\cdot\frac{t_y}{T_r}+y_t\cdot\frac{T_r-t_y}{T_r}$$

Figure 16C:
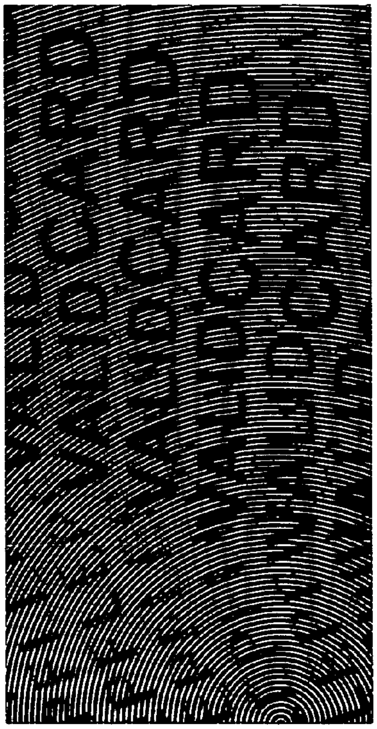
FIG. 16C shows the band moiré image induced by the exact superposition of the transformed layers shown in FIGS. 16A and 16B.
Figure 16D:
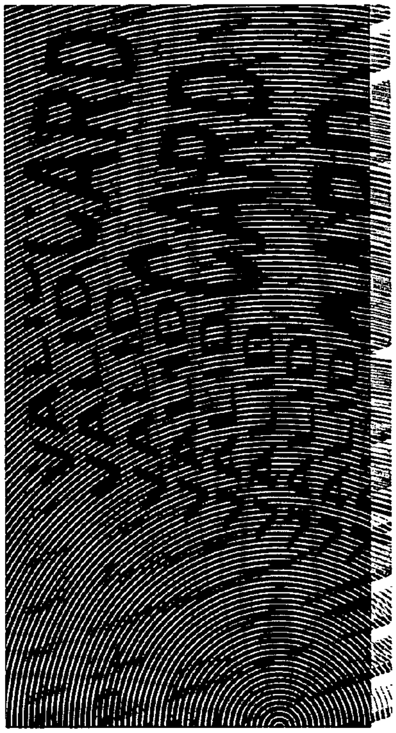
FIG. 16D shows the deformed moiré image induced by the superposition, when slightly translating the revealing layer (FIG. 16B) on top of the base layer (FIG. 16A)

The resulting base layer is shown in FIG. 16A. FIG. 16C, shows that the superposition of a strongly curved base band grating and of a perfectly circular revealing line grating yields the original rectilinear moiré image. However, as shown in FIG. 16D, a small displacement of the revealing layer, or equivalently a small relative displacement of the position sampled by the revealing layer on the base layer yields a clearly visible deformation (i.e. distortion) of the resulting band moiré image. Note that by varying parameters $c_1$, $c_x$ and $c_y$ one may create a large number of variants of the same transformation. Furthermore, by replacing in the preceding equations (26) and (27) beneath the square root $x_t-c_x$ by $(x_t-c_x)/a$ and $y_t-c_y$ by $(y_t-c_y)/b$, where a and b are freely chosen constants, one may extend this example to elliptic revealing line gratings.

Examples A and B show that rectilinear moiré images can be generated with curvilinear base and revealing layers. Let us now show examples where thanks to the band moiré image layout model, we can obtain curvilinear moiré images which have the same layout as predefined reference moiré images.

EXAMPLE C

Circular Band Moiré Image and Rectilinear Revealing Layer

Figure 17A:
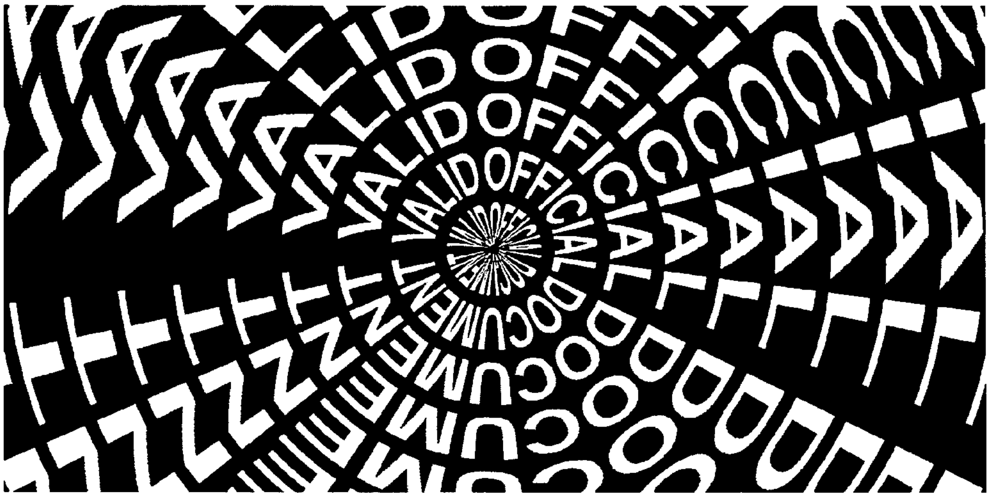
FIGS. 17A shows a reference band moiré image layout and FIG. 17B the corresponding band moiré image with the same layout, obtained thanks to the band moiré layout model.
Figure 18A:
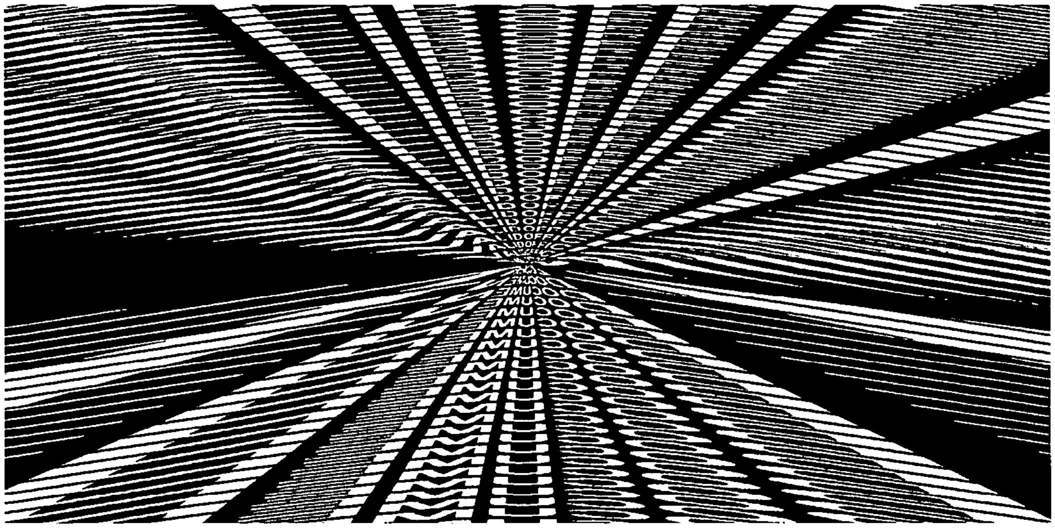
FIG. 18A shows the transformed base layer computed according to the band moiré layout model and FIG. 18B the rectilinear revealing layer used to generate the moiré image shown in FIG. 17B.
Figure 18B:
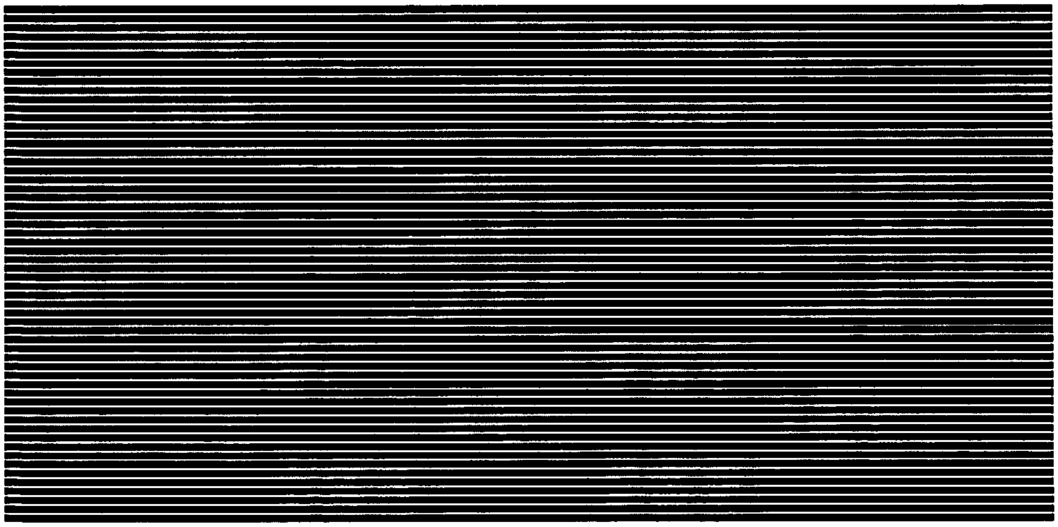

In the present example, we choose a circular moiré image and also freely choose the revealing layer layout. The desired reference circular moiré image layout is given by the transformation mapping from transformed moiré space back into the original moiré space, i.e.

$$x=m_1(x_t,y_t)=\frac{\pi-\operatorname{atan}(y_t-c_y,x_t-c_x)}{2\cdot\pi}\cdot w_x \quad (28)$$

$$y=m_2(x_t,y_t)=c_m\sqrt{(x_t-c_x)^2+(y_t-c_y)^2}$$

where constant $c_m$ expresses a scaling factor, constants $c_x$ and $c_y$ give the center of the circular moiré image layout in the transformed moiré space, $w_x$ expresses the width of the original rectilinear reference band moiré image and function atan(y,x) returns the angle $\alpha$ of a radial line of slope y/x, with the returned angle $\alpha$ in the range $(-\pi<=\alpha<=\pi)$. The corresponding desired reference circular moiré image is shown in FIG. 17A. We take as revealing layer a rectilinear layout identical to the original rectilinear revealing layer, i.e. $g_2(x_t,y_t)=y_t$. This rectilinear revealing layer is shown in FIG. 18B. By inserting the curvilinear moiré image layout equations (28) and the curvilinear revealing layer layout equation $g_2(x_t,y_t)=y_t$ into the band moiré layout model equations (22), one obtains the deduced curvilinear base layer layout equations $$h_1(x_t, y_t) = \left(y_t - c_m\sqrt{(x_t-c_x)^2+(y_t-c_y)^2}\right)\cdot\frac{t_x}{T_r} + \frac{\pi - \operatorname{atan}(y_t-c_y, x_t-c_x)}{2\cdot\pi}\cdot w_x \tag{29}$$

$$h_2(x_t, y_t) = c_m\sqrt{(x_t-c_x)^2+(y_t-c_y)^2}\cdot\frac{T_r-t_y}{T_r} + y_t\cdot\frac{t_y}{T_r}$$

Figure 17B:

These curvilinear base layer layout equations express the geometric transformation from transformed base layer space to the original base layer space. The corresponding curvilinear base layer in the transformed space is shown in FIG. 18A. The resulting moiré image formed by the superposition of the base layer (FIG. 18A) and of the revealing layer (FIG. 18B) is shown in FIG. 17B. When the revealing layer (FIG. 18B) is moved over the base layer (FIG. 18A), the corresponding circular moiré image shapes move radially and change their shape correspondingly. In the present example, the text letter width becomes larger or smaller, depending if the letters move respectively towards the exterior or the interior of the circular moiré image. In a similar manner as in example B, the present example may be easily generalized to elliptic band moiré images.

EXAMPLE D

Curvilinear Band Moiré Image and Cosinusoidal Revealing Layer

Figure 19A:
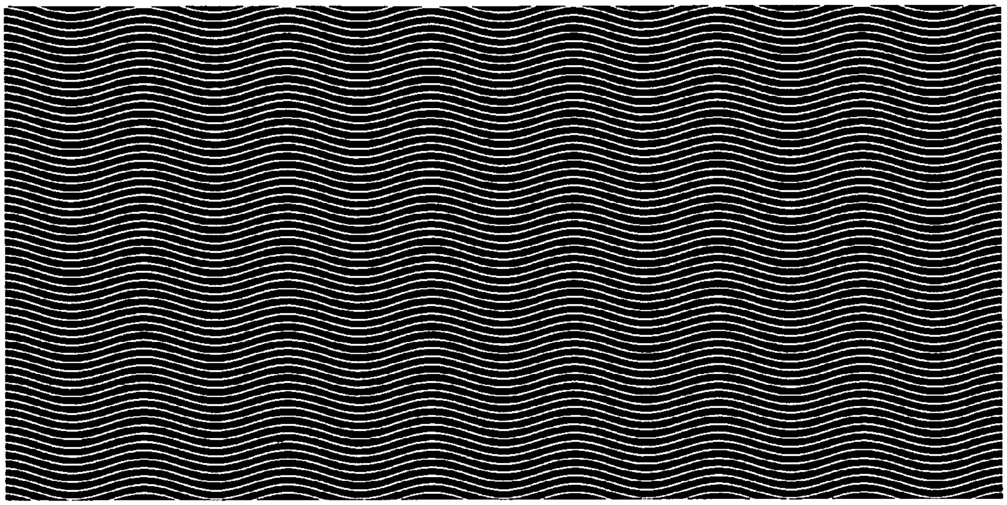
FIG. 19A shows a cosinusoidal revealing layer and FIG. 19B a base layer transformed according to the band moiré layout model.

Let us now take a curvilinear revealing layer and still generate the same desired curvilinear moiré image as in the previous example (reference band moiré image shown in FIG. 17A). As example, we take as curvilinear revealing layer a cosinusoidal layer whose layout is obtained from the rectilinear revealing layer by a cosinusoidal transformation $$g_2(x_t,y_t)=y_t+c_1\cos(2\pi x_t/c_2) \tag{30}$$

where constants $c_1$ and $c_2$ give respectively the amplitude and period of the cosinusoidal transformation. The corresponding cosinusoidal revealing layer is shown in FIG. 19A. By inserting the curvilinear moiré image layout equations (28) and the curvilinear revealing layer layout equation (30) into the band moiré layout model equations (22), one obtains the deduced curvilinear base layer layout equations $$h_1(x_t, y_t) = \left(y_t + c_1\cos\left(\frac{2\pi x_t}{c_2}\right) - c_m\sqrt{(x_t-c_x)^2+(y_t-c_y)^2}\right)\cdot\frac{t_x}{T_r} + \frac{\pi - \operatorname{atan}(y_t-c_y, x_t-c_x)}{2\cdot\pi}\cdot w_x \tag{31}$$

$$h_2(x_t, y_t) = c_m\sqrt{(x_t-c_x)^2+(y_t-c_y)^2}\cdot\frac{T_r-t_y}{T_r} + \left(y_t + c_1\cos\left(\frac{2\pi x_t}{c_2}\right)\right)\cdot\frac{t_y}{T_r}$$

Figure 19B:
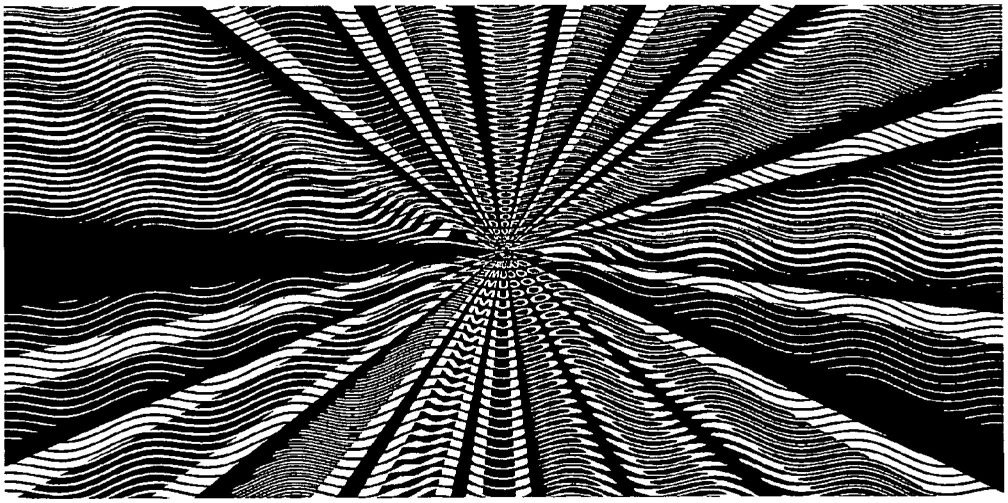
Figure 20:
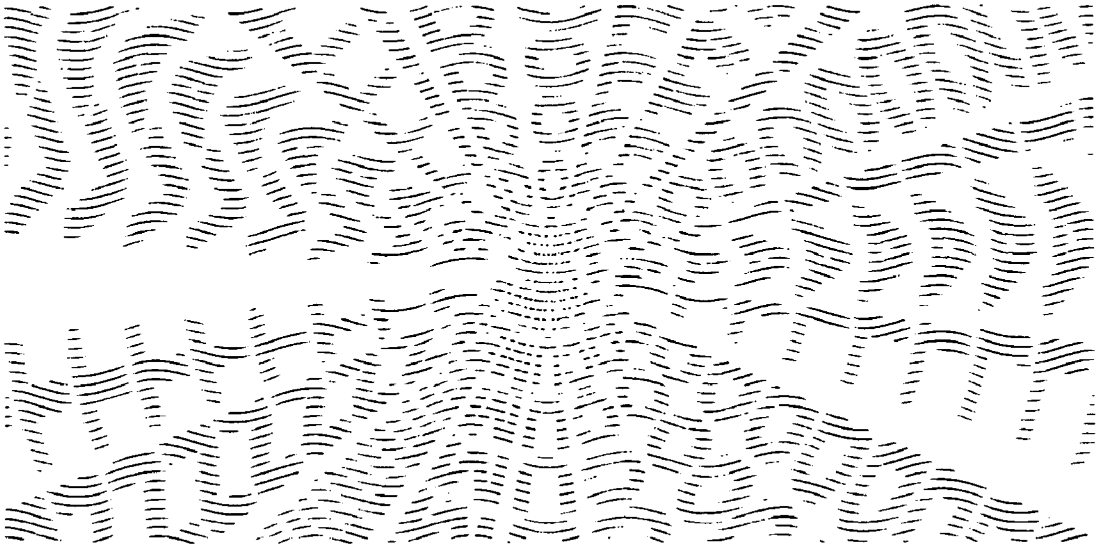
FIG. 20 shows the resulting band moiré image which has the same layout as the desired reference moiré image shown in FIG. 17A.

These curvilinear base layer layout equations express the geometric transformation from the transformed base layer space to the original base layer space. The corresponding curvilinear base layer is shown in FIG. 19B. The superposition of the curvilinear base layer (FIG. 19B) and curvilinear revealing layer (FIG. 19A) is shown in FIG. 20. When the revealing layer (FIG. 19A) is moved vertically over the base layer (FIG. 19B), the corresponding circular moiré image patterns move radially and change their shape correspondingly, as in example C. However, when the revealing layer (FIG. 19A) is moved horizontally over the base layer (FIG. 19B), the circular moiré patterns become strongly deformed. After a horizontal displacement equal to the period $c_2$ of the cosinusoidal revealing layer transformation, the circular moiré patterns have again the same layout and appearance as in the initial base and revealing layer superposition, i.e. the deformation fades away as the revealing layer reaches a horizontal position close to an integer multiple of period $c_2$. This yields a moiré image which deforms itself periodically upon horizontal displacement of the revealing layer in superposition with the base layer. Note that the dynamicity of the band moiré image shapes relies on the types of geometric transformations applied to generate the base and revealing layer in the transformed space and not, as in U.S. patent application Ser. No. 10/270,546 (Hersch, Chosson) on variations of the shapes embedded within the base band layer. The present example may also easily be generalized to elliptic band moiré images.

EXAMPLE E

Figure 21:
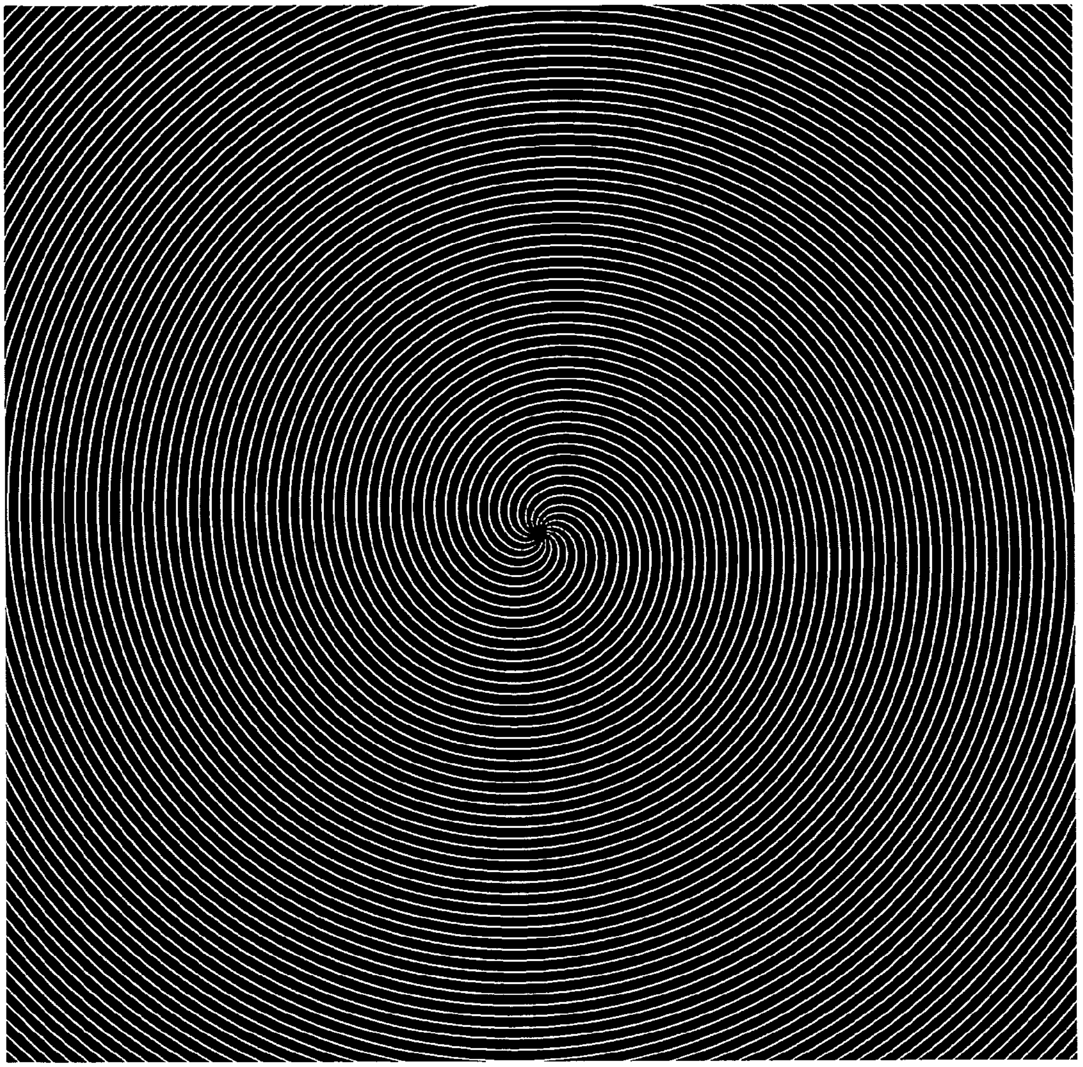
FIG. 21 shows a spiral shaped revealing layer.

Circularly Transformed Band Moiré Image Generated with a Spiral Shaped Revealing Layer Let us show a further example relying on the band moiré layout model in order to obtain a circularly transformed moiré image. We choose as revealing layer layout a spiral shaped revealing layer. The desired reference circular moiré image layout is given by the geometric transformation described by Eqs. (28) which transform from transformed moiré space back into the original moiré space. The spiral shaped revealing line grating layout (FIG. 21) comprising multiple spirals is expressed by the following transformation mapping from transformed space to original space $$y = g_2(x_t, y_t) = c_m\sqrt{(x_t-c_x)^2+(y_t-c_y)^2} + \frac{\pi + \operatorname{atan}(y_t-c_y, x_t-c_x)}{2\cdot\pi}T_r\cdot n_s \tag{32}$$

where $c_x$ and $c_y$ are constants giving the center of the spiral line grating, $c_m$ is the scaling factor (same as in Eq. 28), $T_r$ is the revealing line grating period in the original space and $n_s$ is the number of spirals leaving the center of the spiral line grating. By inserting the curvilinear moiré image layout equations (28) and the spiral shaped revealing layer layout equation (32) into the band moiré layout model equations (22), one obtains the deduced the curvilinear base layer layout equations $$h_1(x_t, y_t) = \frac{\pi + \operatorname{atan}(y_t-c_y, x_t-c_x)}{2\cdot\pi}\cdot(w_x + t_x\cdot n_s) \tag{33}$$

$$h_2(x_t, y_t) = c_m\sqrt{(x_t-c_x)^2+(y_t-c_y)^2} + \frac{\pi + \operatorname{atan}(y_t-c_y, x_t-c_x)}{2\cdot\pi}\cdot t_y\cdot n_s\cdot$$

Figure 22:
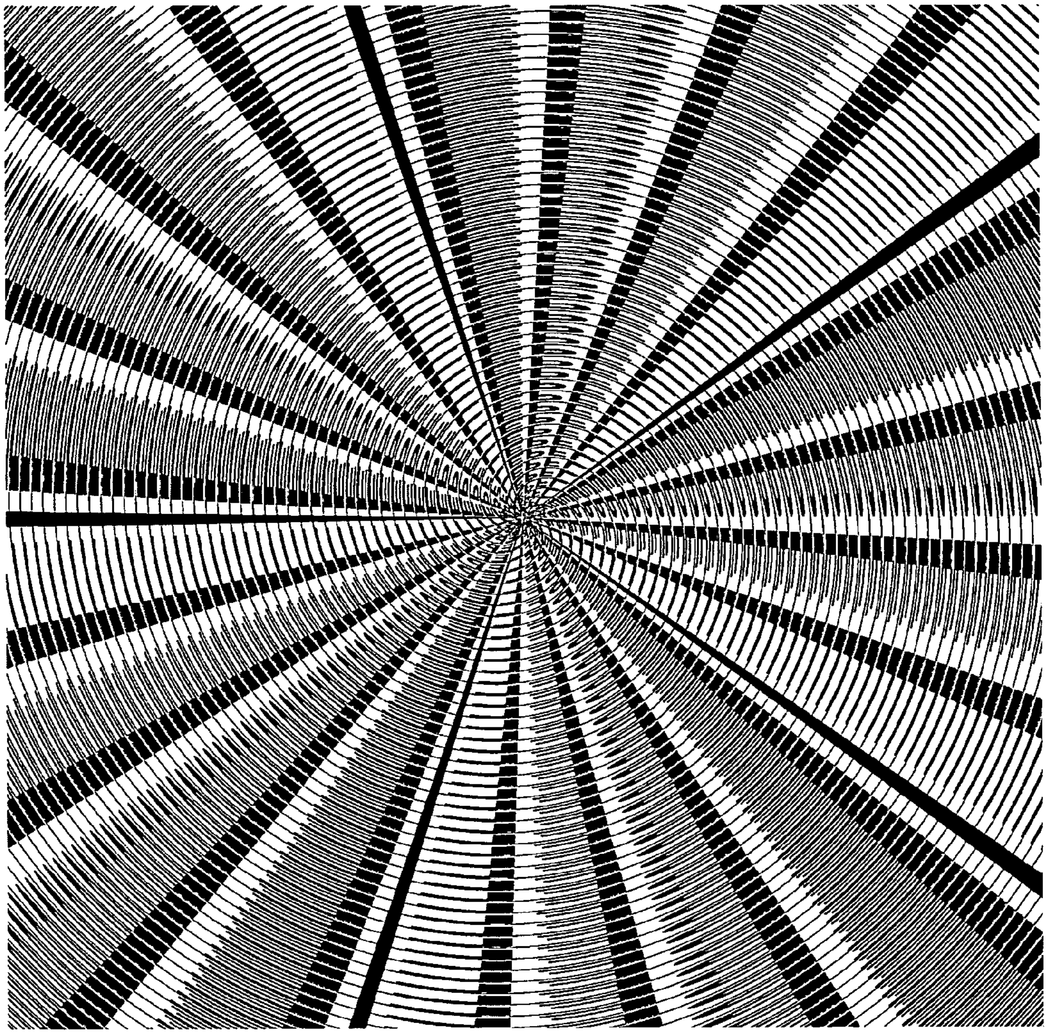
FIG. 22 shows the curvilinear base layer computed so as to form, when superposed with the spiral shaped revealing layer of FIG. 21 a circular band moiré image.
Figure 23:
FIG. 23 shows the circular band moiré image obtained when superposing the revealing layer of FIG. 21 and the base layer of FIG. 22.

These curvilinear base layer layout equations express the geometric transformation from the transformed base layer space to the original base layer space. They completely define the layout of the base band grating layer (FIG. 22)

which, when superposed with the revealing layer (FIG. 21) whose layout is defined by Eq. (32) yield a circular band moiré image (FIG. 23), with a layout defined by Eq. (25). FIG. 23 shows the curvilinear moiré image obtained when superposing exactly the origin the coordinate system of the revealing layer on the origin of the coordinate system of the base layer. When rotating the revealing layer in superposition with the base layer around its center point given by coordinates $(c_x,c_y)$, a dynamic band moiré image is created with band moiré image shapes moving toward the exterior or the interior of the circular band moiré image, depending if respectively a positive or a negative rotation is applied. For the sake of simplicity, we considered in the preceding examples mainly transformations yielding circular revealing, base or moiré image layers. As described in some of the examples, by inserting into the formula instead of the radius of a circle $$\sqrt{(x_t-c_x)^2+(y_t-c_y{}^2}$$

the corresponding distance from the center to a point $(x_t,y_t)$ of an ellipse $$\sqrt{\left(\frac{x_t-c_x}{a}\right)^2+\left(\frac{y_t-c_y}{b}\right)^2}$$

where a and b are freely chosen constants, the considered concentric circular layers may be extended to form concentric elliptic layers. We therefore call "concentric layouts" both the circular and the elliptic layouts.

EXAMPLE F

Circularly Transformed Band MoiréImage Moving Circularly

Figure 25:
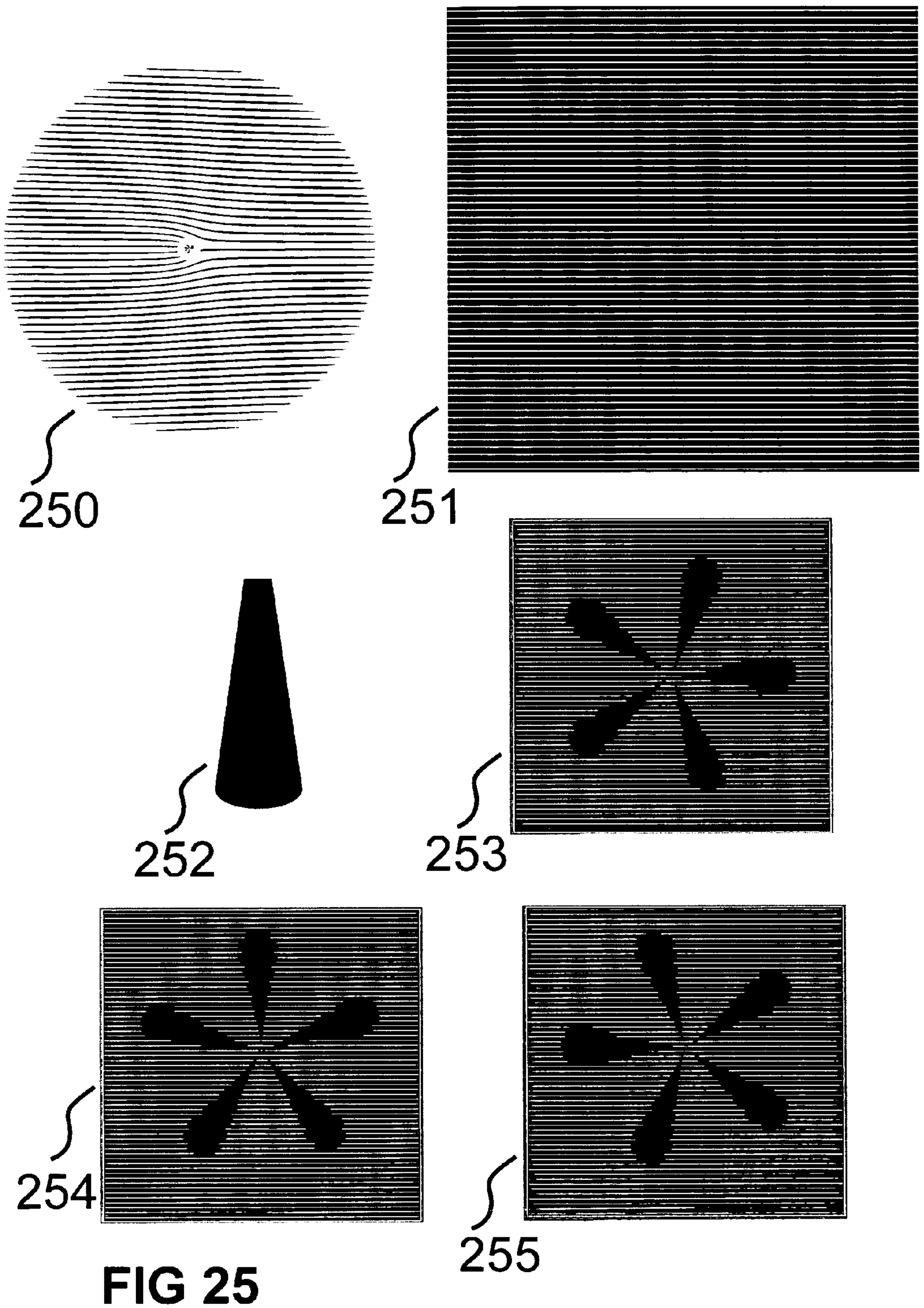
FIG. 25 illustrates a base layer 250 and a revealing layer 251, which, when displacing the position sampled by the revealing layer on the base layer yields flower petals (252) moving circularly across positions 253, 254 and 255, i.e. tangentially to the circular flower petal layout.

One may generate a moiré image having for example the same circular layout as in Examples C and D, but which, instead of moving radially when displacing the revealing layer in superposition with the base layer, moves circularly, i.e. along the tangent of the circular moiré layout. When displacing the revealing layer (e.g. FIG. 25, 251) in superposition with the base layer (e.g. FIG. 25, 250), e.g. vertically, the replicated flower petal (252) moiré image pattern moves circularly, as shown in snapshots 253, 254 and 255. In that example, the moiré image moves in counter-clockwise rotation around the center of the circular transformation. To generate the base layer, we apply respectively the same geometric transformations as in examples C (rectilinear revealing layer) and D (cosinusoidal revealing layer). However, in the present case, the initial non-transformed base layer is generated so as to yield a horizontal moiré displacement when displacing vertically the horizontally laid out revealing line grating layer in superposition with the non-transformed base layer. This is carried out with a horizontal base band replication vector $t=(\lambda,0)$ section "The geometry of rectilinear Band Moiré Images". A horizontal moiré displacement in the original non transformed space corresponds in the present example to a circular displacement, i.e. a rotation, in the circularly transformed moiré space. Similar considerations apply for the generation of elliptic moirélayouts, i.e. for moirés displacing themselves along elliptic trajectories, i.e. tangential to the elliptic moiré layout. By choosing slightly oblique displacement vectors $t=(\lambda,t_y)$, with $t_y>0$, in the non-transformed base layer space, one may generate moiré patterns moving along spiral trajectories, i.e. trajectories which are in between a radial trajectory and a trajectory which is tangential to the geometrically transformed moirélayout (e.g. tangential to a circle for a circular layout, tangential to an ellipse for an elliptic layout, etc.).

The previous examples show that thanks to the band moiré layout model, we are able to compute the exact layout of curvilinear base and revealing layers so as to generate a desired rectilinear or curvilinear moiré image of a given predefined layout. They also show that unexpected moiré displacements occur, such as radial or circular moiré displacements, when displacing the revealing layer in superposition with the base layer. Note that as described in the section below "Embodiments of base and revealing layers", the displacement between base and revealing layer may be an apparent displacement induced by the movement of the eye across a composed layer whose revealing layer and base layer are separated by a small gap. The movement of the eye across the composed layer, or equivalently, tilting the composed layer in respect to an observer, yields a relative displacement of the position sampled by the revealing layer on the base layer.

Perspectives Offered by the Band MoiréLayout Model

The relationships between geometric transformations applied to the base and revealing layers and the resulting geometric transformation of the band moiré image (see Eqs. (21) and (22)), represent a model for describing the layout of the band moiré image as a function of the layouts of the base band grating and of the revealing line grating. By applying this model one may compute the base and/or the revealing layer layouts, i.e. the geometric transformations to be applied to the original rectilinear base and/or revealing layers in order to obtain a reference moiré image layout, i.e. a moiré image layout according to a known geometric transformation applied to the original rectilinear band moiré image.

The examples presented in the previous sections represent only a few of the many possible transformations that may be applied to the moiré layer, to the base layer and/or to the revealing layer. Many other transformations can be applied, for example transformations which may produce zone plate gratings [Oster 64], hyperbolic sine gratings, or gratings mapped according to conformal transformations.

In more general terms, any continuous function of the type $f(x_t,y_t)$ is a candidate function for the functions $g_2(x_t,y_t)$, $h_2(x_t,y_t)$, and/or $m_2(x_t,y_t)$. Only a more detailed analysis of such candidate functions enables verifying if they are usable in the context of geometric layer transformations, i.e. if they yield, at least for certain constants and within given regions of the transformed space, base bands, revealing lines and moiré bands suitable for document authentication. A catalogue of implicit functions $f(x_t,y_t)=c$, where c represents a constant, usable as candidate geometric transformation functions can be found in the book "Handbook and Atlas of Curves", by Eugene V Shikin, CRC Press, 1995 or on pages 319-329 of the book "Handbook of Mathematics and Computational Science" by J. W. Harris and H Stocker, published by Springer Verlag in 1998.

A library of suitable functions $f(x_t,y_t)$ with corresponding constant ranges may be established, for example for the transformation $(m_1(x_t,y_t),\ m_2(x_t,y_t))$ transforming a band moiré image from transformed space to original space and for the transformation $g_2(x_t,y_t)$ transforming a revealing line grating from transformed space to original space. Once a library of transformation functions is established, which comprises for each transformation corresponding ranges of constants, thousands of different layouts become available for the band moiré image layout, the revealing line grating layout and according to Eq. (22) for the base band layer layout.

The very large number of possible geometric transformations for generating curvilinear base band layers and curvilinear revealing line gratings enables synthesizing many variants of individualized base and revealing layers.

Multichromatic Base Band Patterns

The present invention is not limited only to the monochromatic case. It may largely benefit from the use of different colors for producing the patterns located in the bands of the base layer.

One may generate colored base bands in the same way as in standard multichromatic printing techniques, where several (usually three or four) halftoned layers of different colors (usually: cyan, magenta, yellow and black) are superposed in order to generate a full-color image by halftoning. By way of example, if one of these halftoned layers is used as a base layer according to the present invention, the band moiré patterns that will be generated with a revealing transparent line grating will closely approximate the color of this base layer. If several different colored layers are used for the base band according to the present invention, they will generate when superposed with a revealing transparent line grating a band moiré pattern approximating the color resulting from the superposition of these different colored layers.

Synthesis of Dynamically Evolving Shape Level Lines

Most of the following shape level lines synthesizing methods are disclosed in parent patent application Ser. No. 11/149,017. They show how to embed a shape elevation profile into a base layer, which upon superposition of the revealing layer, generates dynamically evolving shape level lines moving between the borders of the shape towards both the skeleton of the shape foreground and the skeleton of the shape background.

A spatial elevation profile is a function of the type $z=f(x,y)$, where z is the elevation and x and y are the spatial coordinates. The spatial elevation profile may be continuous or non-continuous. It associates to each spatial coordinate (x,y) a single elevation z. The spatial coordinates (x,y) may represent a discrete grid, e.g. the spatial locations of pixels within a pixmap image.

Figure 26:
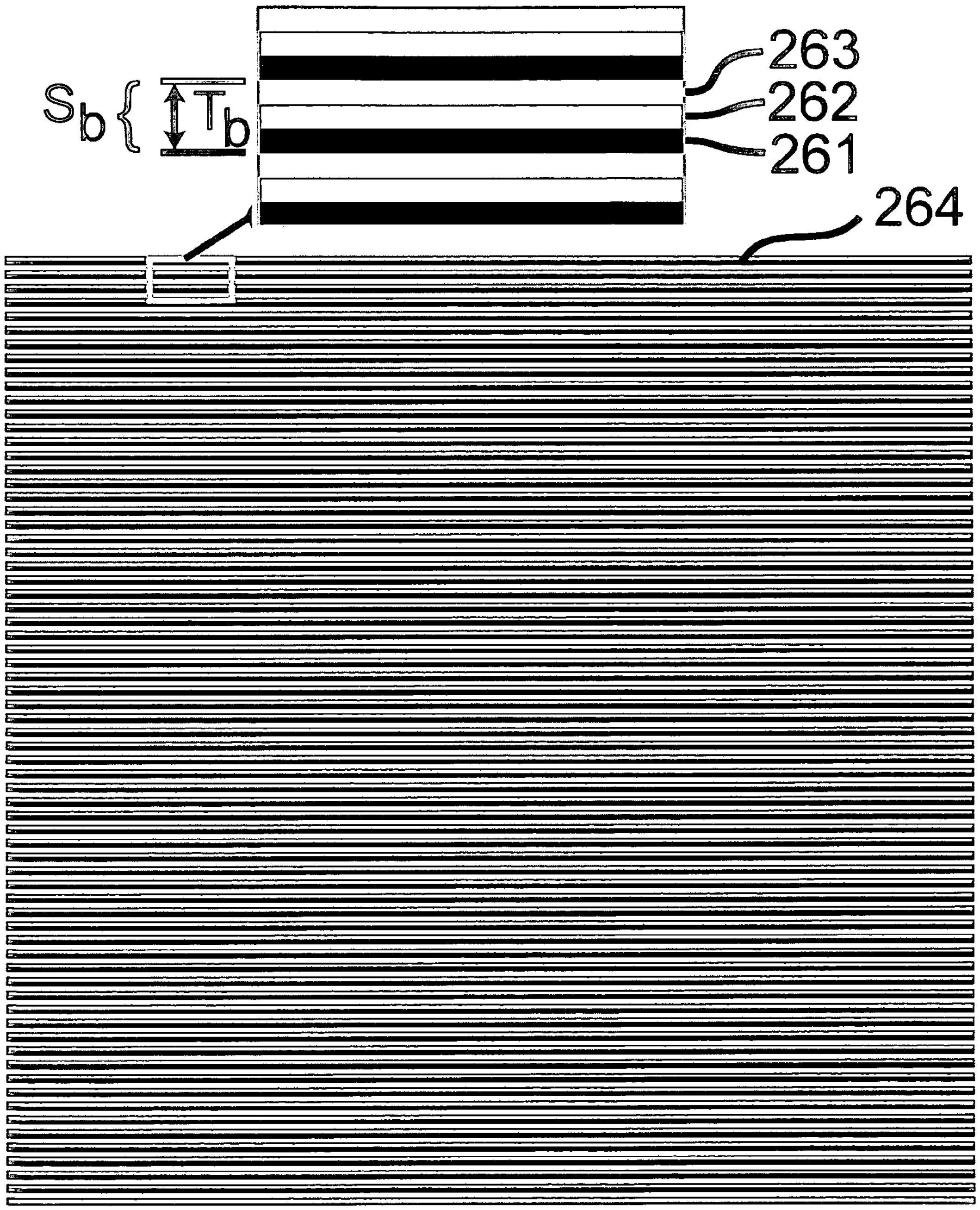
FIG. 26 shows an original non-modified base layer made of repeated sets of lines, each set comprising lines having each one their specific intensity or color.
Figure 27:
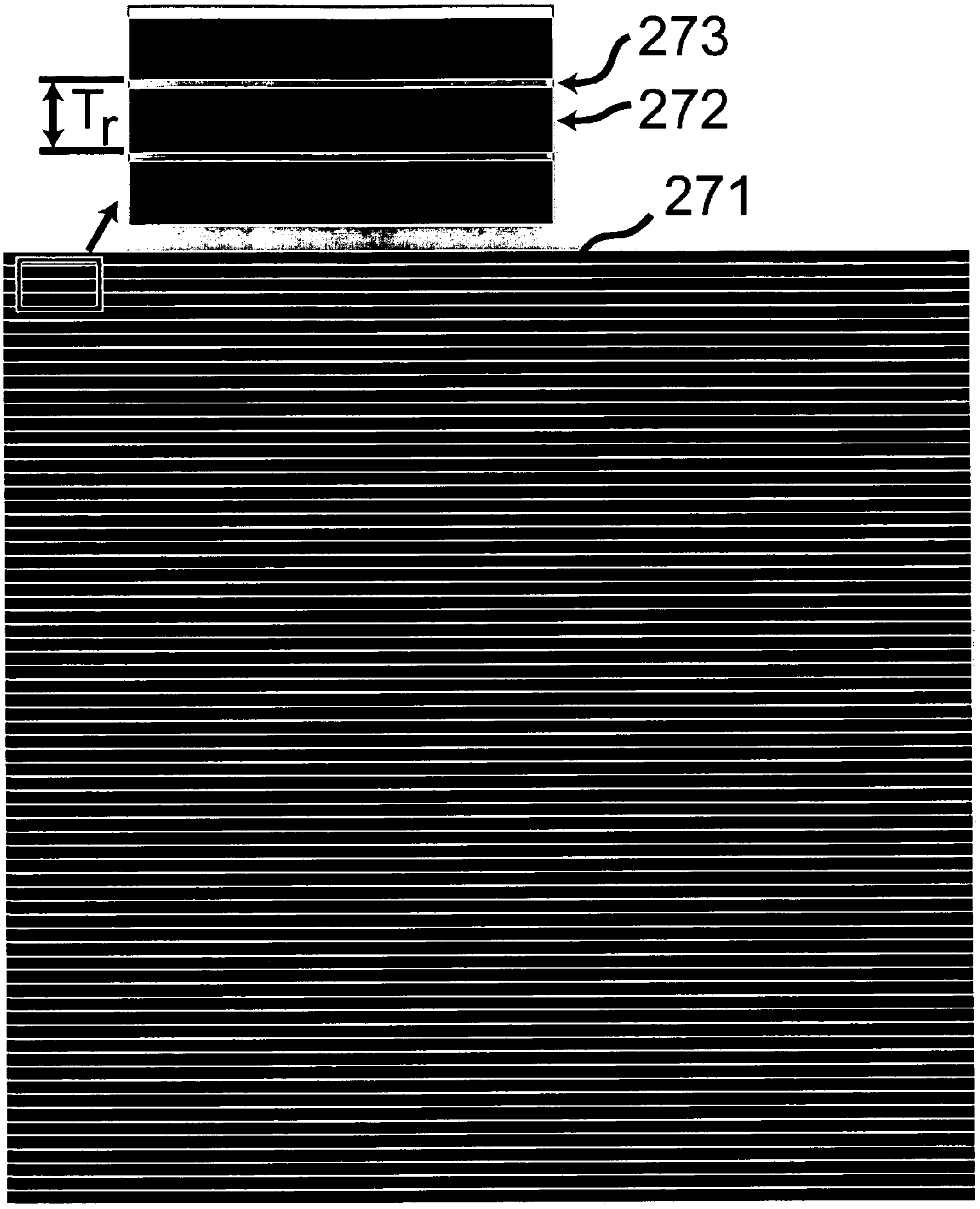
FIG. 27 shows a revealing layer formed by a grating of transparent lines.
Figure 28A:
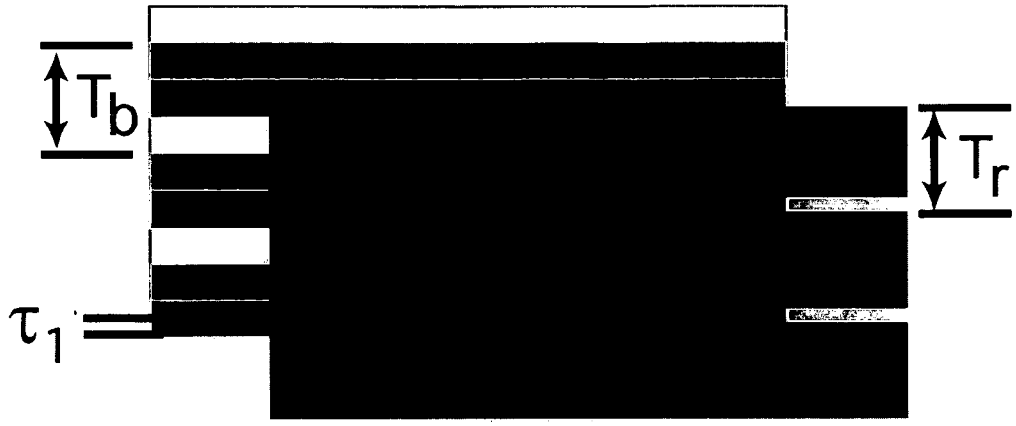
FIGS. 28A, 28B and 28C show the superposition of the base layer and the revealing layer according to different relative superposition phases between base layer and revealing layer.
Figure 28B:
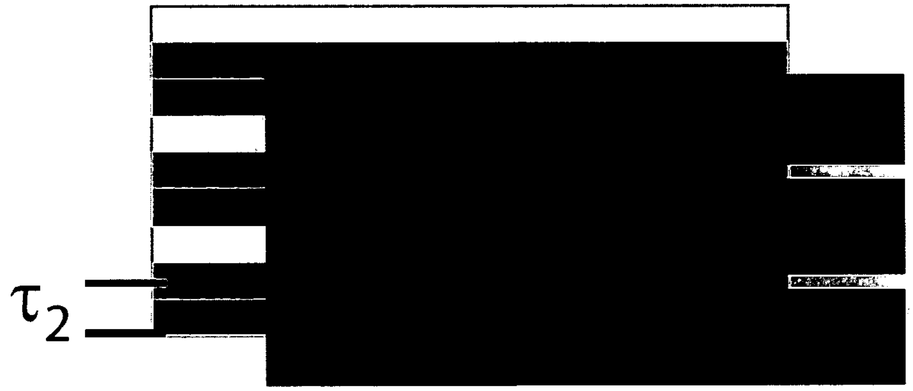
Figure 28C:
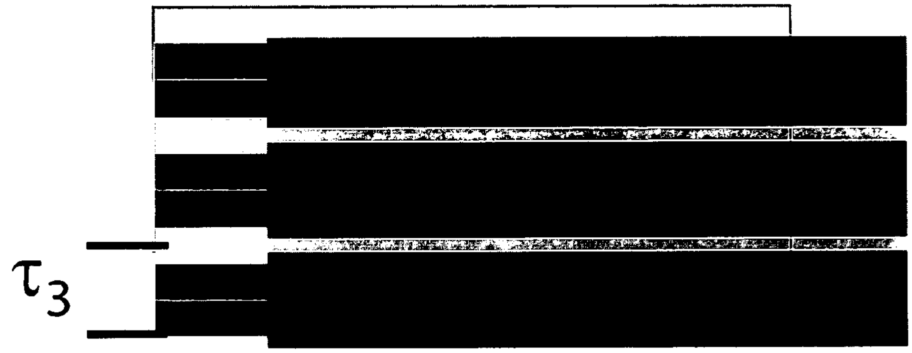

Let us consider an initial base layer is made of repetitive sets $S_b$ of lines (FIG. 26, 264). The individual lines (e.g. in FIG. 26, 261, 262, 263) of the set of lines $S_b$ each each have their specific intensity or respectively color. The revealing layer is a line grating $G_r$ (FIG. 27, 271) embodied by transparent lines (FIG. 27, 273) on a substantially opaque surface 272, for example transparent lines on a black film, imaged on a phototypesetter (or imagesetter). The revealing layer line grating may also be embodied by lenticular lenses where each lenticule (cylindrical lens) corresponds to one transparent line. Both the base layer sets of lines and the revealing line grating may also be embodied by a diffractive device. In a preferred embodiment, the period $T_b$ of the set of lines $S_b$ (FIG. 26) and the period $T_r$ of the revealing line grating $G_r$ (FIG. 27) are identical. When the base layer's periodic set of lines is superposed with the revealing layer's line grating, depending on the relative superposition phase $\tau_r$ between the base layer and the revealing layer, only one line or a subset of lines from each set of lines appears through the transparent lines of the revealing layer. The relative position of the revealing layer transparent line and the boundary of the base layer's set of lines represents the relative superposition phase $\tau_r$ at which base layer and revealing layer are superposed. The superposition of the base layer (FIG. 26) and of the revealing layer (FIG. 27) yields a constant intensity respectively constant color which corresponds to the intensity respectively color of the lines appearing through the transparent revealing layer lines (e.g. black in FIG. 28A, gray in FIG. 28B and white in FIG. 28C). When translating the revealing layer in superposition with the base layer, the intensity respectively color of the lines situated below the transparent lines changes and the resulting intensity respectively color of the uniform superposition image therefore also changes. At different relative superposition phases $\tau_1, \tau_2, \ldots, \tau_n$ (e.g. FIGS. 28A, 28B, 28C) lines of different intensities, respectively colors are selected. Accordingly, a superposition image of the corresponding intensity, respectively color appears. For example, in FIG. 28A, the relative superposition phase $\tau_1$ yields a "black" superposition image, in FIG. 28B, relative superposition phase $\tau_2$ yields a "gray" superposition image and in FIG. 28C relative superposition phase $\tau_3$ yields a "white" superposition image. The intensity, respectively color of the superposition image refers to the intensity, respectively color located beneath the transparent revealing lines of the revealing line grating.

Spatial Elevation Profile Embedded into the Base Layer Sets of Lines

Without loss of generality, let us assume that both the base layer lines and the revealing layer lines are horizontal, i.e. parallel to the x-axis. We generate a modified base layer sets of lines (also called modified base layer or modified sets of lines) embedding a spatial elevation profile. Embedding the spatial elevation profile into the base layer image consists in traversing all positions (x,y) of the modified base layer, and at each current position (x,y), in obtaining the corresponding elevation value $z=f(x,y)$ of the elevation profile. The elevation value z is used to read the intensity, respectively color, c at the current position (x,y) shifted by an amount proportional to the elevation value, e.g. at position (x,y−z) within the initial unmodified base layer sets of lines and to write that intensity, respectively color c at the current position (x,y) within the modified base layer. In the resulting modified base layer, the initial non-modified sets of lines are shifted at each position according to the elevation profile of that position, yielding modified repeated sets of lines. The preferred shift orientation is perpendicular to the orientation of the lines forming the sets of lines of the initial unmodified base layer. However, other shift orientations are possible.

When superposing the revealing layer in superposition with the base layer, the transparent lines of the revealing layer reveal from the base layer as constant intensity, respectively constant color, the positions (x,y) having a constant relative phase between base layer sets of lines and revealing layer lines. Within the modified base layer, constant relative phase elements are elements which have been shifted by the same amount, i.e. according to the same elevation profile value. Therefore, the modified base layer superposed with the revealing line grating yields the level lines of the spatial elevation profile.

The rule expressed in Eq. (34) governs the relationship between the current elevation value $\epsilon(x,y)$ of the elevation profile, the current phase $\tau_s(x,y)$ sampled by the revealing layer lines within the original sets of lines and the current relative superposition phase $\tau_r$ between revealing layer lines and base layer sets of lines:

$$(\tau_r-\epsilon)\bmod T=\tau_s \qquad (34)$$

where T=1 is the normalized replication period of the base layer sets of lines and also the normalized replication period of the revealing layer line grating and where phases $\tau_s$ and $\tau_r$ as well as the elevation profile $\epsilon$ are expressed as values modulo-1, i.e. between 0 and 1. Clearly, at a specific relative superposition phase $\tau_r$ between the base layer sets of lines and the revealing layer line grating, a line of a given intensity or color located at phase $\tau_s$ within the set of original base layer lines is displayed as a constant elevation line $\epsilon=\epsilon_{const}$. When the revealing line grating moves in superposition with the base layer, i.e. the relative phase $\tau_r$ increases, or respectively decreases, then the base layer line of constant phase $\tau_s$ is sampled by the revealing lines at an increasing, respectively decreasing elevation $\epsilon$. Therefore, by moving the revealing layer in superposition with the base layer, a level line animation is created, where level lines move towards increasing or decreasing elevation values, thereby in the general case shrinking or growing, i.e. forming lines which look like offset lines of the initial motif shape boundaries from which the elevation profile is derived (see section "Synthesis of a shape elevation profile"). As an example, superpose the revealing layer of FIG. 27, printed on a transparent sheet in superposition with the modified base layer shown in FIG. 37, and move the revealing layer vertically. Growing and shrinking level lines appear which displace themselves towards increasing or decreasing elevation values of the elevation profile shown in FIG. 36A. When comparing the moving level lines with the motif shape boundaries from which the elevation profile is derived, the level lines move from the motif shape boundaries towards its foreground and background centers.

Figure 29A:
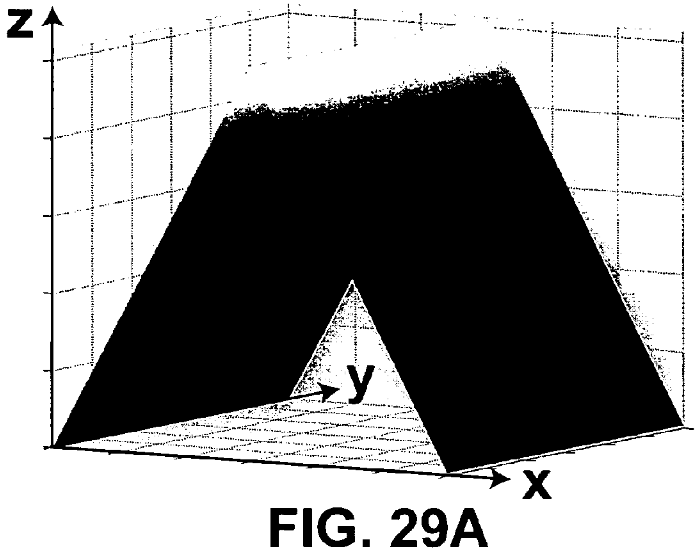
FIG. 29A shows an example of an elevation profile.
Figure 29B:
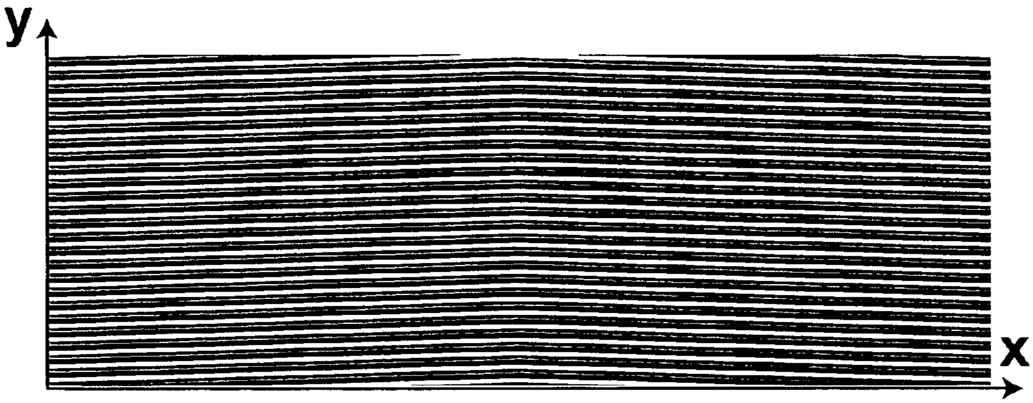
FIG. 29B shows the correspondingly modified base layer.
Figure 29C:
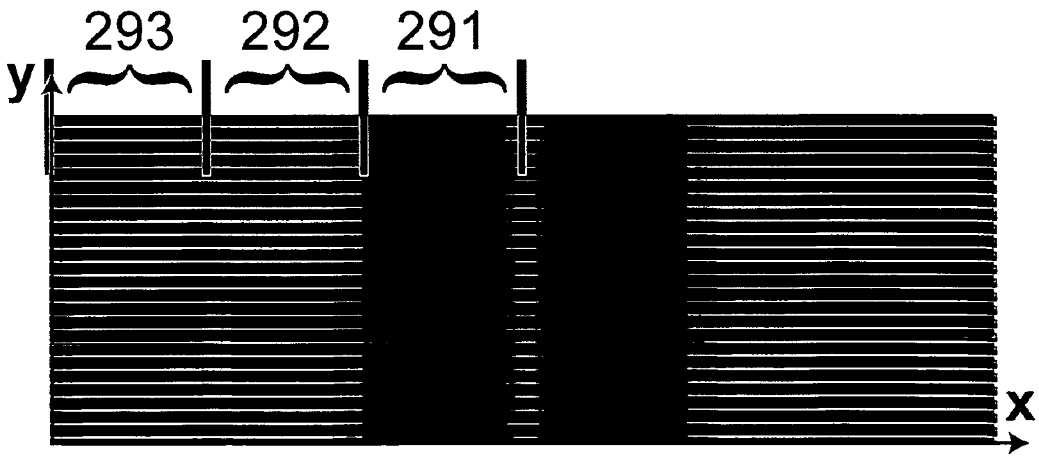
FIG. 29C shows the level lines of the elevation profile obtained by the superposition of the base layer shown in FIG. 29B and of the revealing layer shown in FIG. 27.

As an example, FIG. 29B shows a modified base layer embedding the triangular elevation profile shown in FIG. 29A. When superposed with the revealing layer shown in FIG. 27, we obtain the level lines (FIG. 29C) of the triangular elevation profile, in the present case formed by lines perpendicular to the initial unmodified base layer sets of lines (FIG. 26). As shown in FIG. 29B, the base layer black (261 in FIG. 26), gray (262 in FIG. 26) and white (263 in FIG. 26) lines forming one set of the base layer sets of lines appear in the superposition, as shown in FIG. 29C as black 291, gray 292 and white 293 level lines.

Figure 30A:
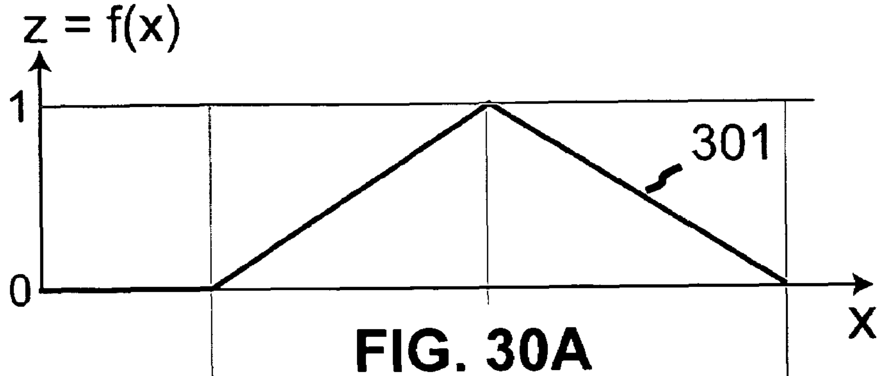
FIG. 30A shows schematically an elevation profile, FIG. 30B a base layer composed of sets of 3 lines each, modified according to the elevation profile and FIG. 30C the level lines obtained by superposing the revealing line grating on top of the base layer at the relative phase $\tau_r = 1/6$.
Figure 30B:
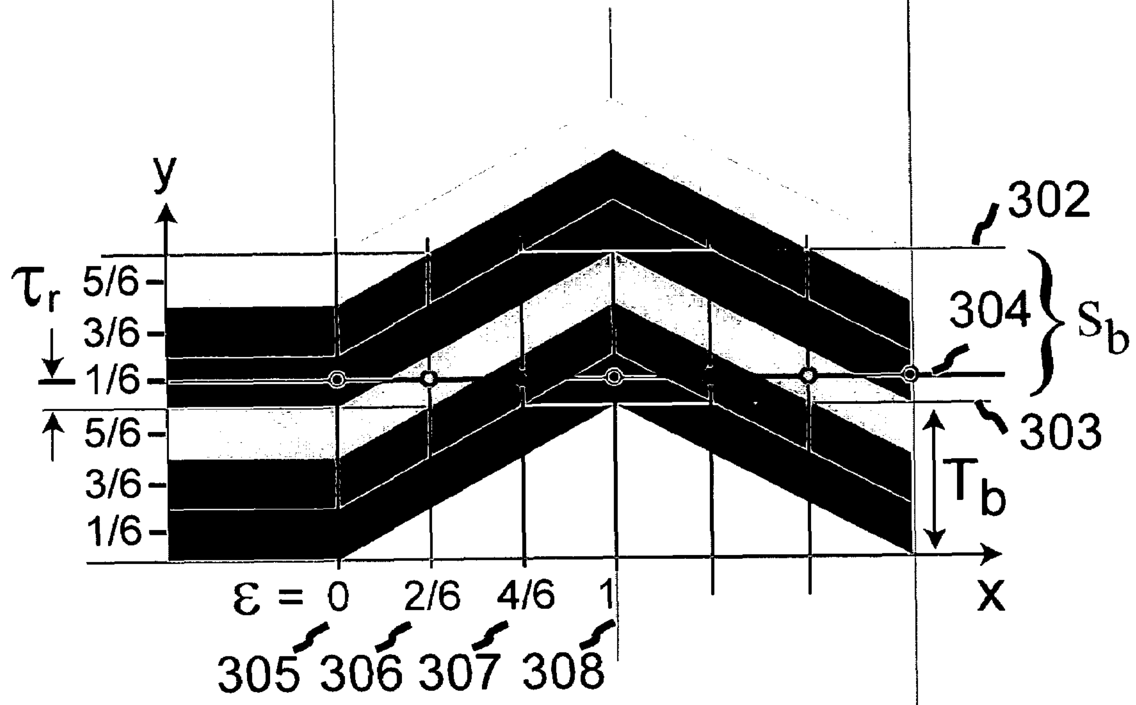
Figure 30C:
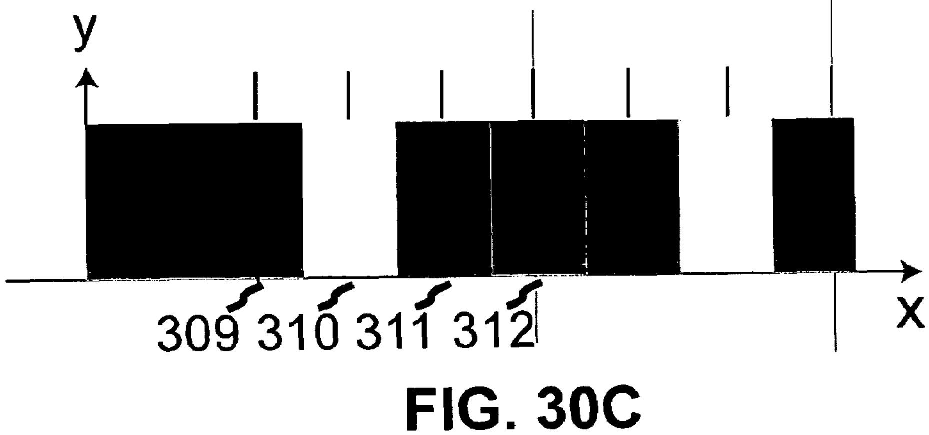

FIG. 30B illustrates the rule stated in Eq. (34). A revealing line 304 is superposed onto the base layer whose sets of lines (repeated with a normalized period T=1) have been modified according to the elevation profile 301 shown in FIG. 6A. The revealing line has a relative phase $\tau_r=1/6$ in respect to the lower boundary 303 of the set of lines $S_b$. At a horizontal position 305 on the base layer, the elevation value is $\epsilon=0$ and the phase of the revealed base layer line within the unmodified base layer sets of lines is $\tau_s=1/6$, which corresponds to the center of the black base layer line. At a horizontal position 306 on the base layer, the elevation value is $\epsilon=2/6$ and the phase of the revealed base layer line is $\tau_s=(1/6-2/6)$ mod $1=5/6$, which corresponds in the unmodified base layer sets of lines to the center of the light gray line. At a horizontal position 307 on the base layer, the elevation value is $\epsilon=4/6$ and the phase of the revealed base layer line is $\tau_s=(1/6-4/6)\bmod 1=3/6$, which corresponds in the unmodified base layer sets of lines to the center of the dark gray line. And at horizontal position 308, the elevation is $\epsilon=1$ and the phase of the revealed base layer line is $\tau_s=(1/6-6/6)\bmod 1=1/6$, which corresponds again to the center of the black line. The superposition of the revealing line grating and of the modified base layer sets of lines yields according to positions 305, 306, 307 and 308 vertically oriented level lines of black (FIG. 30C, 309), light gray 310, dark gray 311 and again black 312 intensities. When moving the revealing layer vertically, i.e. increasing its relative superposition phase to $\bar{\tau}_r=((\tau_r+\Delta\tau_r)\bmod T)$, the same level lines as before are displayed ($\tau_s$ constant), but at first at a higher elevation $$\bar{\epsilon}=(\bar{\tau}_r-\tau_s)\bmod T \qquad (35)$$

and then, due to the modulo-T (since T=1, modulo-1) operation, at the lowest elevation again.

Figure 31A:
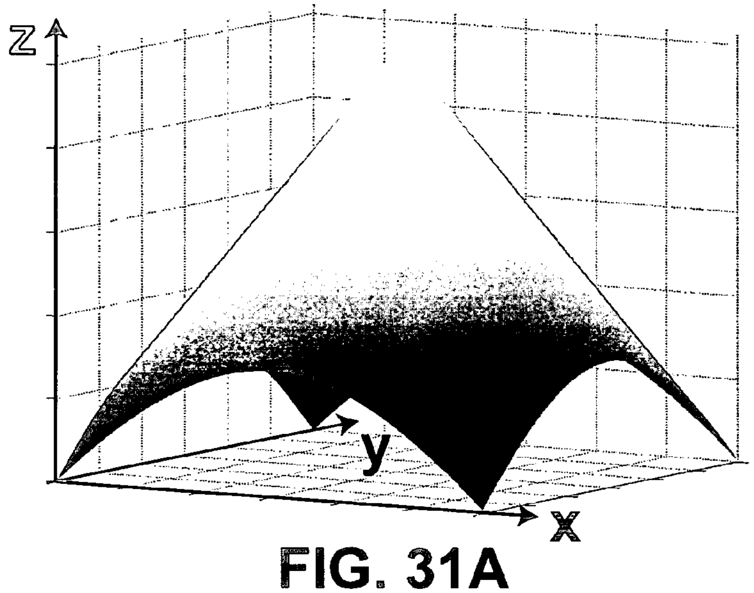
FIG. 31A show an example of an elevation profile (cone) and FIG. 31B shows the correspondingly modified base layer.
Figure 31B:
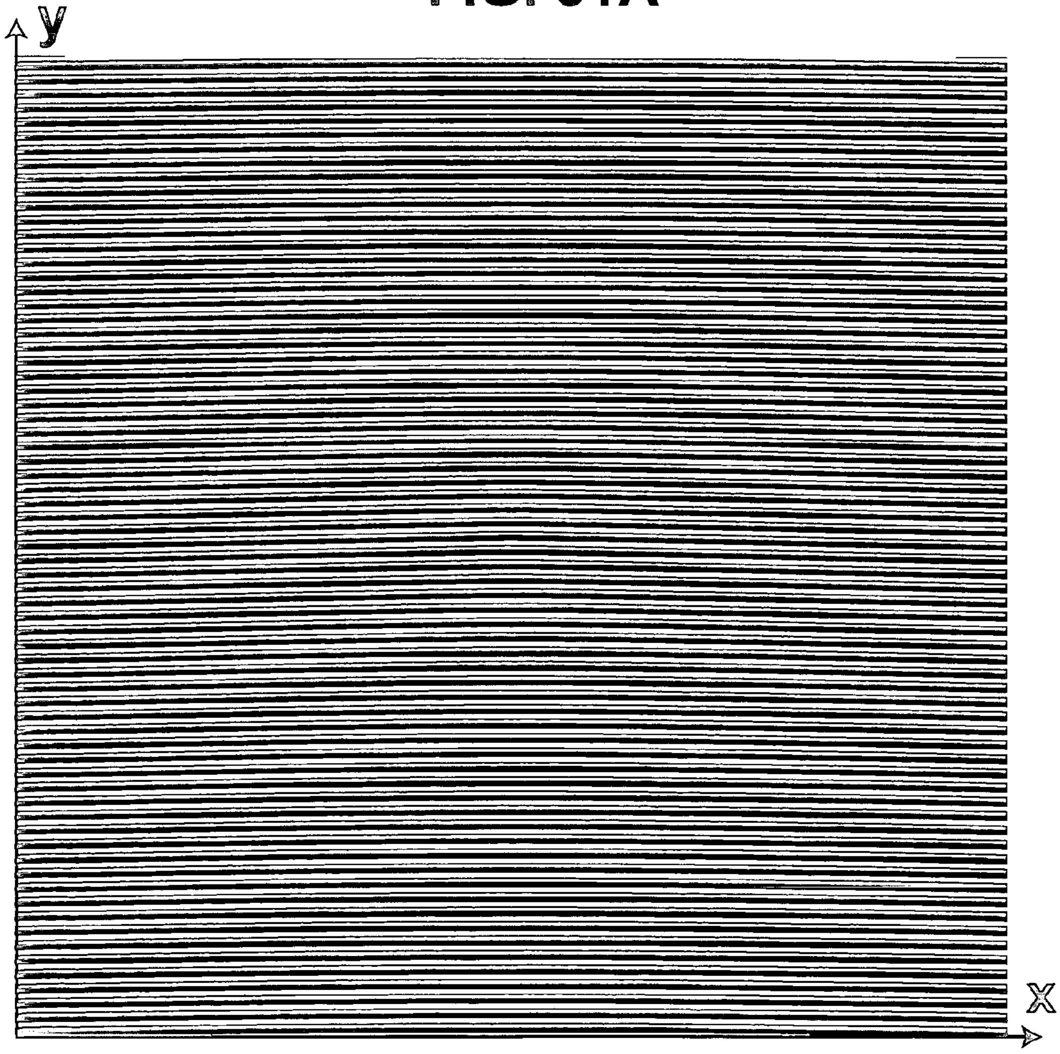
Figure 32:
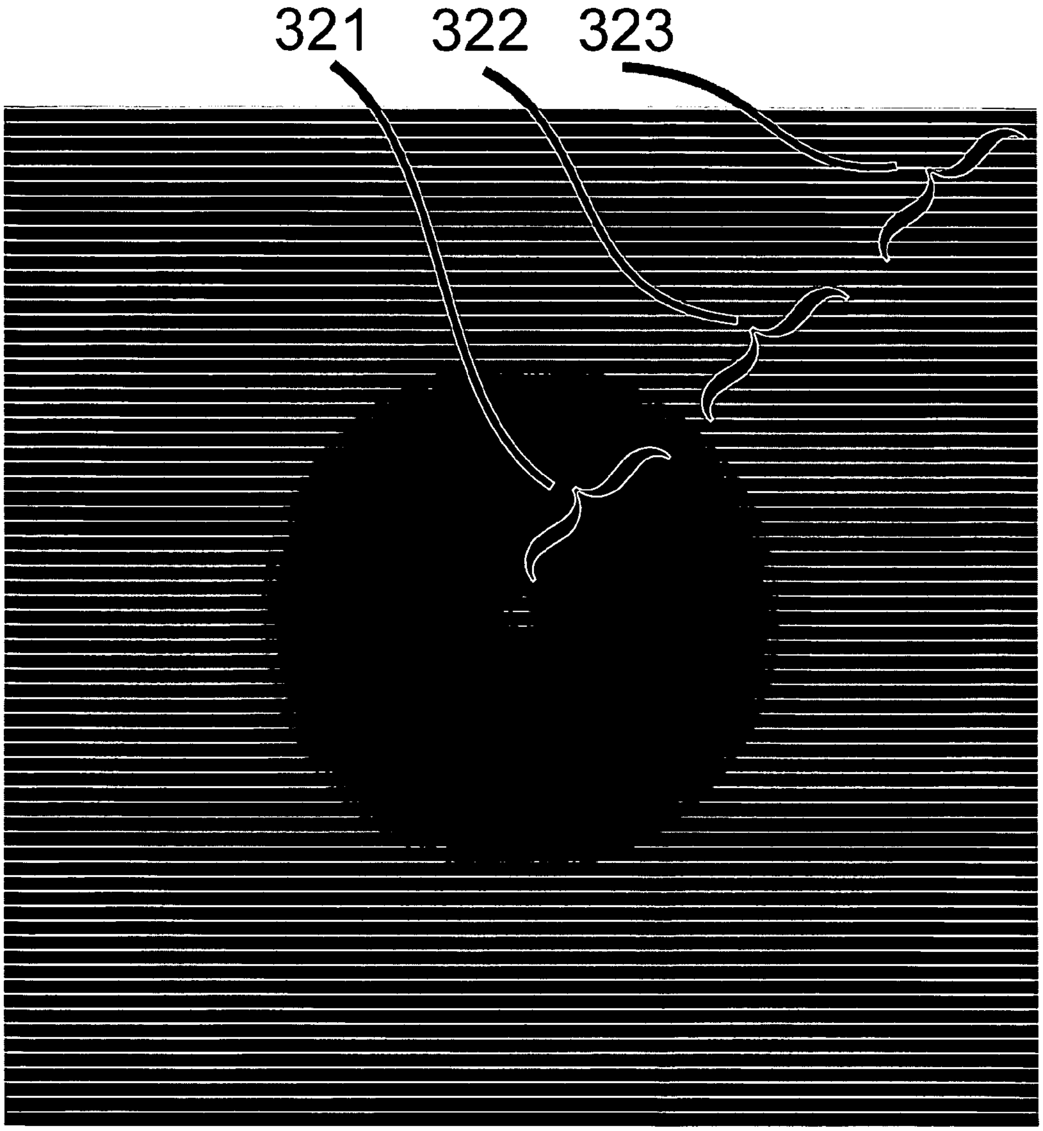
FIG. 32 shows the circular level lines of the elevation profile obtained by the superposition of the base layer shown in FIG. 31B and the revealing layer shown in FIG. 27.

As a further example, FIG. 31B shows a modified base layer embedding the elevation profile of a cone, shown in FIG. 31A. When superposed with the revealing layer shown in FIG. 27, we obtain the level lines of the cone, in the present case formed by concentric circles as shown in FIG. 32. Again, the base layer black (FIG. 26, 261), gray 262 and white 263 lines forming the sets of lines repeated over the base layer appear in the superposition, as shown in FIG. 32 as black 321, gray 322 and white 323 level lines. When translating (moving) the revealing layer in superposition with of the base layer towards increasing y values, the level lines move towards the center of the cone, thereby shrinking. When translating (moving) the revealing layer in superposition with the base layer towards decreasing y values, the level lines move from the center of the cone outwards, thereby growing. The continuous movement of the revealing layer in superposition with the base layer creates a dynamically pulsing conic shape. It is also possible to embed an elevation profile in the revealing layer by the same procedure as when generating the modified base layer.

Synthesis of a Shape Elevation Profile

The elevation profile $z=f(x,y)$ may be as sophisticated as desired. It needs not be continuous nor defined by a mathematical function such a polynomial, an exponential or a trigonometric function. In a preferred embodiment, the elevation profile is derived from an initial clearly recognizable and identifiable motif shape image, possibly composed of several shapes, such as a typographic characters, a word of text, a symbol, a logo, an ornament, any other graphic shape or a combination thereof. Such an elevation profile is therefore a representation of the initial motif shape image. An elevation profile representing a motif shape image is called "shape elevation profile". One may generate a shape elevation profile by selecting an initial, preferably bilevel, motif shape image (e.g. a bitmap) representing e.g. typographic characters, a word of text, a symbol, a logo, an ornament, a decorative motif or any other graphic shape or a combination thereof. One may then apply a low pass filter to that initial motif shape image. However, in a preferred embodiment, in order to obtain elevation level lines (called hereinafter "shape elevation level lines" or simply "shape level lines") having outlines resembling offset lines of the initial bilevel motif shape boundaries, it is recommended to proceed as follows:

a) Create the desired initial bilevel motif shape image (e.g. typographic characters, word of text, symbol, logo, ornament, decorative motif, combination thereof, etc.), e.g.

Figure 33:
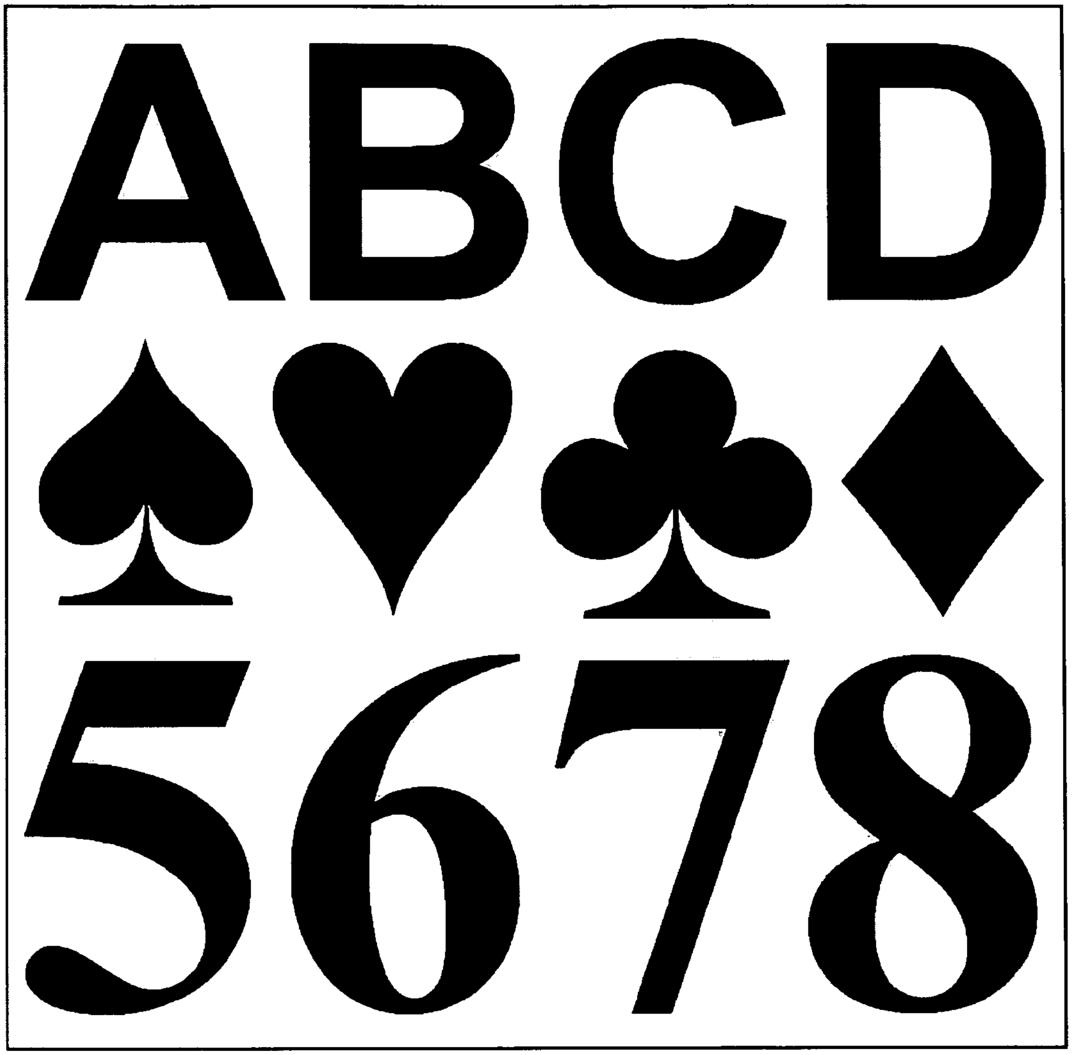
FIG. 33 shows an example of a bilevel motif shape image (bitmap) with typical motif shapes such as typographic characters and symbols.
Figure 34:
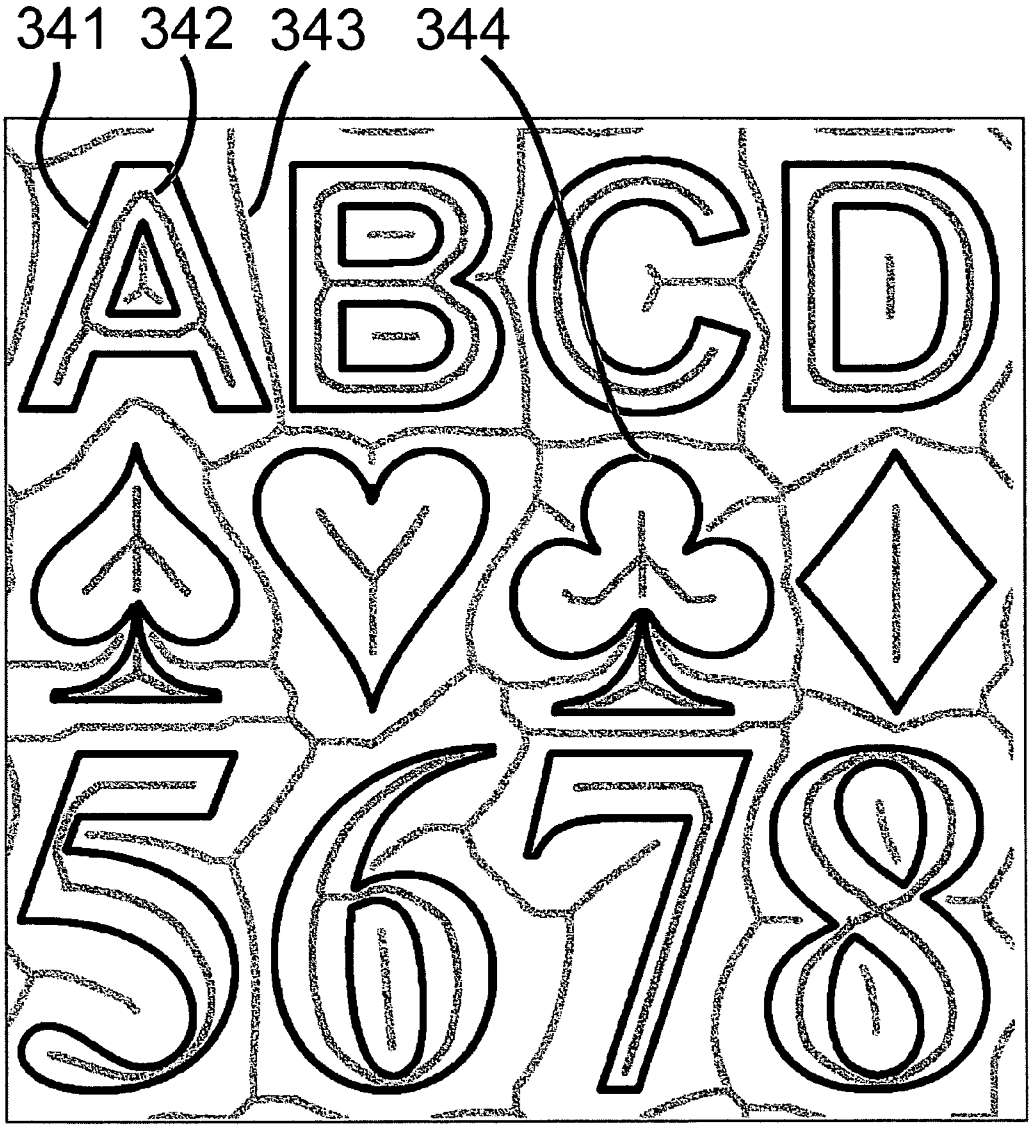
FIG. 34 shows the motif shape boundaries 341, the motif shape foreground skeletons 342 and the motif shape background skeletons 343 of the motif shapes shown in FIG. 33.
Figure 35:
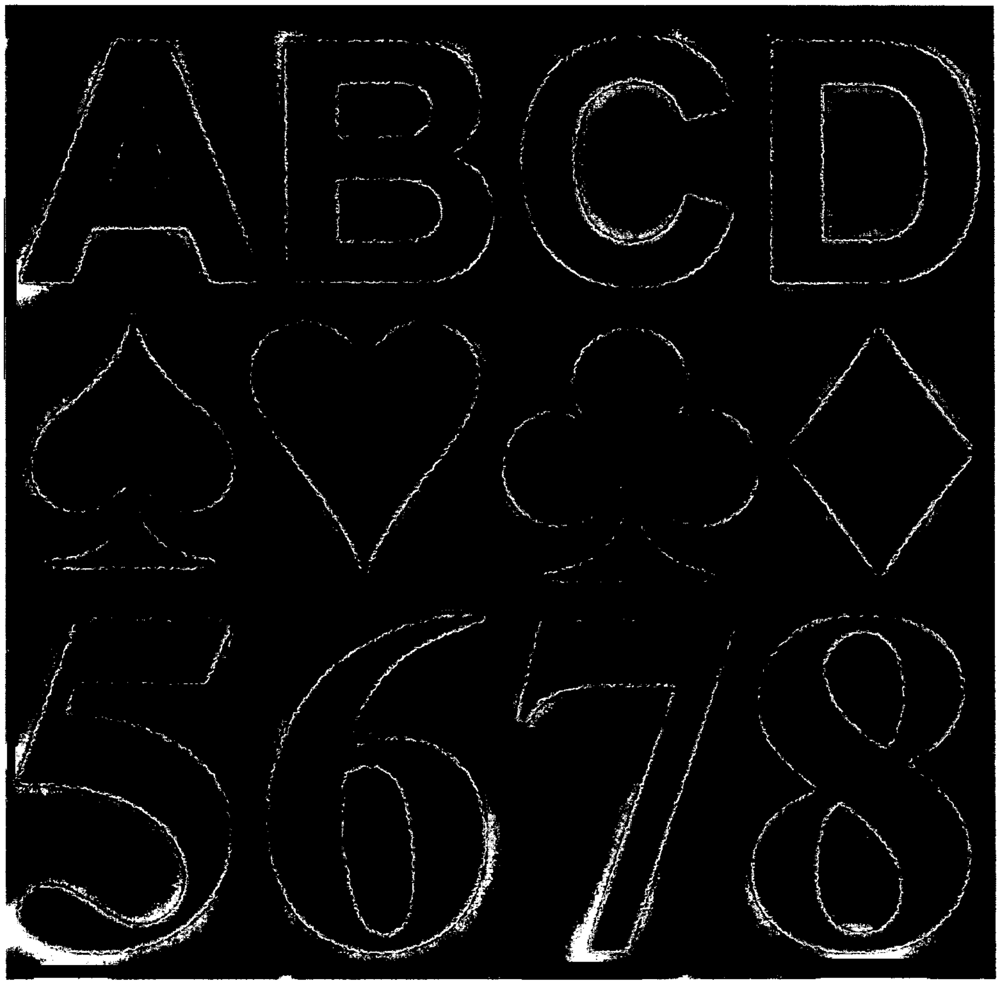
FIG. 35 shows the shape elevation profile computed from the initial bilevel motif shape image of FIG. 33.
Figure 36A:
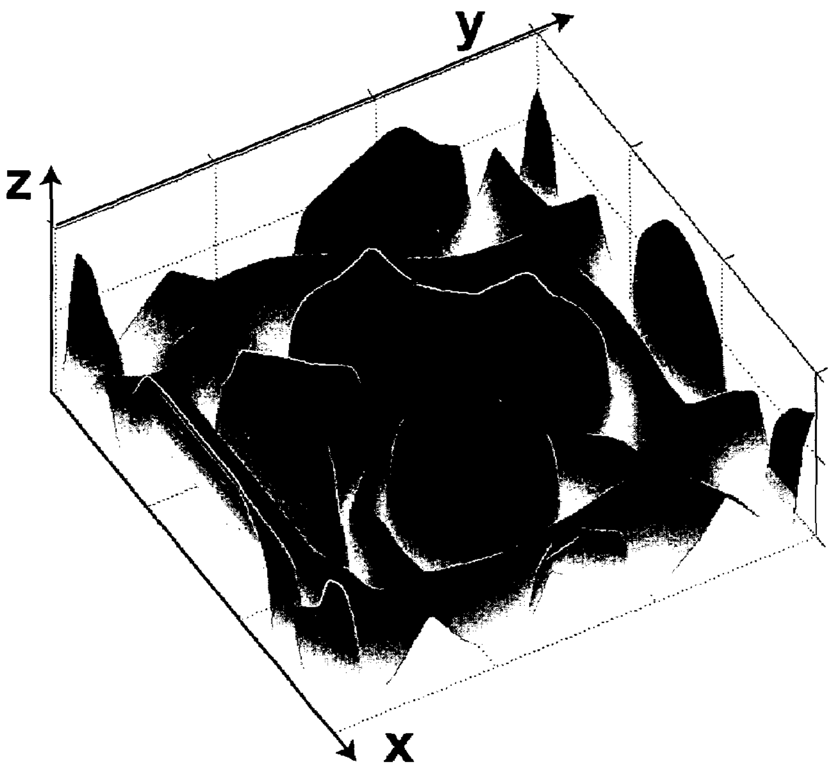
FIG. 36A shows the shape elevation profile (part of FIG. 35) as a 3D function and FIG. 36B as a set of shape level lines.
Figure 36B:
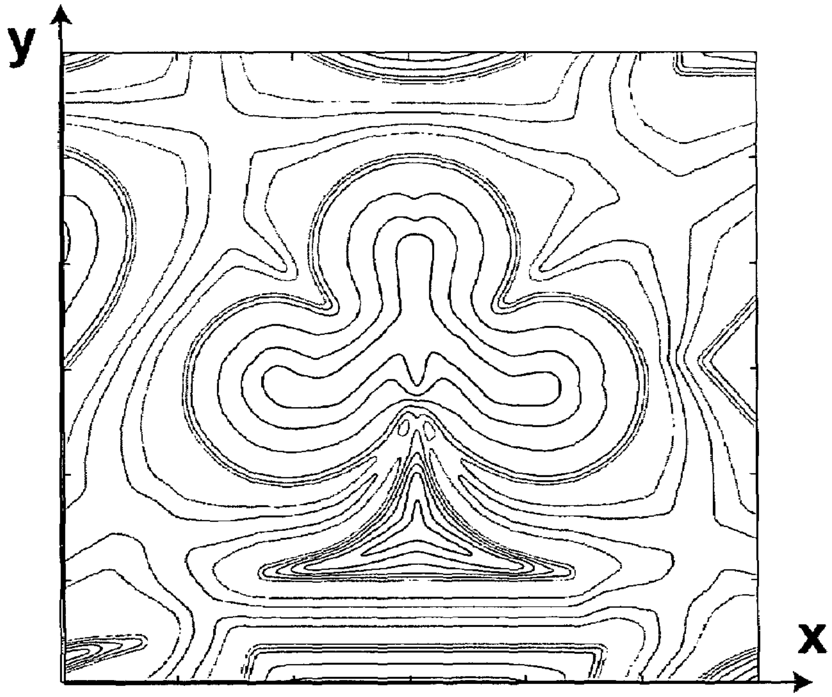
Figure 37:
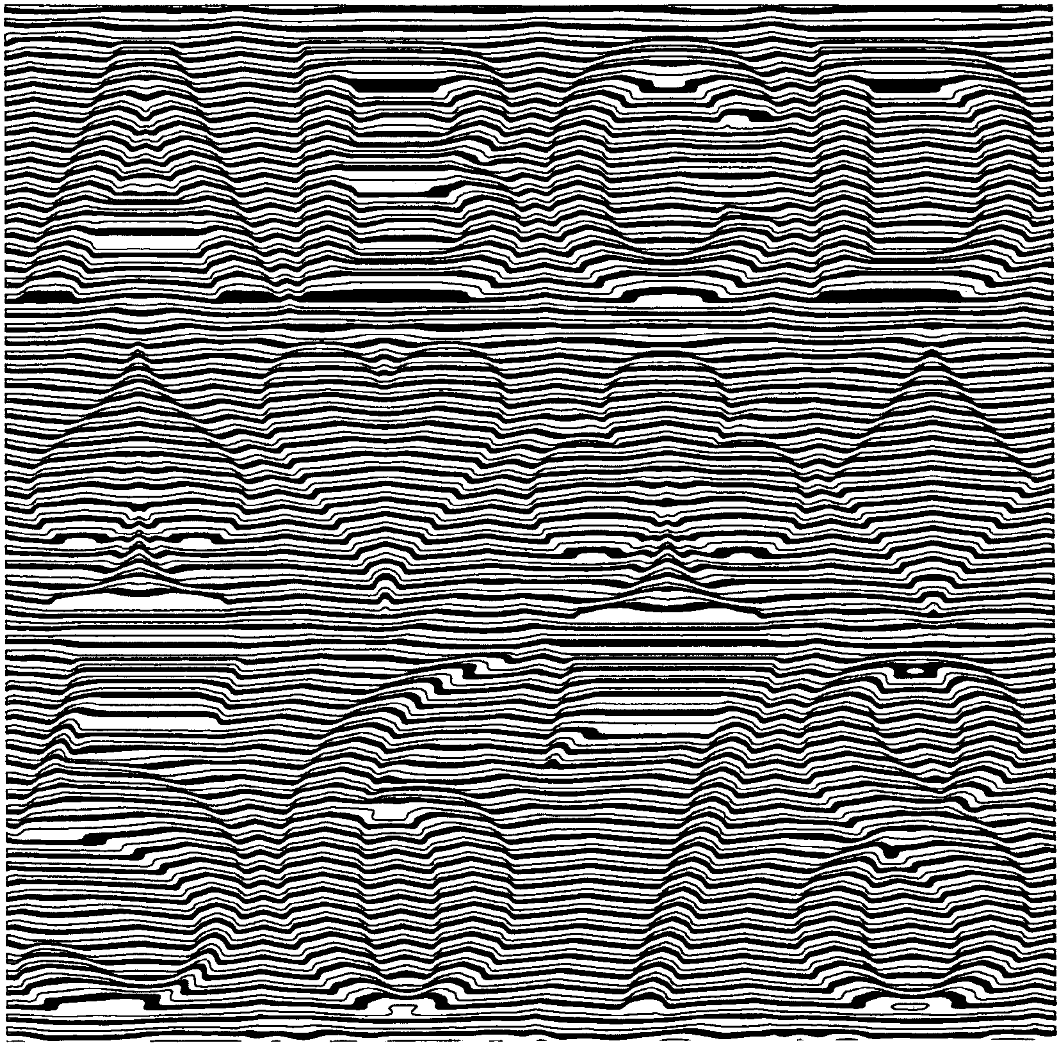
FIG. 37 shows the base layer of FIG. 26 modified according to the shape elevation profile of FIG. 35.
Figure 38:
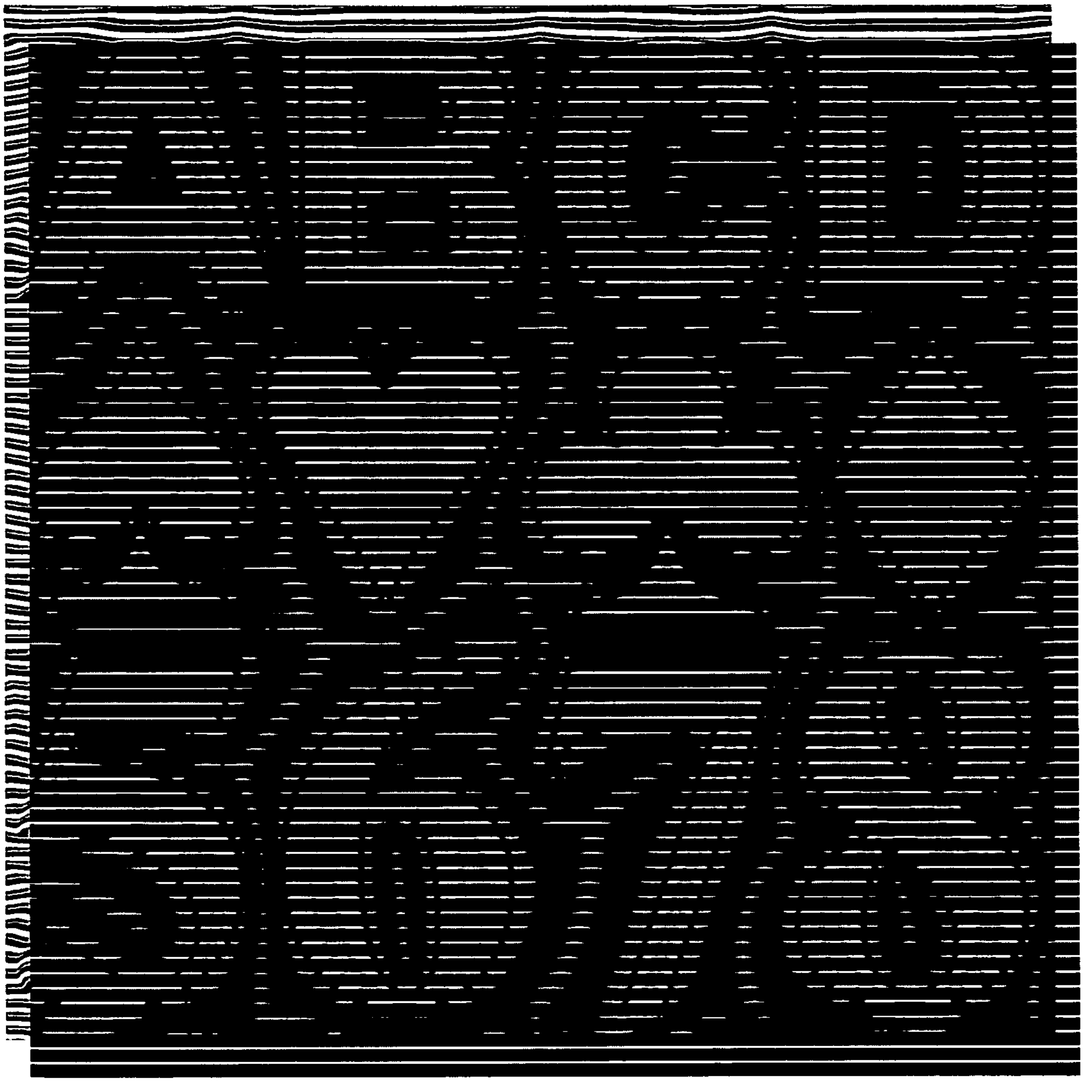
FIG. 38 shows the shape level lines obtained by the superposition of the modified base layer of FIG. 37 and of the revealing layer of FIG. 27.

FIG. 33. For that purpose one may create and run a computer program generating text and graphics on a bitmap. Or one may use an interactive graphic software package such as PhotoShop to create the initial motif shape image.

b) Compute from the initial bilevel motif shape image the skeleton image incorporating the skeletons of both the foreground shape (FIG. 34, 342) and the background shape (FIG. 34, 343), e.g. according to the method described in A. K. Jain, Fundamentals of Digital Image Processing, Prentice Hall, 1989, sections "Skeleton algorithms" and "thinning algorithms", pp. 382-383. The background shape is the inverse (also sometimes called "complement") of the foreground shape.

c) Compute the shape boundary image by performing on the initial bilevel motif shape image a few erosion passes (see A. K. Jain, Fundamentals of Digital Image Processing, Prentice Hall, 1989, section Morphological Processing, pp. 384-389) and by subtracting from the initial bilevel motif shape image the eroded shape image.

d) By performing a distance transform (e.g. A. Rosenfeld and J. Pfaltz, "Sequential operations in digital picture processing," Journal of the Association for Computing Machinery, vol. 13, No. 4, 1966, pp. 471-494), compute separately for the foreground shapes and for the background shapes of the initial bilevel motif shape image the distance $d_k$ from every point (x,y) to its corresponding skeleton and the distance $d_b$ to its corresponding shape boundary. The relationship $$d_{krel}=d_k/(d_b+d_k) \quad (36)$$

expresses the relative distance of a point (x,y) to its respective skeleton on a scale between 0 and 1. Various types of shape elevation profiles may be created by mapping the relative distance $d_{krel}$ of a point to its respective skeleton onto the range of admissible elevations. In order to create well recognizable shape level lines which look like offset lines of the initial bilevel motif shape boundaries, a preferred shape elevation profile is created by assigning to shape foreground points (x,y) the elevation values $$h=1-d_k/(d_b+d_k)\cdot½ \quad (37)$$

and to shape background points the elevation values $$h=½+d_k/(d_b+d_k)\cdot½ \quad (38)$$

i.e. by assigning the range of elevation values from 1 (max) to 0.5 (half) to foreground shapes and from 0.5 half to 0 (min) to the background shapes, where at the shape boundaries, there is a transition from foreground 0.5 (half) to background 0 (min). The foreground skeleton has elevation values 1 (max) and the background skeleton has the elevation values 0 (min).

e) In order to avoid an abrupt transition at the shape boundaries within the final elevation profile, it is recommended to apply a smoothing filter to the elevation profile computed in step (d). FIG. 35 shows an example of a shape elevation profile created by applying steps (b) to (e) to the initial bilevel motif shape image shown in FIG. 33. The foreground shape elevation values range from half (0.5) at the boundary to maximal (1) on the foreground skeleton. The background shape elevation values range from minimal (0) at the boundary to half (0.5) on the background skeleton. A part of this elevation profile is shown in FIG. 36A as a 3D function and in FIG. 36B as a set of level lines which look similar to offset lines of the corresponding bilevel motif shape boundaries (FIG. 34, 341). FIG. 37 shows the base layer of FIG. 26 modified according to that elevation profile and FIG. 38 show the revealed shape level lines obtained by superposing the revealing layer FIG. 27 in superposition with the modified base layer shown in FIG. 37. When displacing the revealing layer towards a new position, the shape elevation level lines move between the centers of foreground respectively background shapes (i.e. foreground, respectively background skeletons) and the corresponding shape boundaries. This creates the impression of a pulsing shape. The initial bilevel motif shapes from which the shape elevation profile is generated may have any orientation (vertical, oblique or horizontal), i.e. it doesn't need to be laid out horizontally as in the example of FIG. 33.

Hereinafter, shape level lines which look similar to offset lines of initial motif shape boundaries are called "visual offset lines" of these initial motif shape boundaries. They distinguish themselves from geometric offset lines by the fact that their points are not located at a constant distance from the corresponding motif shape boundaries. However, they share with geometric offset lines the property that successive shape level lines do not intersect each other, i.e. they are imbricated (nested) one into another.

A further embodiment is possible, where instead of starting from a bilevel motif shape image in order to generate the shape elevation profile, the initial motif shape image is simply a digital grayscale image, e.g. an image with intensity levels ranging between 0 and 255. Such a grayscale image may be obtained by digitization with a scanner or with a digital camera, and possibly by postprocessing operations, such as low-pass filtering or converting colors to grayscale intensity levels. A grayscale image may also be obtained by other means, such as for example image synthesis with computer graphics tools. Such an initial motif shape image may be converted into a shape elevation profile by applying filtering operations, e.g. noise removal by median filtering, high-pass filtering in order to enhance the shape boundaries, etc. Alternately the grayscale initial motif shape may directly be used as a shape elevation profile. In the case of a shape elevation profile derived from a grayscale motif shape image, the shape boundaries are formed by the locations of the grayscale motif shape which have a high slope, i.e. high gradient values of their intensity function $z=f(x,y)$.

Geometric Transformations of Base and Revealing Layers for Shape Level Lines

Geometric transformations are useful for creating matching pairs of transformed base and revealing layers from their original non-transformed base and revealing layers. Thanks to different transformations, e.g. selected from a set of admissible transformations, and transformation parameters, e.g. selected from a set of admissible transformation parameters, many different matching pairs of base and revealing layers enable creating many different superposition images. For example, a rotating disk with the second-hand may incorporate different revealing layers, revealing each one a different information (e.g. a different number). We propose two variants (A) and (B) of generating transformed base and revealing layers.

Admissible transformations and their corresponding admissible parameters or parameter ranges are selected, e.g. by trial and error, so as to ensure that both the resulting curvilinear base layer sets of lines and the resulting curvilinear revealing line grating are still reproducible on the target secure item (i.e. printable or imageable).

Figure 39:
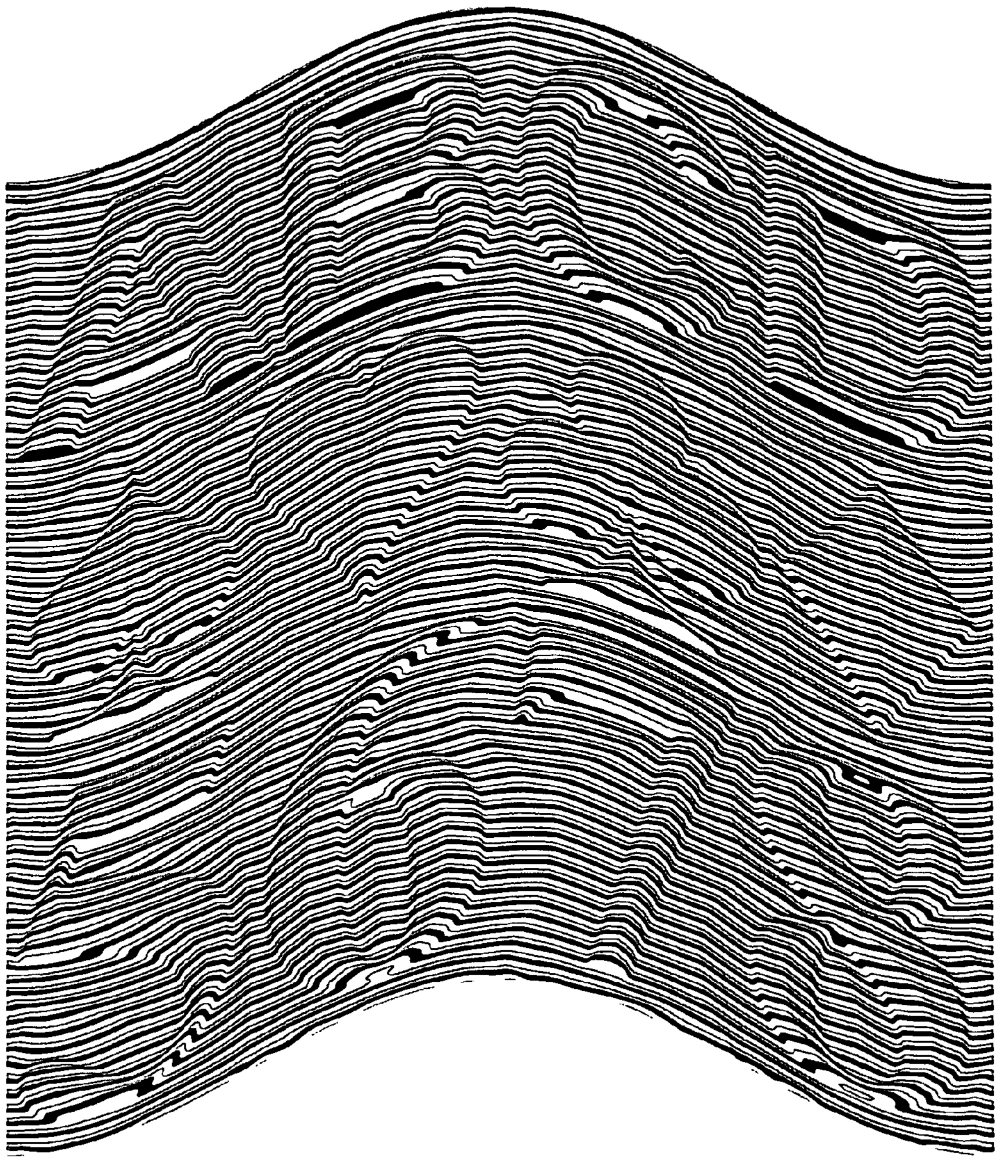
FIG. 39 shows the geometrically transformed modified base layer shown in FIG. 37.
Figure 40:
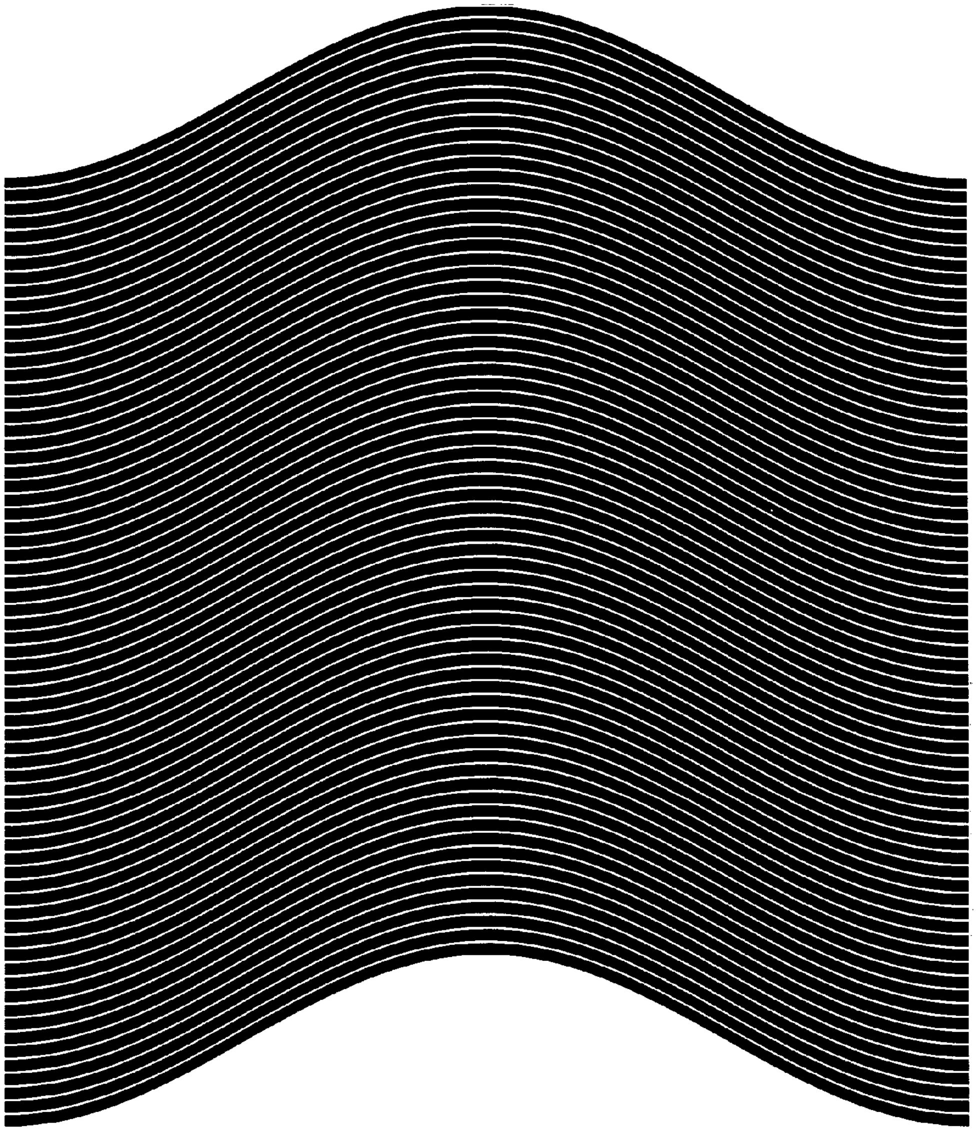
FIG. 40. shows the geometrically transformed revealing layer shown in FIG. 27.

A) Applying a Geometric Transformation to the Modified Base Layer and to the Revealing Layer The shape elevation profile is first embedded into the base or revealing layer and then the same geometric transformation is applied to both the base and the revealing layers. When superposing the base layer and the revealing layer we obtain the transformed shape level lines. These level lines are transformed according to the same geometric transformation that has been applied to the base and revealing layers. As an example, FIG. 35 shows a shape elevation profile, FIG. 37 the modified base layer, FIG. 38 the shape level lines of the superposition of the original, i.e. non-transformed, base and revealing layers, FIG. 39 the transformed modified base layer, FIG. 40 the transformed revealing layer, and FIG. 41 the transformed shape level lines obtained by superposing the transformed revealing layer (FIG. 40) in superposition with the transformed modified base layer (FIG. 39). In the present example, the geometric transformation applied to the base and revealing layers is a cosinusoidal transformation mapping from transformed space $(x_t,y_t)$ back to the original space (x,y)

$$y=h_y(x_t,y_t)=y_t+c_1\cos(2\pi(x_t+c_3)/c_2) \tag{39}$$

where $c_1$, $c_2$, and $C_3$ are parameters of the cosinusoidal transformation. Since the original base layer lines and revealing layer lines are horizontal, the transformation is completely defined by the function $y=h_y(x_t,y_t)$. However, in other cases, one needs to give also the part of the transformation yielding the x-coordinate, i.e. $x=h_x(x_t,y_t)$.

Figure 41:
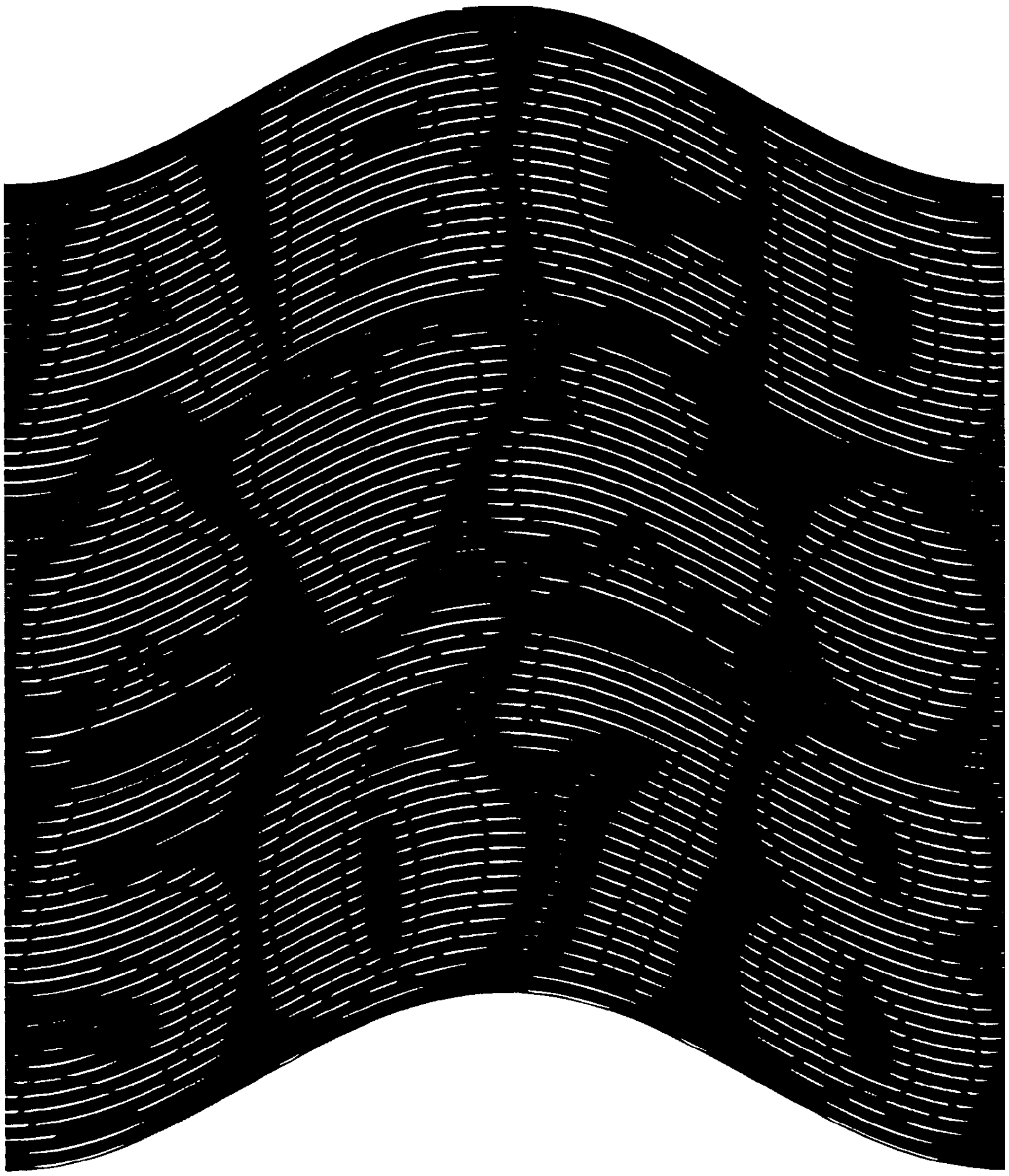
FIG. 41 shows the level lines obtained by the superposition of the geometrically transformed modified base layer shown in FIG. 39 and of the geometrically transformed revealing layer shown in FIG. 40, at one relative phase of base and revealing layers.
Figure 42:
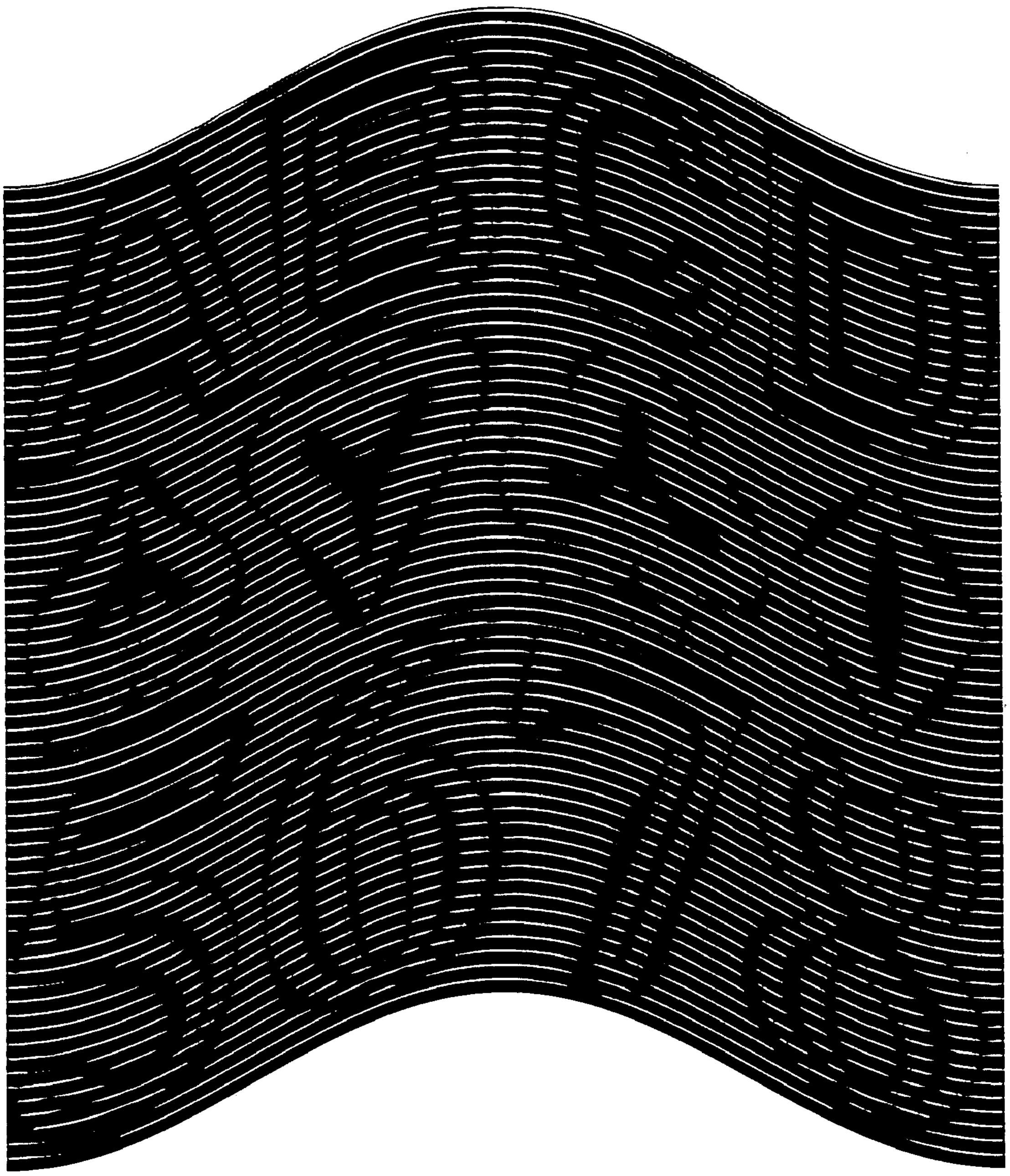
FIG. 42 shows the same superposition as in FIG. 41, but at a different relative superposition phase of base and revealing layers.

When the revealing layer (FIG. 40) is slightly vertically displaced in superposition with the base layer, the relative superposition phase of base and revealing layer changes and the level lines of the superposition image shown in FIG. 41 move either towards the foreground, respectively the background skeletons (i.e. shape foreground centers, respectively background centers) or towards the boundaries of the initial motif shape image from which the elevation profile is generated (FIG. 42). This creates a pulsing geometrically transformed shape, whose transformation is the same as the one that has been applied to the base and revealing layers.

B) Embedding the Shape Elevation Profile into the Geometrically Transformed Base or Revealing Layer By embedding the original elevation profile either into the geometrically transformed base layer or into the geometrically transformed revealing layer, one may obtain, when superposing the two layers substantially the same shape level lines as the shape level lines obtained when superposing the original non-transformed base and revealing layers. In the following explanation, the spatial elevation profile is embedded into the base layer. However, it may according to the same procedure be equally well embedded into the revealing layer. The selected geometric transformation is applied to both the base and revealing layers before embedding the spatial elevation profile. Then, the spatial elevation profile is embedded into the base layer as follows. At each position $(x_t,y_t)$ of the transformed modified base layer, the corresponding position $(x,y)=(h_x(x_t,y_t),h_y(,x_t,y_t))$ in the original non-transformed base layer (x,y) is found, where $h_x$ and $h_y$ express the transformation from the transformed base layer space back to the original base layer space. Then, the shifted position (x,y−z) within the original base layer is found according to the current elevation profile value $z=f(x_t,y_t)$ at the position $(x_t,y_t)$ of the modified transformed base layer. The intensity, respectively color c at position (x,y−z) of the original non-transformed base layer is read and copied (written) into the modified transformed base layer at position $(x_t,y_t)$.

Figure 43:
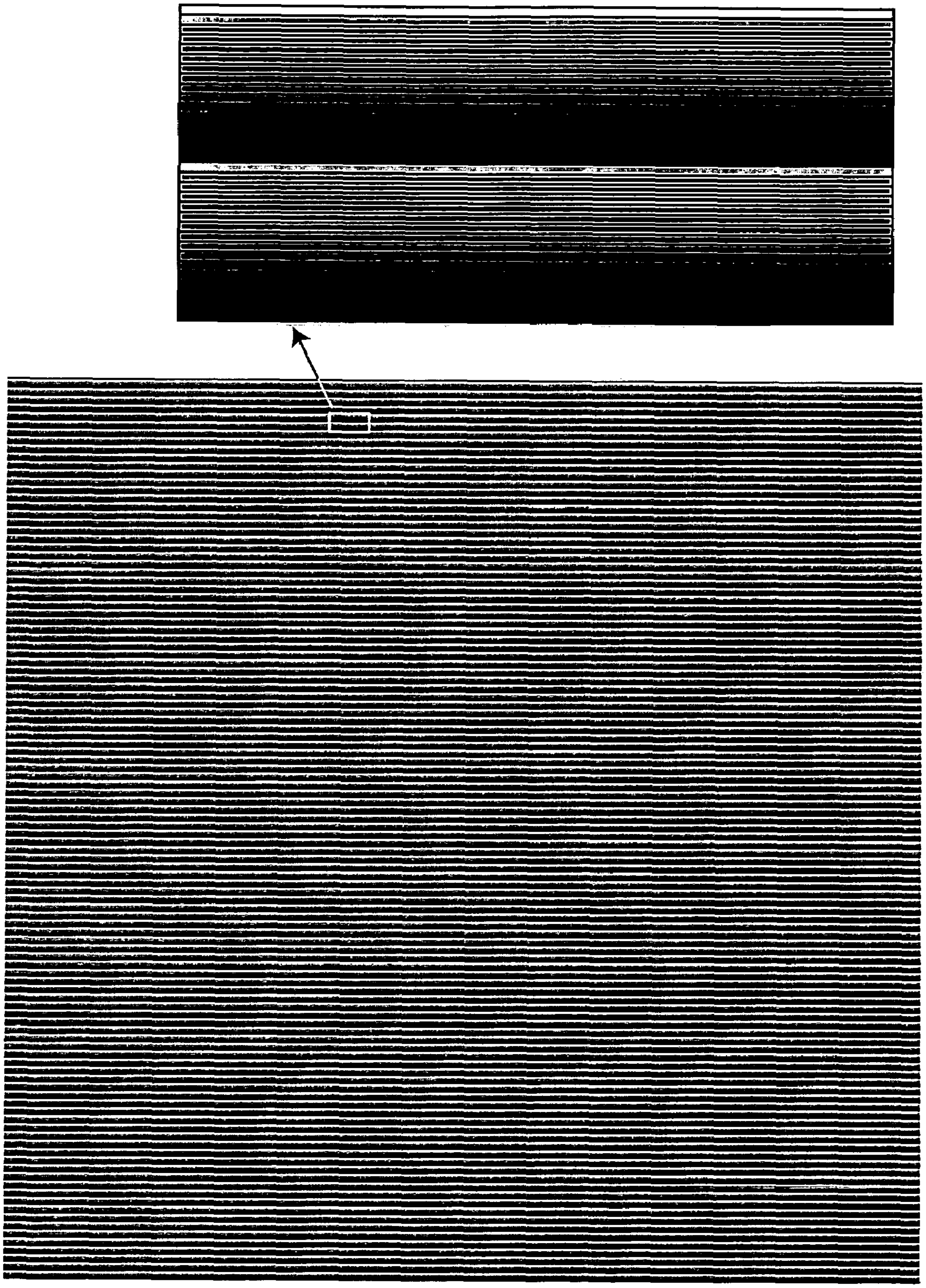
FIG. 43 shows an original, non-transformed, base layer where each set of lines of the replicated sets of lines incorporates lines of increasing intensity.
Figure 44:
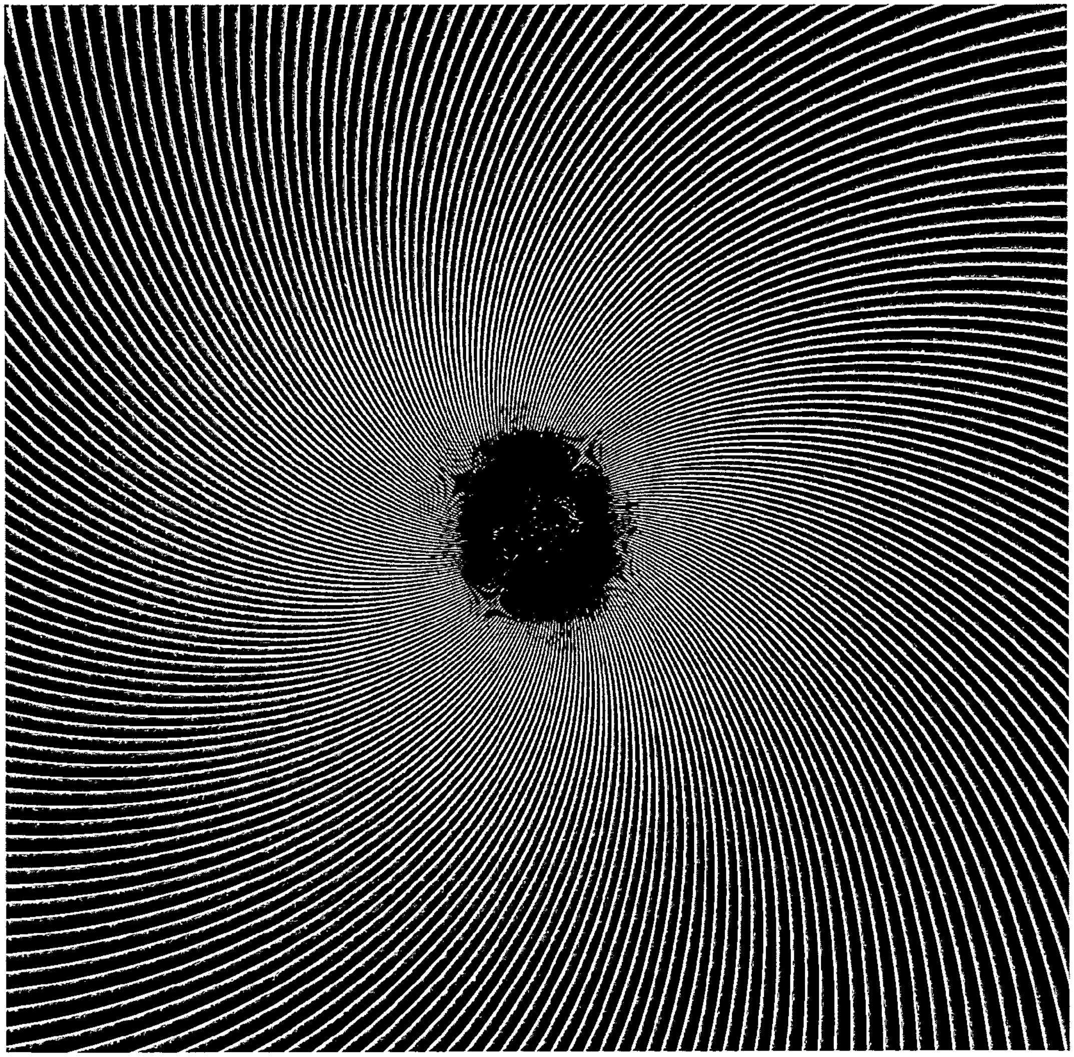
FIG. 44 shows an example of transformed base layer sets of lines, obtained from the original non-transformed set of lines shown in FIG. 43 by applying a "spiral transformation"

As an example, FIG. 43 shows an original, non-transformed, base layer where each of the replicated sets of lines incorporates lines of increasing intensity. FIG. 44 shows the corresponding transformed base layer, where the geometric transformation from transformed base layer space $(x_t,y_t)$ to original base layer space (x,y) is a "spiral transformation" given by $$y=h_y(x_t,y_t)=c_m\sqrt{(x_t-c_x)^2+(y_t-c_y)^2}+\frac{\operatorname{atan2}(y_t-c_y,\ x_t-c_x)\bmod(2\pi)}{2\cdot\pi}T_b\cdot n_s \tag{40}$$

where $c_x$ and $c_y$ are constants giving the center of the spiral line grating, $c_m$ is a scaling factor, $T_b$ is the base layer sets of line period in the original space, $n_s$ is the number of spirals leaving the center of the spiral line grating and atan2 is the four-quadrant inverse tangent (arctangent) yielding values between −π and π. In the present case, since the original base layer lines and revealing layer lines are horizontal, the transformation is completely defined by the function $y=h_y(x_t,y_t)$.

Figure 45:
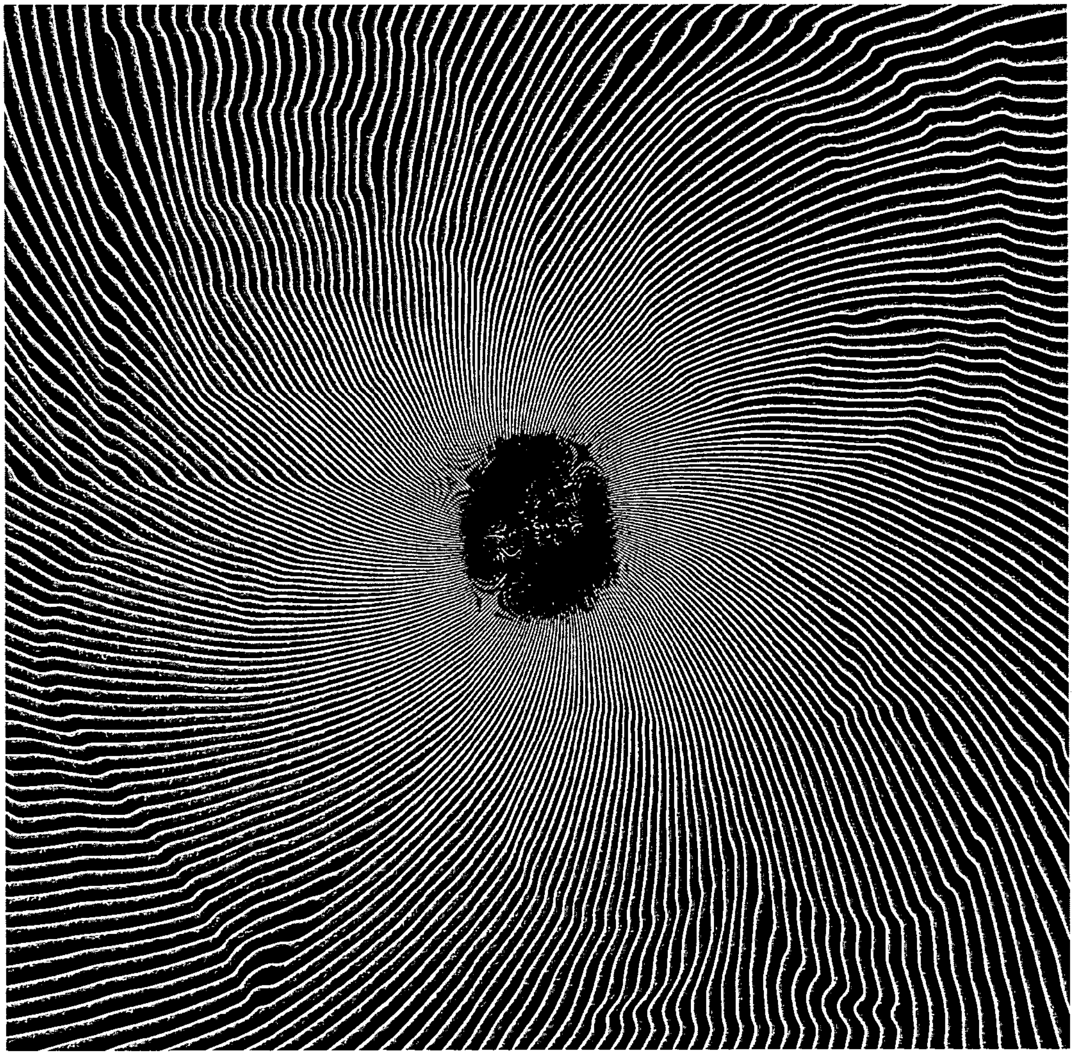
FIG. 45 shows the modified transformed base layer sets of lines, obtained by embedding into the transformed base layer sets of lines shown in FIG. 44 the shape elevation profile shown in the top middle part of FIG. 38 ("B", "C", heart, and clover motif shapes)
Figure 46:
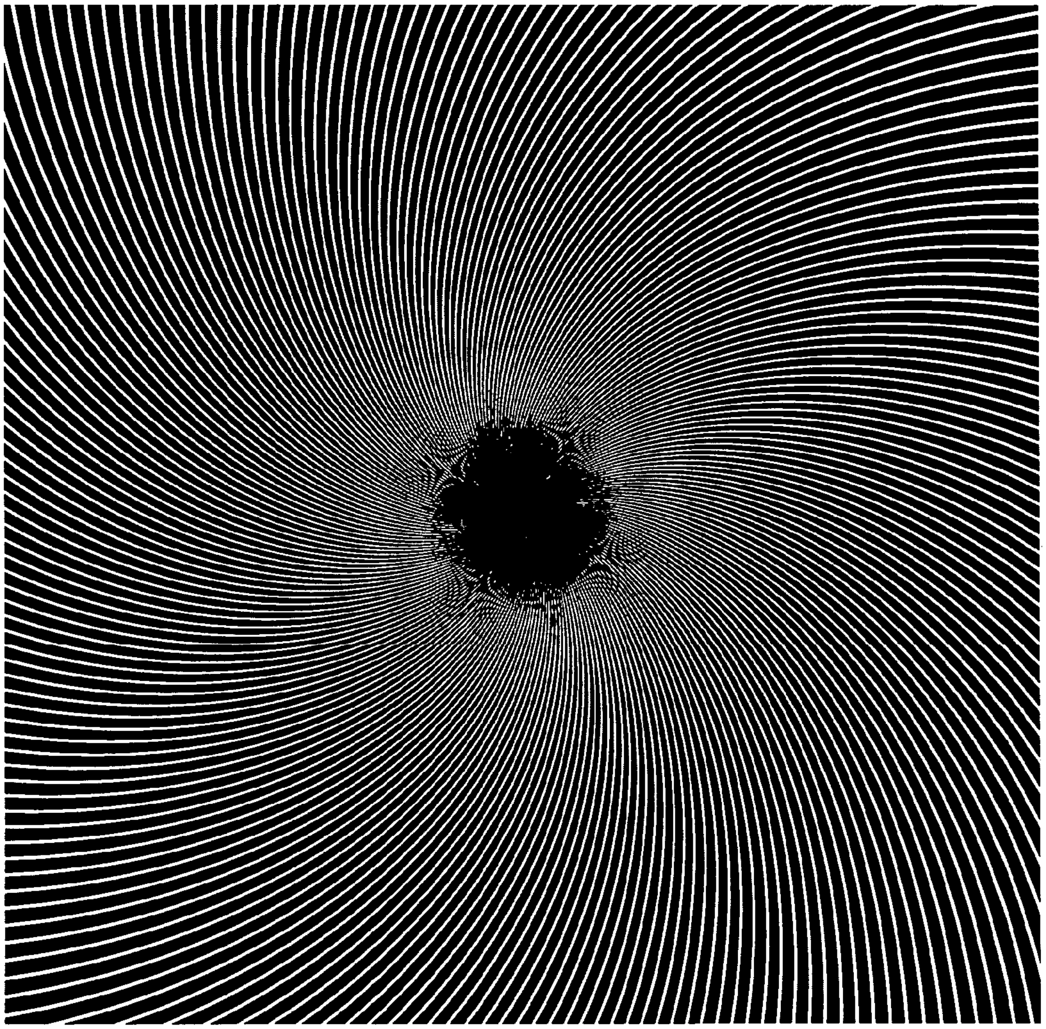
FIG. 46 shows the transformed revealing layer line grating, obtained from the original non-transformed revealing layer line grating shown in FIG. 27 by applying the same transformation, that was applied to the base layer sets of lines (in the present case the spiral transformation)
Figure 47:
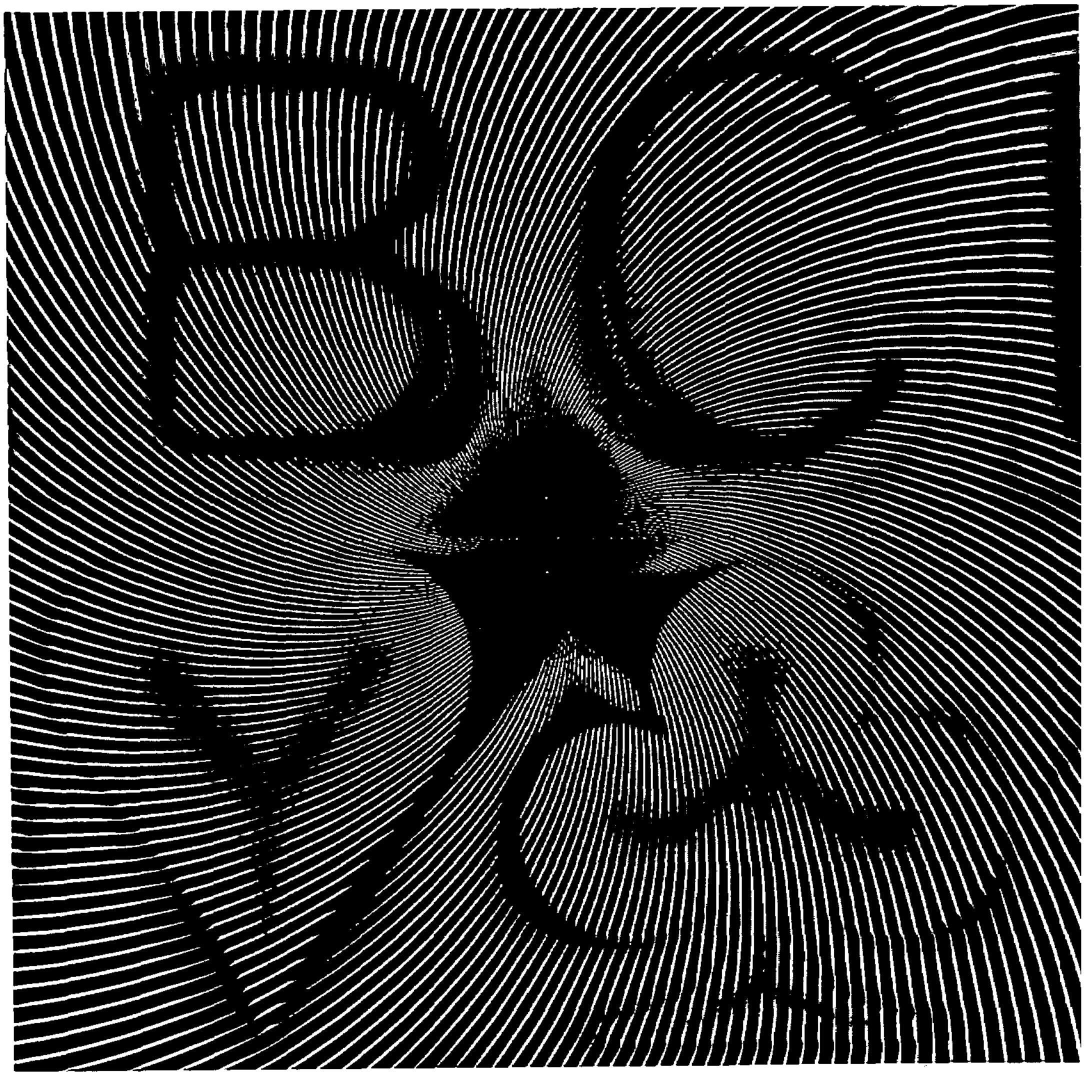
FIG. 47 shows the level lines produced by the superposition of the transformed revealing line grating shown in FIG. 46 and of the modified transformed base layer sets of lines shown in FIG. 45.
Figure 48:
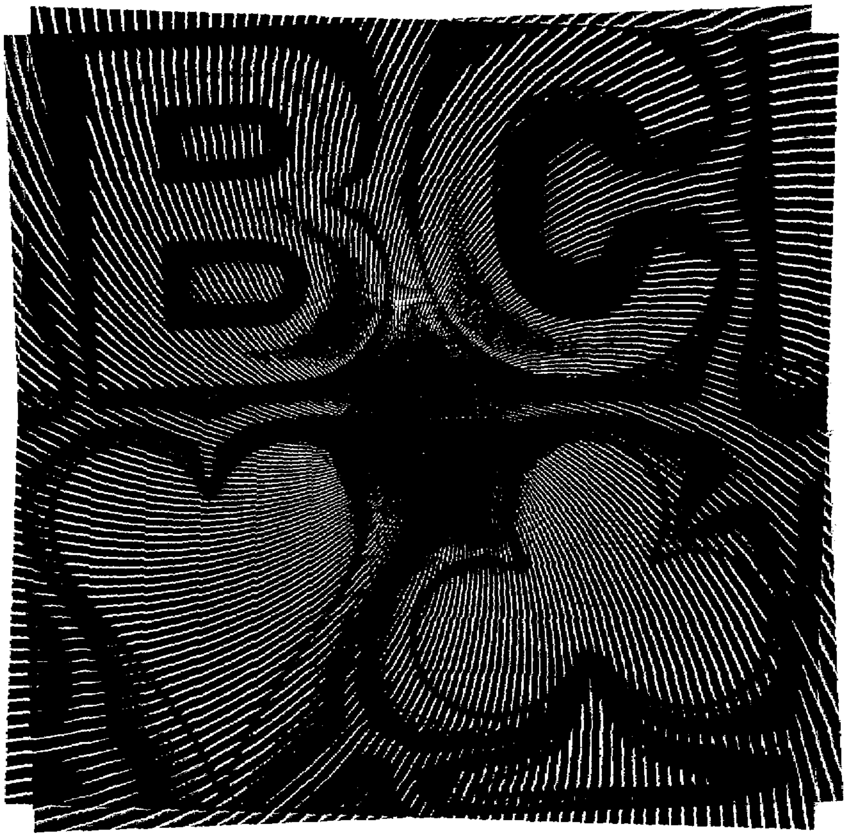
FIG. 48 shows the level lines produced by the superposition of the transformed revealing line grating shown in FIG. 46 and of the modified transformed set of lines shown in FIG. 45, after having modified the relative superposition phase of base and revealing layers, in the present case, after having rotated the revealing layer.

FIG. 45 shows the modified and transformed base layer embedding the elevation profile, computed according to the explanations given above. FIG. 46 shows the revealing layer, transformed according to the same transformation as the one that was applied to the original base layer. FIG. 47 shows the shape level lines produced by the superposition of the transformed revealing layer and of the modified transformed base layer. FIG. 48 shows the level lines of the superposition of the transformed modified base layer and the transformed revealing layer, at a different relative superposition phase $\tau_r$ of base and revealing layers, where $\tau_r$ refers to the relative superposition phase of the original non-transformed base and revealing layers. In the present example, a different relative superposition phase $\tau_r$ is achieved by rotating the transformed revealing layer in superposition with the modified transformed base layer, around the center location of the revealing and base layer spirals. Despite the fact that geometric transformations were applied to both the base and revealing layer, the resulting level lines are very similar to the ones that are shown in the superposition of the non-transformed layers (FIG. 38). The movement of the level lines also creates pulsing shapes.

Embedding the Shape Elevation Profile into a Halftone Image

One may create as base layer a halftone black-white or color image embedding an elevation profile. When looking at the base layer, one simply observes the halftone image, e.g. the face of the holder of an identity document (e.g. FIG. 49). When one superposes the revealing layer (e.g. FIG. 46) corresponding to that base layer on top of it, the shape level lines of the shape elevation profile embedded into the base layer halftone image are revealed and are clearly recognizable (e.g. FIG. 50).

Hereinafter, we use the terms halftoning and dithering interchangeably. One simple way of creating such a halftone image consists in taking as a dither matrix a modified possibly transformed layer (initially a base layer, now called intermediate base layer) comprising repeated sets of lines, where each line within a set has a different intensity and where the modified intermediate base layer embeds a shape elevation profile. The more uniform the distribution of individual line intensities across the full intensity range, the higher the quality of the resulting dither matrix. For example, the modified transformed base layer with sets of lines having lines of increasing intensity shown in FIG. 45 is taken as the dither matrix. By halftoning (dithering) an input grayscale or color image with that dither matrix, one obtains as final base layer a halftone image embedding the shape elevation profile (e.g. FIG. 49) that is present in the modified transformed intermediate base layer, used as a dither matrix. Note that the halftone image embedding the shape elevation profile also comprises sets of lines, with line intensities, respectively colors, which depend on the intensity, respectively color, of the input grayscale image, respectively color image.

Figure 49:
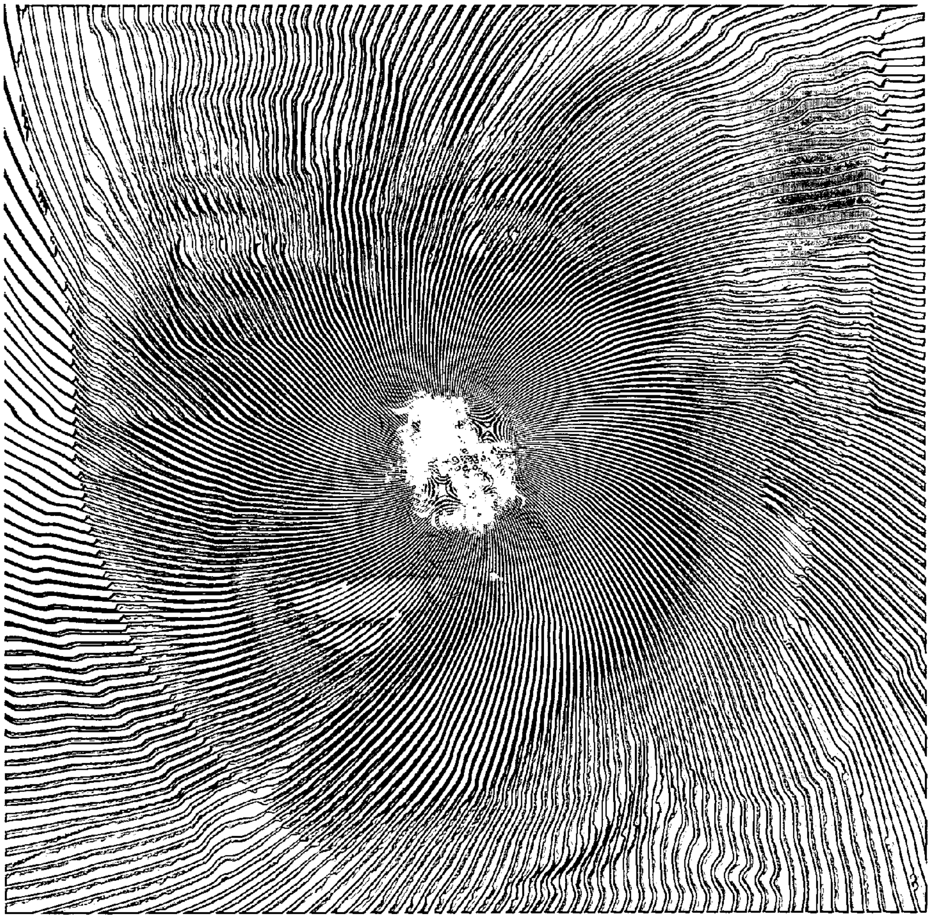
FIG. 49 shows the halftone image of a face, dithered by taking the modified transformed sets of lines shown in FIG. 45 as dither matrix.
Figure 50:
FIG. 50 shows the level lines produced by the superposition of the halftone image shown in FIG. 49 and of the transformed revealing line grating shown in FIG. 46.
Figure 51:
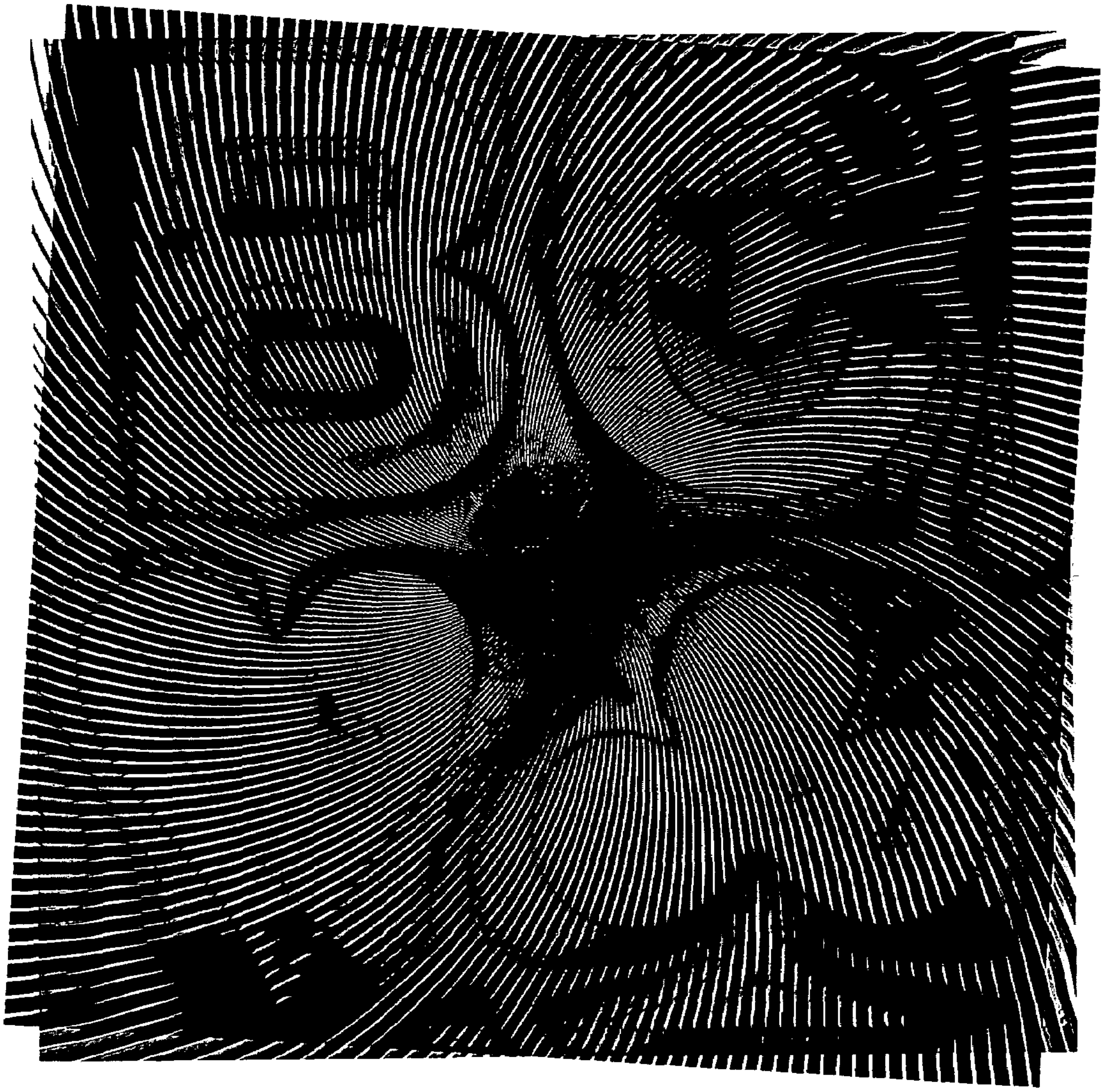
FIG. 51 shows the level lines produced by the superposition of the halftone image shown in FIG. 49 and of the transformed revealing line grating shown in FIG. 46, after having rotated the revealing layer on top of the base layer.

By superposing the revealing layer having undergone the same transformation as the transformed base layer sets of lines on top of the halftone image embedding the shape elevation profile, its shape level lines are revealed. FIG. 50 shows the shape level lines obtained by superposing the transformed revealing layer (FIG. 46) and the halftoned image incorporating the shape elevation profile (FIG. 49). FIG. 51 shows the same superposition, but at a slightly different relative phase of base layer and revealing layer. In both cases, the shape level lines are clearly recognizable. They look like offset lines of the (preferably bilevel) motif shape boundaries (visual offset lines) and move between these motif shape boundaries and the foreground and background shape centers (i.e. foreground and background skeletons), thereby creating the impression of pulsing motif shapes.

By halftoning (dithering) an input color image with a dither matrix embedding the elevation profile, one may obtain color shape level lines. For halftoning a color image, one may simply halftone (dither) each of the color layers (e.g. cyan, magenta, yellow) separately and print them in phase. Or one may apply the multicolor dithering method described in U.S. Pat. No. 7,054,038 to Ostromoukhov, Hersch and in the paper "Multi-color and artistic dithering" by V. Ostromoukhov and R. D. Hersch, SIGGRAPH Annual Conference, 1999, pp. 425-432.

Composed Base Layer Incorporating Several Independent Base Layer Sets of Lines Incorporating several independent base layer sets of lines (hereinafter called "base layer elements") laid out differently (e.g. geometrically transformed according to different geometric transformations) into the same composed base layer allows one to reveal elevation level lines of one shape by one revealing layer and elevation level lines of another shape by a second different revealing layer. The individual base layer elements may be successively incorporated into the composed base layer according to any layer combination operation. Examples of layer combination operations are bitmap "OR" operation, bitmap "AND" operation, blending the layers according to their intensity, respectively colors (see Adobe Photoshop help "Selecting a blending mode"), spatial merging operation between different layers by allocating to each layer small subspaces juxtaposed with the other layer subspaces, etc.). Despite the complexity of the fine structure, the superposition of corresponding base and revealing layers still reveals recognizable shape level lines.

Each modified base layer element (modified repeated sets of lines) forming the composed base layer embeds its specific shape elevation profile. It is possible to have two, three or more base layer elements within a composed base layer. Different periods $T_{b1}$, $T_{b2}$, . . . may be used for different subsets of base layer elements, which then require corresponding revealing layer line gratings to have also different periods $T_{r1}$, $T_{r2}$, . . . with $T_{r1}=T_{b1}$, $T_{r2}=T_{b2}$, . . . . As described in the section "Geometric transformation of base and revealing layers", geometric transformations may be applied to the base layer elements and to the corresponding revealing layers, preferably before embedding the shape elevation profile. In the case of different revealing layers, one may introduce different transformations for different subsets of base layer elements and their corresponding revealing layers.

Figure 53A:
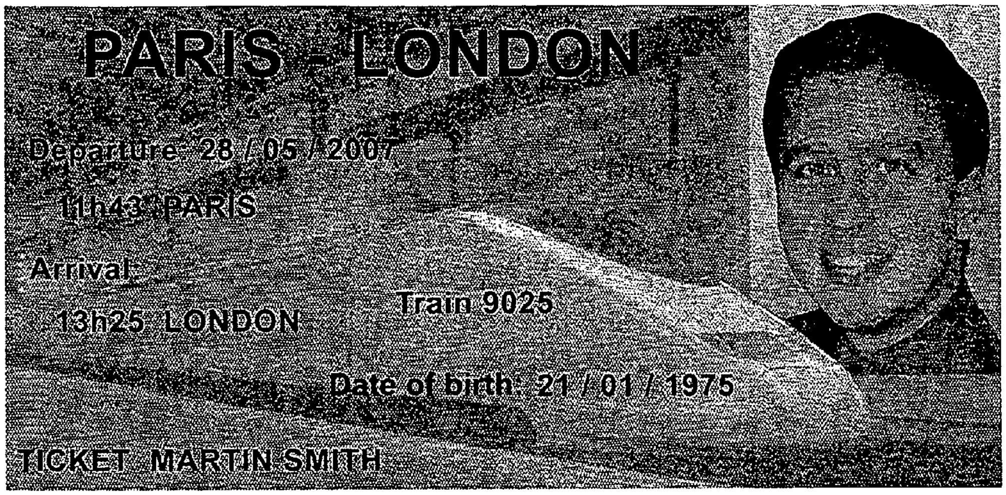
FIG. 53A shows a train ticket whose background image is a base layer forming a halftone image embedding several shape elevation profiles.
Figure 53B:
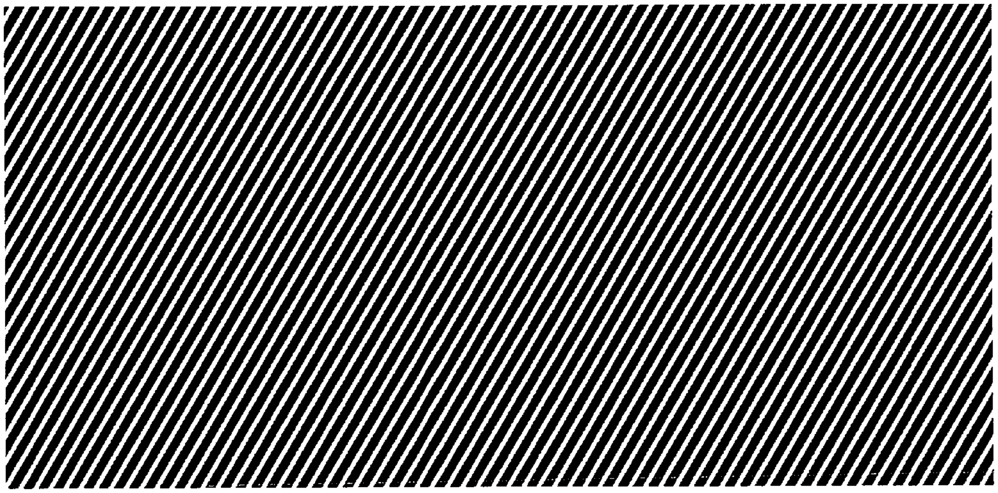
FIG. 53B shows an instance of a revealing layer line grating, scaled up by a factor of 5, with lines oriented at 60 degrees.

We may also produce as base layer a halftone image with shape elevation profiles embedded into the base layer elements forming its composed base layer. This composed base layer is used as dither matrix for creating the halftone image by dithering an original continuous tone (gray or color) image. As described in the section "Embedding the elevation profile into a halftone image", we produce for the mutually rotated base layer elements sets of lines composed of lines having increasing intensities covering the full intensity range. Each base layer element may also embed its own specific shape elevation profile. The shape elevation profiles need not be oriented perpendicularly to the corresponding base layer element sets of lines. They may have any orientation. The composed base layer then serves as a dither matrix for dithering an input grayscale or color image. Without superposition of the revealing layer line grating, the halftone image appears (e.g. FIG. 53A) and with superposition of the revealing layer at different orientations, different shape level lines appear (e.g. FIG. 54A at one orientation of the revealing layer and FIG. 54B at another orientation of the revealing layer). Again, by modifying the relative superposition phase of base layer and revealing layer, shape level lines move between shape boundaries and shape foreground and background centers.

Geometric transformations may be applied to both the base layer and the revealing layer before embedding the shape elevation profile. Such geometric transformations yield curvilinear sets of lines, i.e. curvilinear dither threshold profiles. Such curvilinear dither threshold profiles yield more pleasant halftoned images and offer a large variety of matching base layer and revealing layer pairs.

Embodiments of Base and Revealing Layers, in Respect to Band Moiré and Shape Level Line Images The base and revealing layers may be generated by any process allowing to create a pattern or to transfer a latent image onto a substrate, for example engraving, photolithography, light exposition of photo-sensitive media, etching, perforating, embossing, thermoplastic recording, foil transfer, ink-jet, dye-sublimation, foil stamping. etc. The term "imaging", when referring to a substrate, means transferring an image onto that substrate, e.g. by printing, by electrophotographic means, etc. and when referring to an electronic display means generating the corresponding image on that display. The base layer sets of lines or the revealing layer line grating may also be obtained by removal of matter, for example by laser etching, chemical etching or by laser perforation.

The base layer may be printed with standard inks (cyan, magenta, yellow and black) or with non-standard inks (i.e. inks whose colors differ from standard colors), for example Pantone inks, fluorescent inks, inks visible only under UV light (UV inks) as well as any other special inks such as metallic or iridescent inks.

Although the revealing layer (line grating) will generally be embodied by a film, a plastic opaque support incorporating a set of transparent lines, or a metallic disk incorporating holes, it may also be embodied by a line grating made of cylindric microlenses, also called lenticular lenses. Cylindric microlenses offer both a higher light intensity and a higher precision, compared with corresponding partly transparent line gratings. One can also use as revealing layer curvilinear cylindric microlenses.

A revealing layer line grating may be embodied by a set of transparent lines (e.g. FIG. 27, 273) within a light absorbing surface 272, by a set of transparent lines within a light absorbing transmissive support (e.g. imaged on a black film), by a set of transparent lines within an opaque or partially opaque support, or by cylindric microlenses, also called lenticular lenses. The base layer and revealing layer lines need not be made of continuous lines. A revealing line grating may be made of interrupted lines and still produce level lines. In the present invention the term "line grating" is used in a generic sense: besides its original meaning, it encompasses also geometrically transformed line gratings, gratings made of interrupted lines and gratings of lines embedding a spatial elevation profile.

It should be noted that the non-transparent parts of the revealing layers need not be opaque everywhere. They may be partly translucid or completely translucid. In the case of a spiral revealing layer disk, one part, e.g. a sector, of the non-transparent parts of the full revealing layer disk may be opaque, one part may be partly translucid and the remaining parts may be fully transparent (e.g. see below Embodiments H and I). By rotating such a revealing layer in superposition with a base layer, different sectors of the base layer are successively covered by the revealing layer and yield different moiré images, e.g. the watch face digits 12, 3, 6, and 9.

In the case that the base layer is incorporated into an optically variable surface pattern, such as a diffractive device, the image forming the base layer needs to be further processed to yield for each of its pattern image pixels or at least for its active pixels (e.g. black or white pixels) a relief structure made for example of periodic function profiles (line gratings) having an orientation, a period, a relief and a surface ratio according to the desired incident and diffracted light angles, according to the desired diffracted light intensity and possibly according to the desired variation in color of the diffracted light in respect to the diffracted color of neighbouring areas (see U.S. Pat. No. 5,032,003 inventor Antes and U.S. Pat. No. 4,984,824 Antes and Saxer). This relief structure is reproduced on a master structure used for creating an embossing die. The embossing die is then used to emboss the relief structure incorporating the base layer on the optical device substrate (further information can be found in U.S. Pat. No. 4,761,253 inventor Antes, as well as in the article by J. F. Moser, Document Protection by Optically Variable Graphics (Kinegram), in Optical Document Security, Ed. R. L. Van Renesse, Artech House, London, 1998, pp. 247-266).

In a further embodiment, the base layer and the revealing layer are fixed one in respect to the other, separated by a thin, at least partly transparent layer, i.e. a layer which does not scatter light and which transmits a fraction of light at least in part of the wavelength range of interest (e.g. the visible wavelength range). When moving the eyes across the revealing layer line grating, due to the parallax effect (see [VanRenesse98], section 9.3.2), an apparent displacement between base layer and revealing layer is generated which yields the dynamic moiré effects, or respectively the dynamic elevation level lines displacements described above. In a general setup, the composed layer (fixed setup) comprising base layer and revealing layer can be observed at angles varying between $-\alpha$ (e.g. −45 degrees) and $\alpha$ (e.g. +45 degrees) in respect to the composed layer's normal vector. The corresponding part d of the base layer viewed through the revealing layer transparent lines or respectively sampled by the revealing layer lenticular lenses when varying the observation angle is therefore $$d=2\ h \tan \alpha \qquad (36)$$

i.e. twice the distance h (also called gap) between base band layer and revealing layer multiplied by $\tan\alpha$, e.g. in the case of $\alpha x=\pi/4$ (45 degrees), we have d=2*h. In order to see the apparent displacement of a full moiré period by tilting the composed layer from $-\alpha$ (e.g. −45 degrees) to $\alpha$ (e.g. +45 degrees), the base band width w, respectively the sets of lines period $T_b$ (FIG. 26) should not be larger than 2 h tan $\alpha$, i.e. not larger than twice the distance between base band layer and revealing layer multiplied by $\tan\alpha$. In order to create a composed layer with a very small distance h between base band layer and revealing layer (e.g. between h=5 μm to h=100 μm), the base bands width w, respectively the sets of lines period $T_b$, should have a size smaller than 2 h tan $\alpha$, i.e. a size smaller than the space that is scanned by the eye when tilting the composed layer from $-\alpha$ to $\alpha$ in respect to the composed layer's normal. The base band patterns, respectively the sets of lines, may be produced by very fine imaging technologies, such as laser engraving (see [VanRenesse98], section 9.3).

Figure 52:
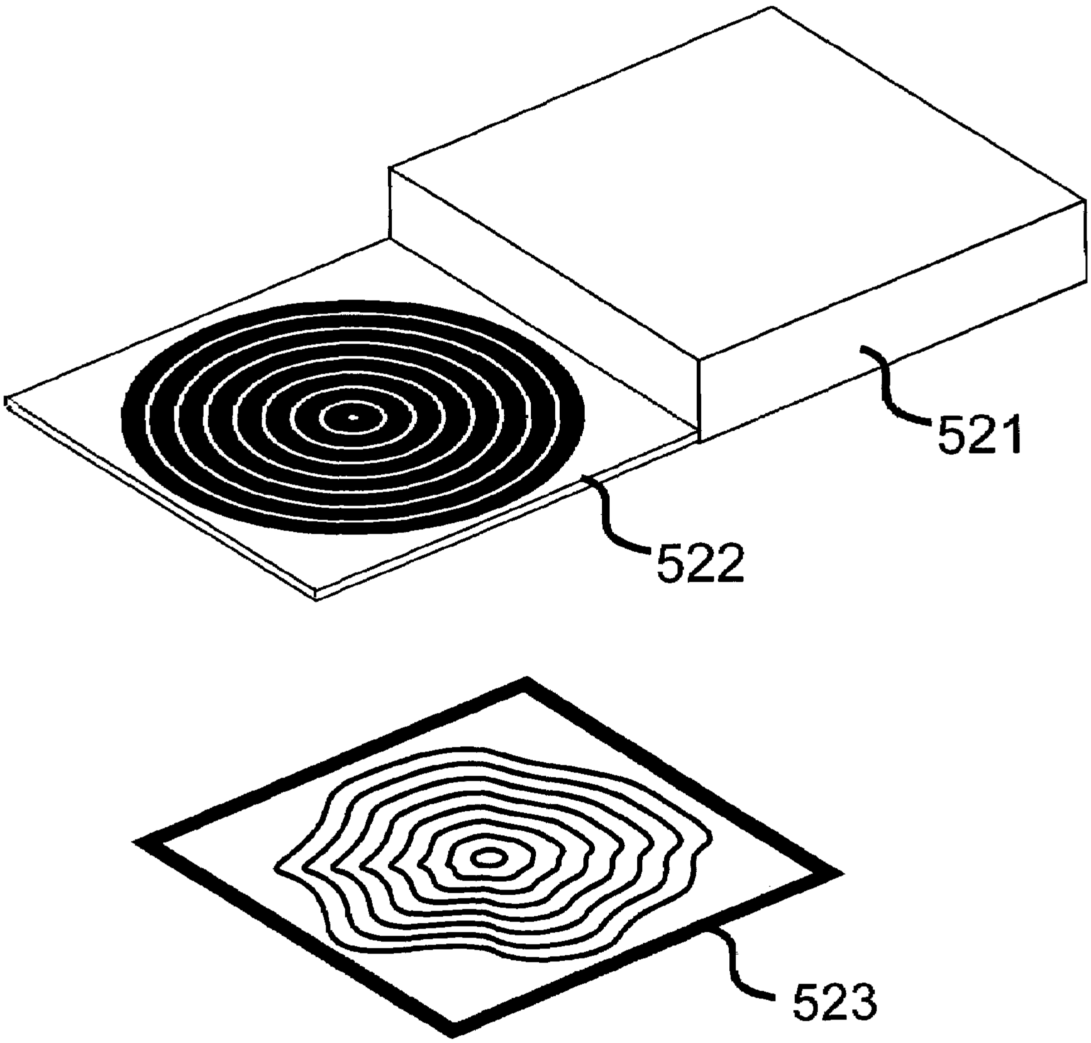
FIG. 52 shows a base layer and on top of it a revealing layer embodied by an electronic display working in transmission mode attached to a computing device.

In a further embodiment, the base layer or the revealing layer or both may be embodied by an electronic display driven by a computer program (FIG. 52). By electronically generating successive images of one of the layer moving in respect to the other, a dynamic superposition image is formed, by moving moiré shapes, by moving shape level lines, or by both. It is possible to have a fixed base layer 523 and in superposition with it an electronic transmissive revealing layer 522 or vice-versa. This last category of embodiments comprises electronic displays, electronic watches, electronic clocks, game devices.

Further embodiments are possible, for example by combining within the same base layer both a base band grating and modified sets of lines, which, when superposed with a revealing line grating, generate a superposition image comprising both band moiré shapes and shape level lines.

EMBODIMENTS FOR WATCHES (INCLUDING CLOCKS), VALUABLE ARTICLES AND PUBLICITY

Embodiment A

Revealing Layer Moving Along a Bracelet

Figure 24:
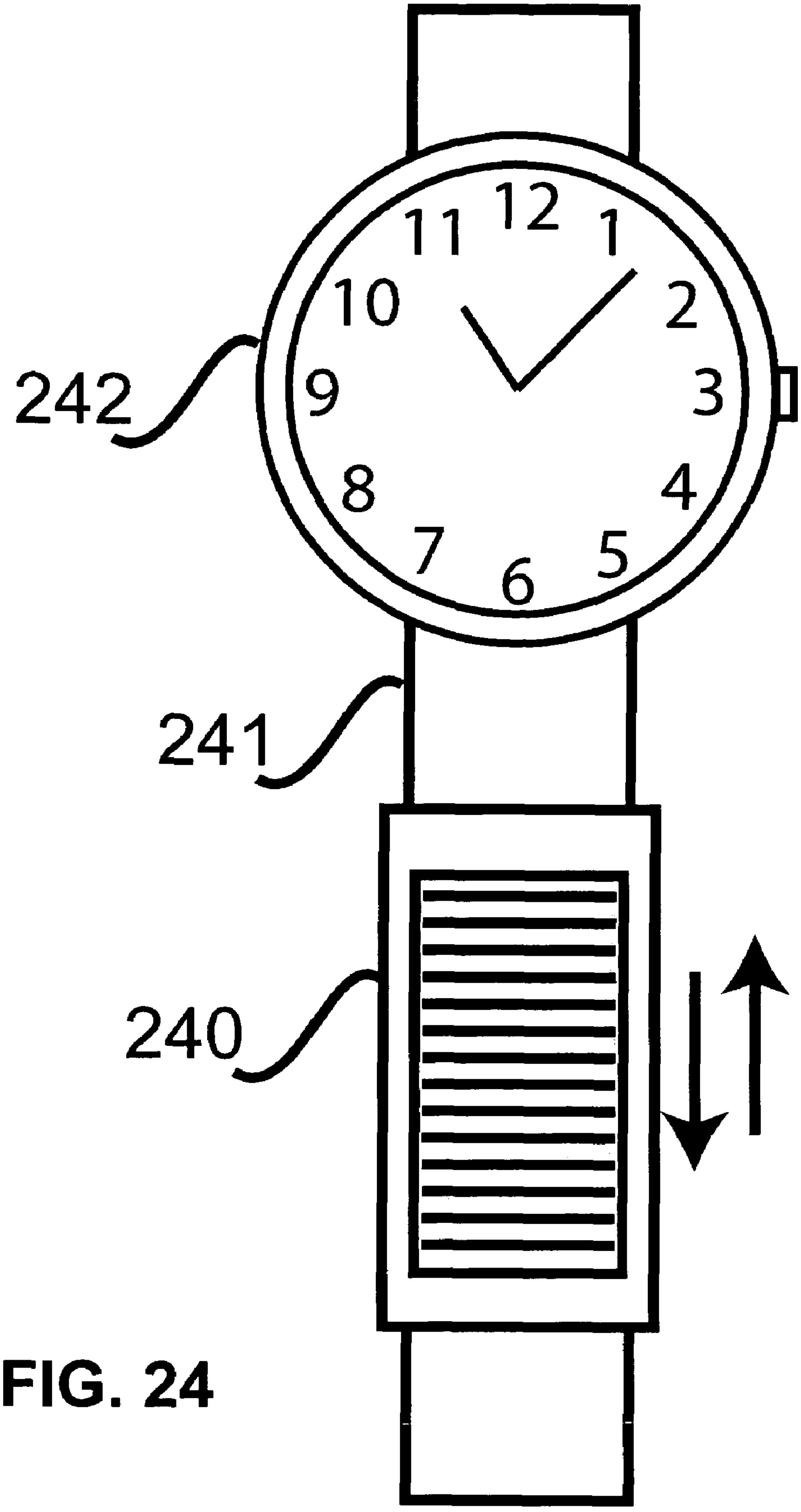
FIG. 24 shows a watch, whose bracelet comprises a moving revealing line grating layer yielding a band moiré image.

FIG. 24 illustrates an embodiment of the present invention for watches 242. A base band grating layer may be created on the plastic bracelet 241 of a watch. The revealing line grating may be part of a second layer 240 able to move slightly along the bracelet. When the revealing line grating moves in superposition with the base band grating located on the bracelet, moiré shapes may move in various directions and at different speeds. The moiré shapes may also move radially in and out when the revealing line grating moves in superposition with the base band grating located on the bracelet (see Example C "Circular band moiré image and rectilinear revealing layer").

Embodiment B

Figure 55B:
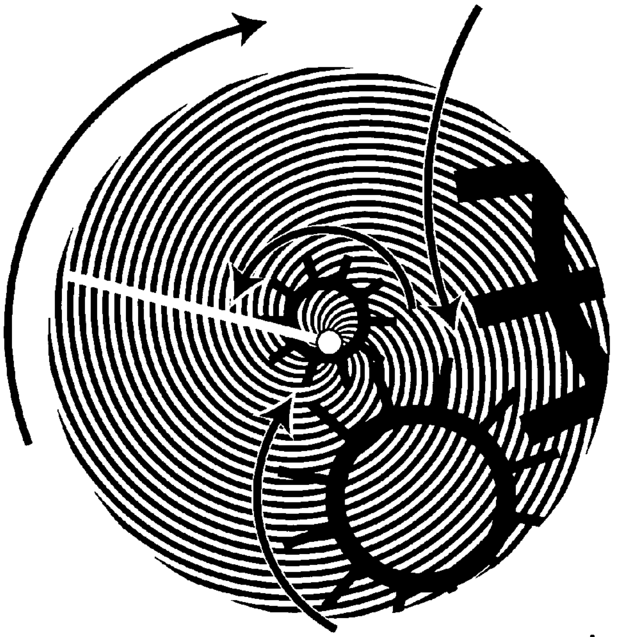
FIGS. 55A and 55B show an example of a rotating spiral shaped revealing layer line grating yielding as superposition images gear wheels.
Figure 55A:
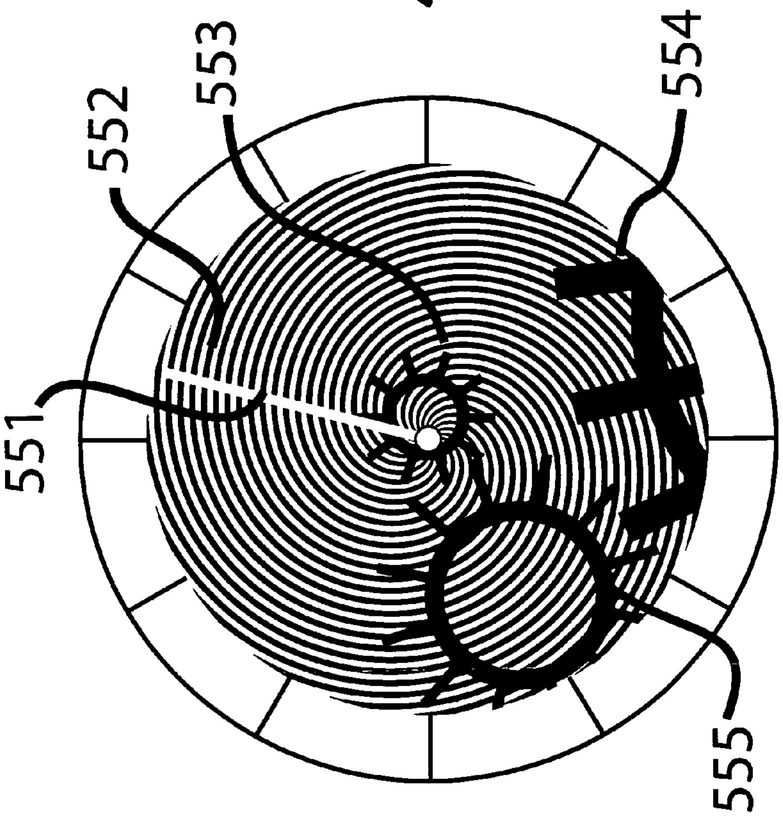

Rotating Spiral Revealing Layer Creating as Dynamic Moiré Image Synchronized Rotating Gears FIGS. 55A and 55B illustrate a different embodiment of the present invention, where for example the rotating spiral revealing layer 552 carries out one rotation in 60 seconds and where the watch hand representing the seconds is embodied e.g. by a thick line 551 on the revealing layer or by a hole in the revealing layer, showing the undelying base layer. The base layer comprises the layout of two or more transformed base band images yielding upon superposition with the rotating revealing layer as dynamic band moiré image two or more rotating gear wheels 553, 554, 555. The rotating gear wheels symbolically represent the continuously evolving time. They therefore add an emotional element to the watch and make it very attractive and valuable. A similar embodiment can used in other valuable articles e.g. on the wheel of a vehicle. A rotating wheel may induce the rotation of the base or revealing layer and thereby induce as dynamic band moiré image synchronized rotating gear wheels. Such a dynamic band moiré image reinforces the dynamic appearance of the vehicle. Moiré images showing off-centered rotating gear wheels are obtained by creating a rectilinear moiré image layout comprising a straight rectilinear gear, specifying as moiré layer transformation a circular transformation (according to the circular band moiré image layout equations (28)) yielding the circular gear wheel followed by a translation yielding its off-centered position. The rotation of the gear wheel is obtained (see Example F "Circularly transformed moiré image moving circularly") by specifying in the original rectilinear space a horizontal base band repetition vector. The spiral revealing layer layout is specified as in Example E "Circularly transformed band moiré image generated with a spiral shaped revealing layer". In order to provide the exact gear functionality, the diameter of the rotating gear wheels and the spacing of their teeth should be specified as in classical mechanical gears. The common revealing layer ensures that the gear wheels perform a same angular rotation during the same time interval. With separate revealing layers rotating at different angular speeds one may conceive gear wheels also rotating at different angular speeds.

Embodiment C

Figure 56B:
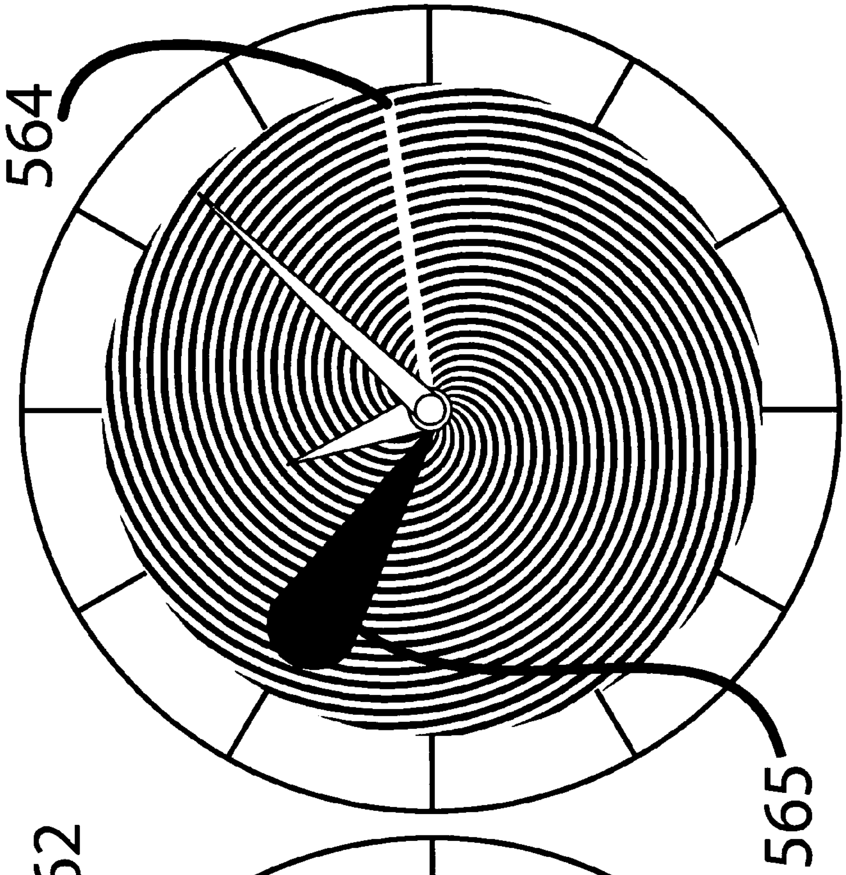
FIGS. 56A and 56B show a rotating spiral shaped revealing layer line grating yielding as dynamic superposition image a new element rotating at a different speed.
Figure 56A:
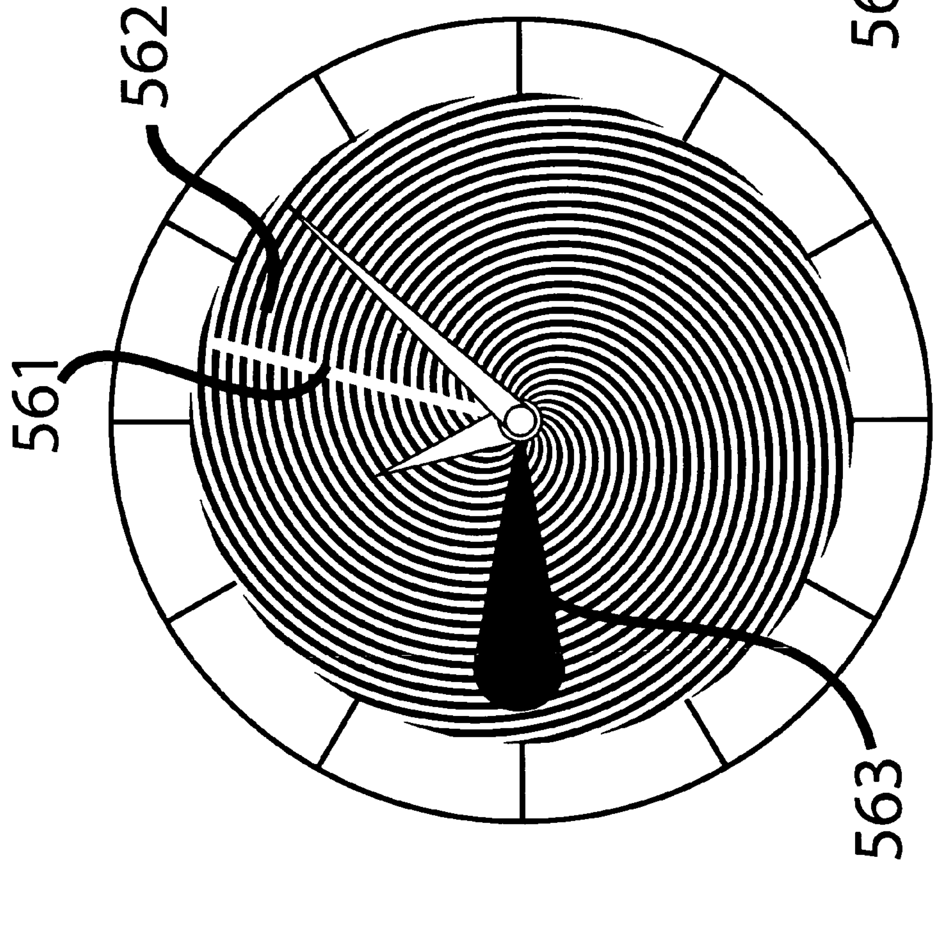
Figure 57B:
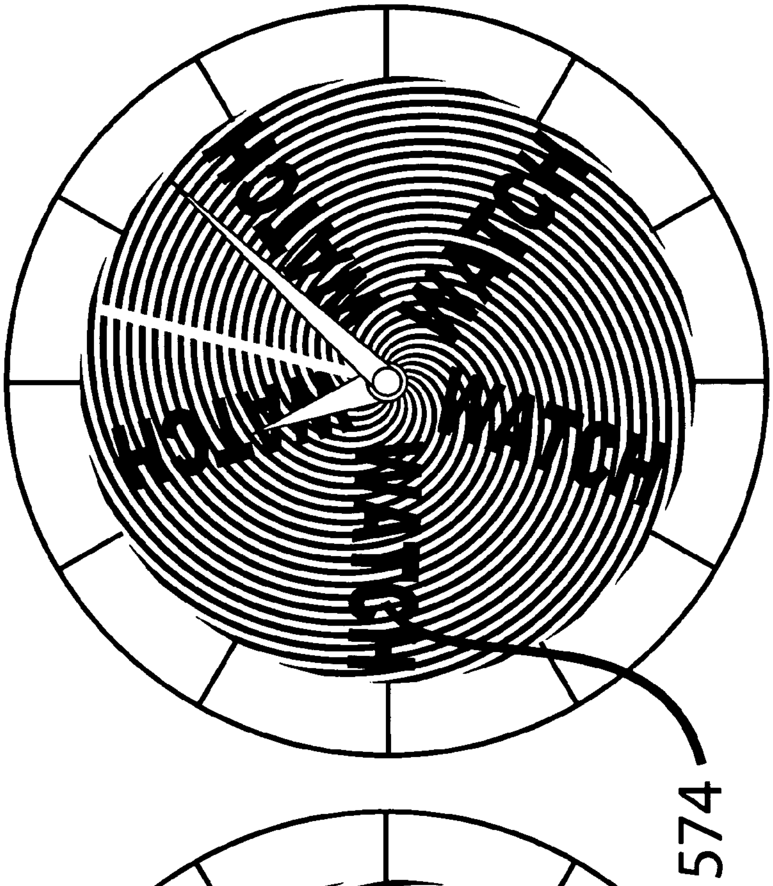
FIGS. 57A and 57B show examples similar to the previous one, but with a rotating moiré image comprising 5 elements, e.g. flower petals or text words.
Figure 57A:
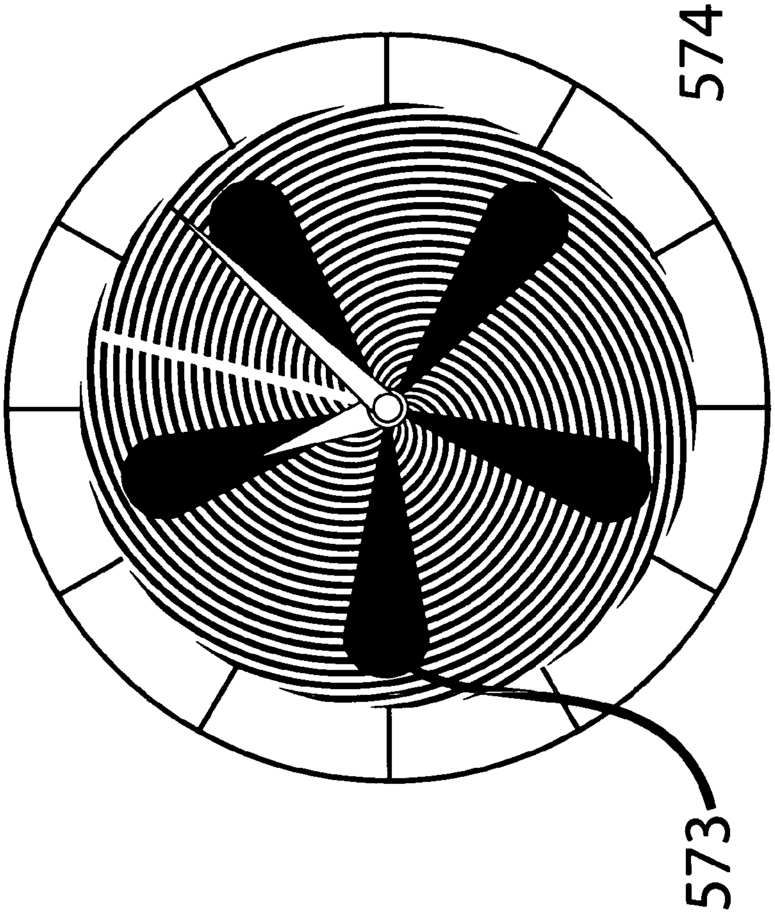

Rotating Spiral Revealing Layer Creating a Dynamic Moiré Image Representing an Additional Rotating Element FIGS. 56A and 56B illustrates a further embodiment of the present invention, where the rotating spiral revealing layer disk 562 carries out one rotation in 60 seconds, where the second-hand is embodied by a transparent line (561, 564) within the revealing layer disk and where the base layer comprises the layout of a transformed base band image yielding upon superposition with the rotating revealing layer disk as dynamic band moiré image an additional rotating element (563, 565) rotating at a speed different from the revealing layer disk. In a manner similar as above, this embodiment (without the transparent line representing the watch hand) is also applicable to other valuable articles such as vehicles. The moiré image of the additional rotating element is obtained as shown in example Example E, Circularly transformed band moiré image generated with a spiral shaped revealing layer, and by specifying in the original rectilinear space a horizontal base band repetition vector. One may have a moiré image comprising several elements (FIG. 57A) by introducing in the original rectilinear moiré image layout several elements 573. As rotating elements, one may introduce any shape, e.g. text words (FIG. 57B). In the latter case, the text words 574 rotate around the center.

Embodiment D

Figure 58B:
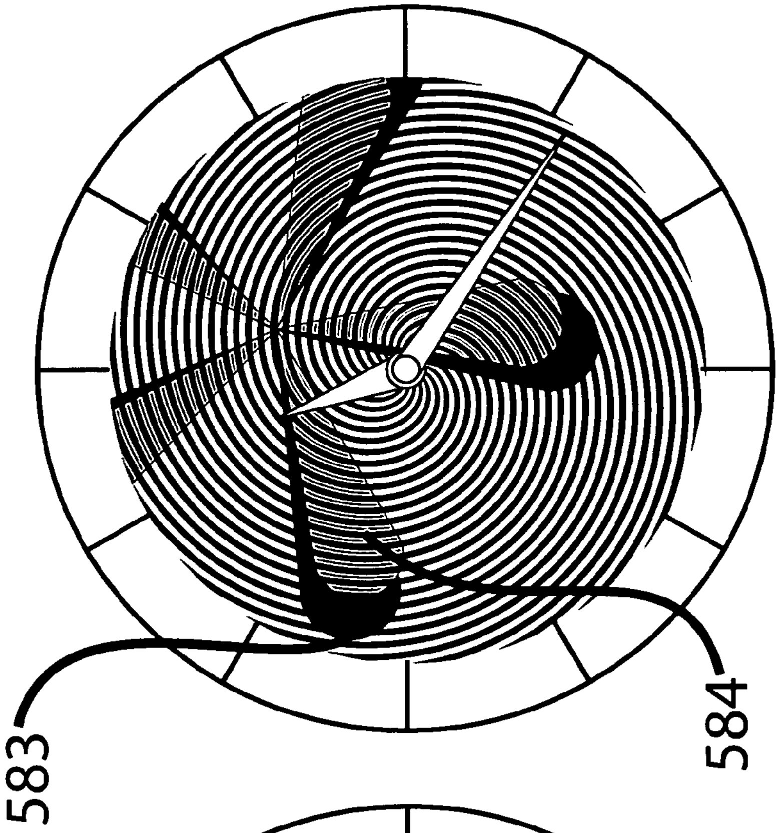
FIGS. 58A and 58B show a rotating spiral shaped revealing layer line grating yielding off-centered rotating moiré elements who overlap at constant time intervals.
Figure 58A:
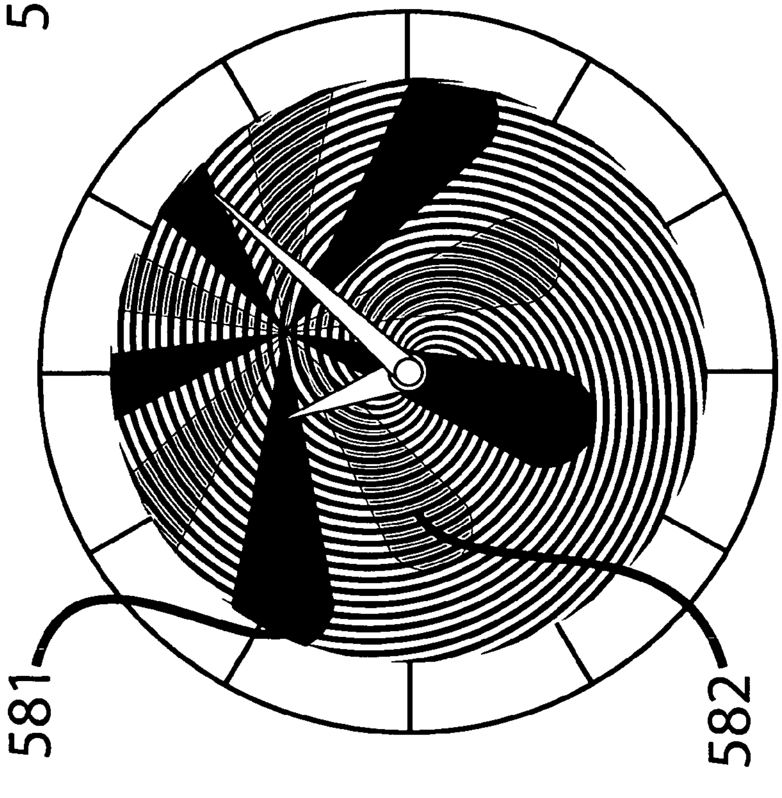

Rotating Spiral Revealing Layer Creating as Dynamic Moiré images off centered Elements Rotating at Inverse Orientations FIG. 58 illustrates a further embodiment of the present invention, where two off centered rotating elements (e.g. shafts or flower petals 581, 582) rotate in inverse orientations, one counter-clockwise 581 and one clockwise 582, meeting together and overlapping at periodic time intervals (583, 584). This embodiment is also applicable to other valuable articles having moving parts such as vehicles. The layout of the rotating off-centered circular moiré image elements is created as in Embodiment B above.

Embodiment E

Figure 59B:
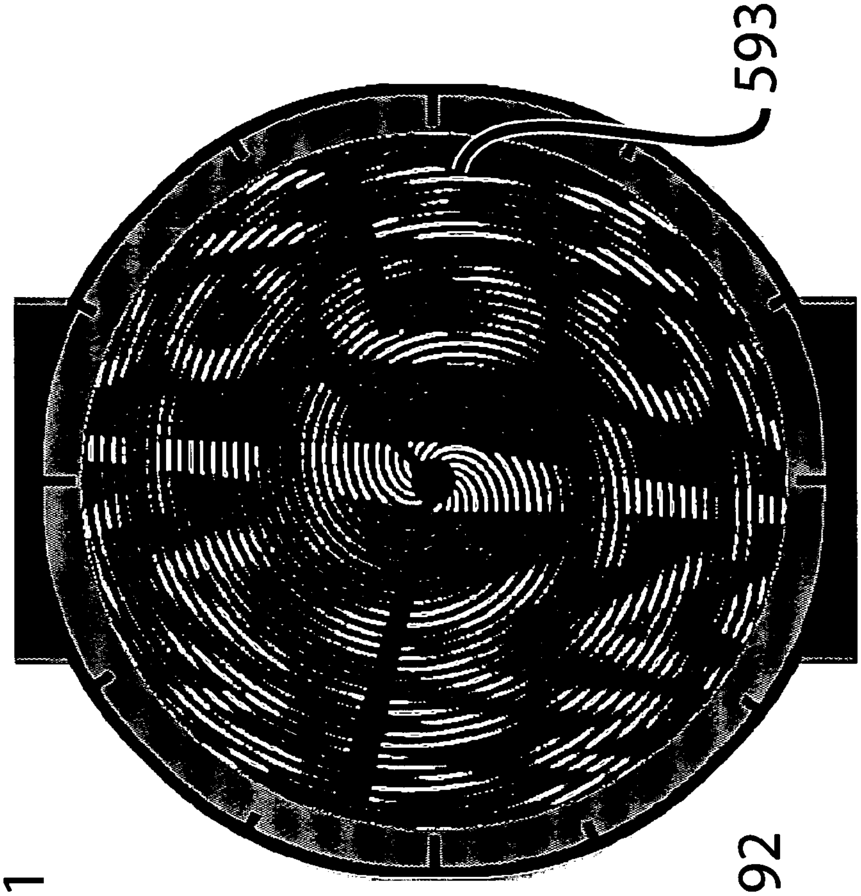
FIGS. 59A and 59B show a rotating spiral shaped revealing layer line grating comprising the second-hand, yielding as superposition image a moving moiré shape text subject to a fish-eye transformation.
Figure 59A:
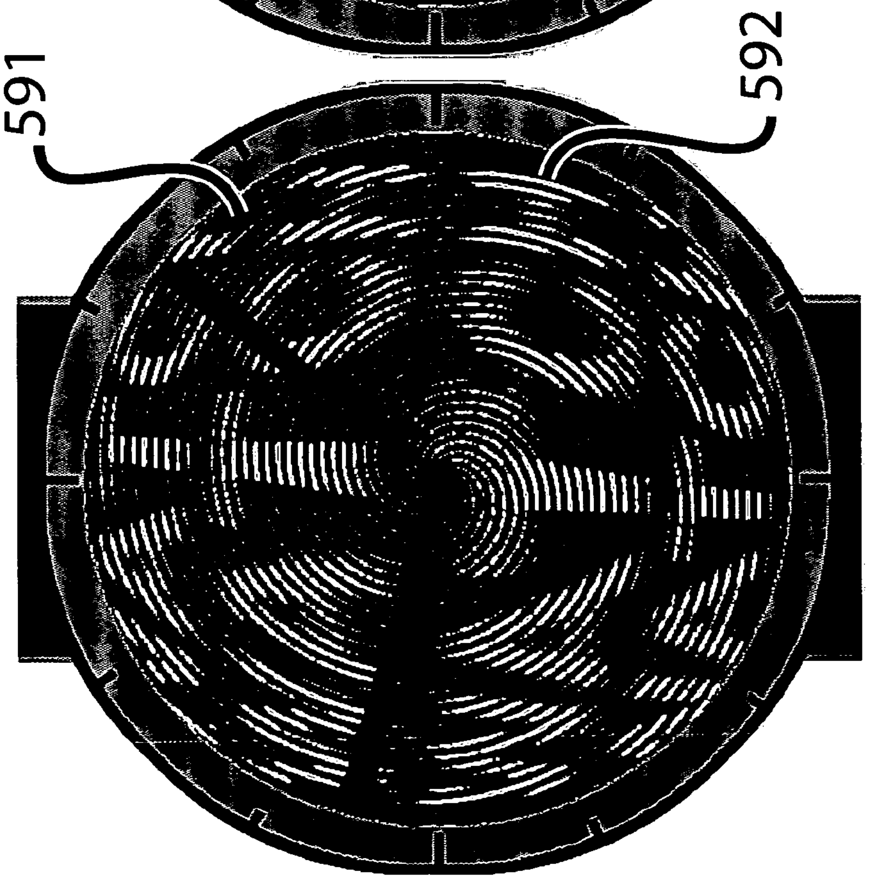
Figure 60B:
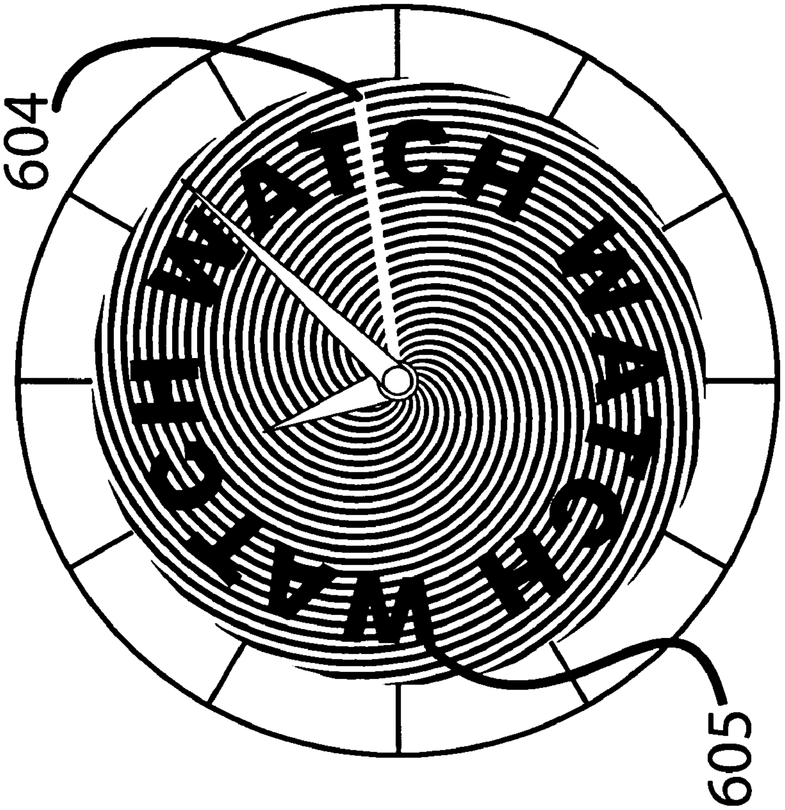
FIGS. 60A and 60B show a rotating spiral shaped revealing layer line grating yielding as superposition image a moiré shape text moving along a spiral and becoming successively larger.
Figure 60A:
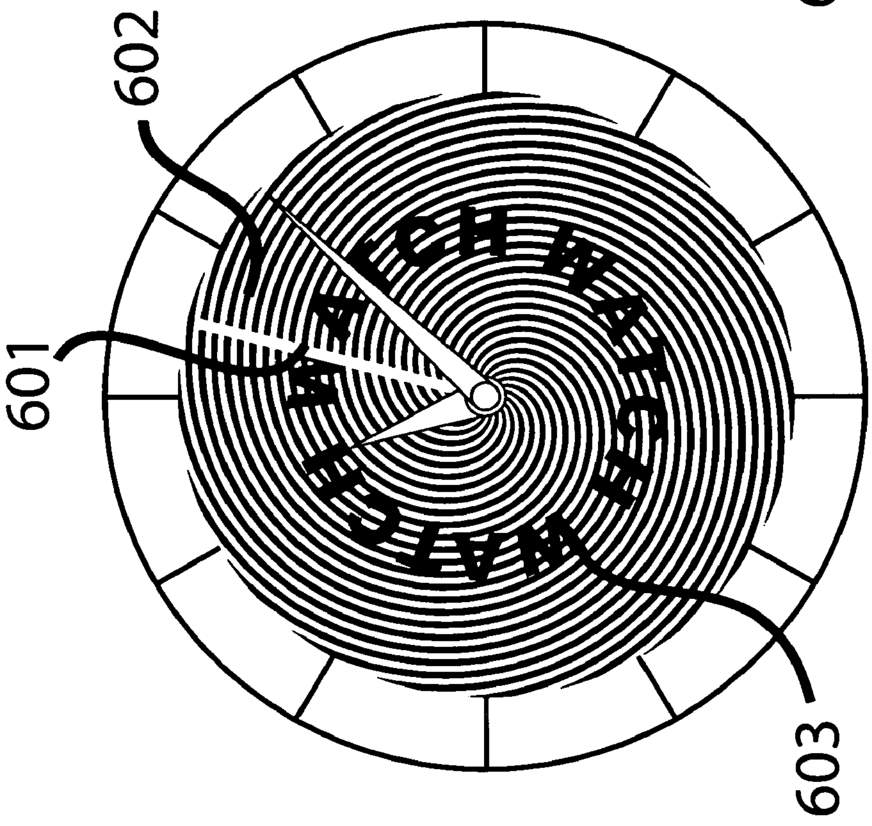

Rotating Spiral Revealing Layer (FIG. 59, 591) Creating as Dynamic Moiré Image a Moving Message FIGS. 59A and 59B shows a further embodiment of the present invention, where a word, e.g. "watch" is a moiré shape which moves diagonally upwards when rotating the spiral revealing layer in superposition with the base layer. In addition, in the present example, the moiré is subject to a fish-eye transformation. In a manner similar as above, this embodiment is also applicable to other valuable articles such as bikes, and cars. This moiré image layout is obtained by specifying an original rectilinear moiré image layout having an oblique moiré base line orientation and an oblique repetition vector, for example perpendicular to the base line's orientation. A fish-eye geometric transformation specifies the transformation from transformed moiré image space back into the original rectilinear moiré image space. The corresponding base layer layout is then deduced according to the base layer transformation H shown in formula (24). When rotating the revealing layer in superposition with the base layer, the moiré shapes which represent the text message (592) move across the fish-eye transformation (593). As an alternative, such a moiré text (FIG. 60A, 603→605) message may be laid out circularly and move outwards along a slightly curved spiral trajectory (FIG. 60B, 605). In the present example, the second-hand is incrusted as a thick transparent line (601, 604) within the spiral revealing layer 602.

Embodiment F

Rotating Spiral Revealing Layer Creating as Dynamic Superposition Image a Pulsing Shape Message, Obtained by Elevation Level Lines Moving Between Shape Foreground, Respectively Shape Background and Shape Boundaries This embodiment is similar as Embodiment E, but instead of creating a base layer yielding thanks to the band moiré effect a moving message, we create, thanks to the elevation level line method, a base layer inducing as dynamic superposition image a pulsing shape message whose elevation level lines move between shape foreground, respectively shape background and shape boundaries, in a similar manner as in FIGS. 47 and 48. The corresponding pulsing period provides a symbolic reference to the running time.

Embodiment G

Figure 61:
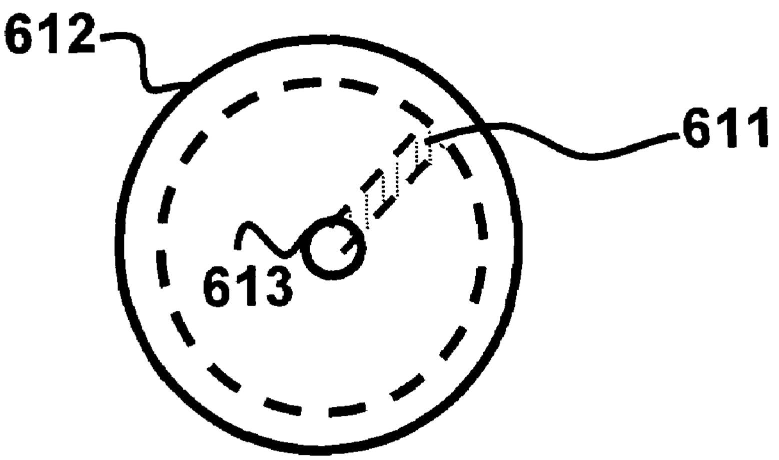
FIG. 61 shows a valuable article comprising a mechanism 613 rotating the base layer 611, thereby generating a dynamic superposition image.
Figure 62:
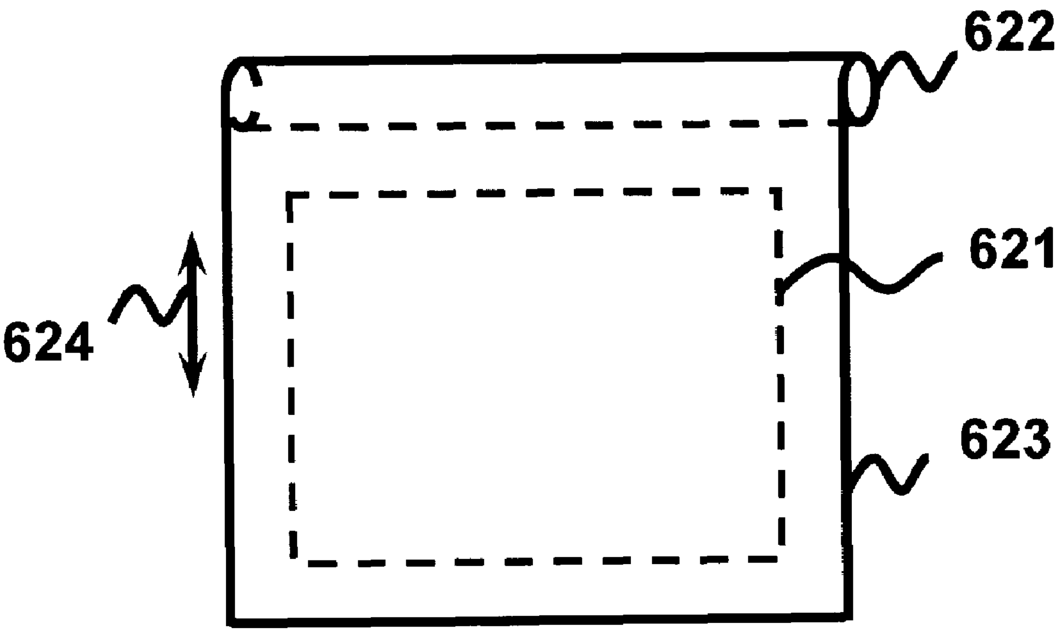
FIG. 62 shows a publicity display device comprising a mechanism moving either the base or the revealing layer, thereby generating a dynamic superposition image.

Rotating Spiral Revealing Layer Creating as Dynamic Superposition Image Either a Moving Publicity Message or a Publicity Message Whose Shape Elevation Level Lines Move Between Shape Foreground Center, Respectively Shape Background Center and Shape Boundaries An embodiment similar to Embodiments E or F can create a dynamically evolving publicity message formed by text, symbols, logos and/or ornaments. In that case, a simple rotating mechanism (FIG. 61, 613) rotates the base layer 611 or the revealing layer 612. The base and revealing layers may be large and cover a substantial of a shop's window. They may also for example be put along a wall of a house and be very large. In order to create a large band moiré image message, the revealing layer period can be as large as desired, from millimeters to centimeters or even decimeters. An alternative simple mechanism (FIG. 62, 622) may provide a back and forth movement of one of the layers 623. Such a back and forth movement may be created by classical mechanisms (e.g. successive clockwise and counter-clockwise small rotations of a cylinder transmitting the resulting vertical up-down movement to one of the layers). Since the relative movement 624 of e.g. the revealing layer 623 on top of the base layer 621 of a period as small as the revealing layer line grating period generates a band moiré image moving by one replication period, it is generally sufficient to have a back and forth movement as small as a few revealing layer line grating periods.

Embodiment H

Figure 63A:
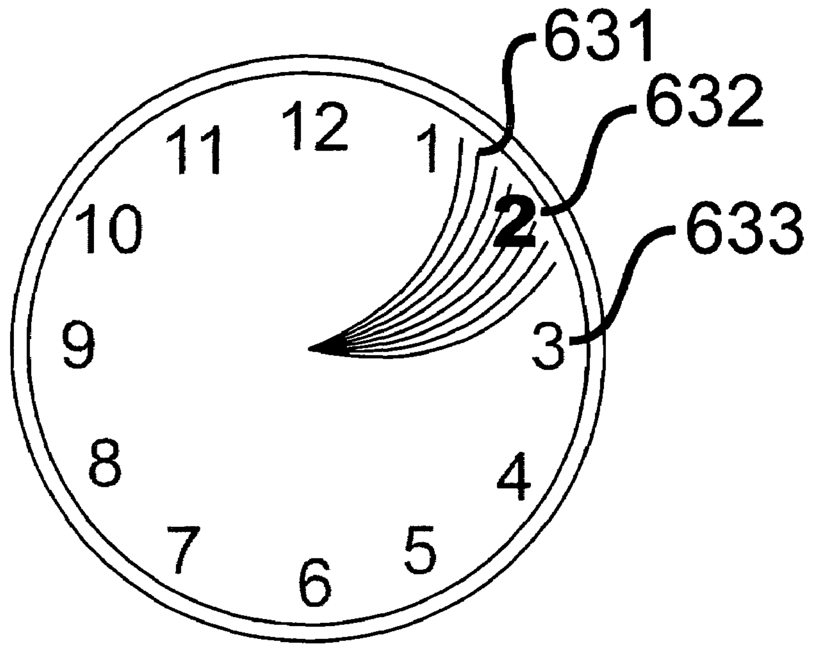
FIG. 63A shows a revealing line grating 631 comprising one sector of the revealing layer disk, which upon superposition at the correct location, reveals the dynamic number 632 representing the presently pointed hour digits.

Rotating Spiral Revealing Layer Covering a Sector of a Full Disk, Revealing as Dynamic Superposition Image Dynamic Numbers Related to the Currently Pointed Watch Face Digits As a further embodiment, one may create a spiral revealing layer covering a sector of a full disk (FIG. 63A, 631). Such a rotating spiral revealing layer, possibly associated with the second hand, will reveal, when passing at the corresponding locations, as dynamic superposition image, the dynamic numbers related to the currently pointed watch face digits (FIG. 63A, 632). The uncovered locations 633 only contain the base layer elements. If the base layer is generated according to the band moiré method, the superposition image is a band moiré image, where the numbers move from their location to a neighbouring location. If the base layer is generated according to the shape elevation profile method, the superposition image comprises elevation level lines which move between the number shape boundaries and foreground, respectively background centers, as in FIG. 48, with letters "B" and "C" replaced by numbers. The base layer may itself form a halftone image, as is shown in FIGS. 49 and 50.

Embodiment I

Figure 54A:
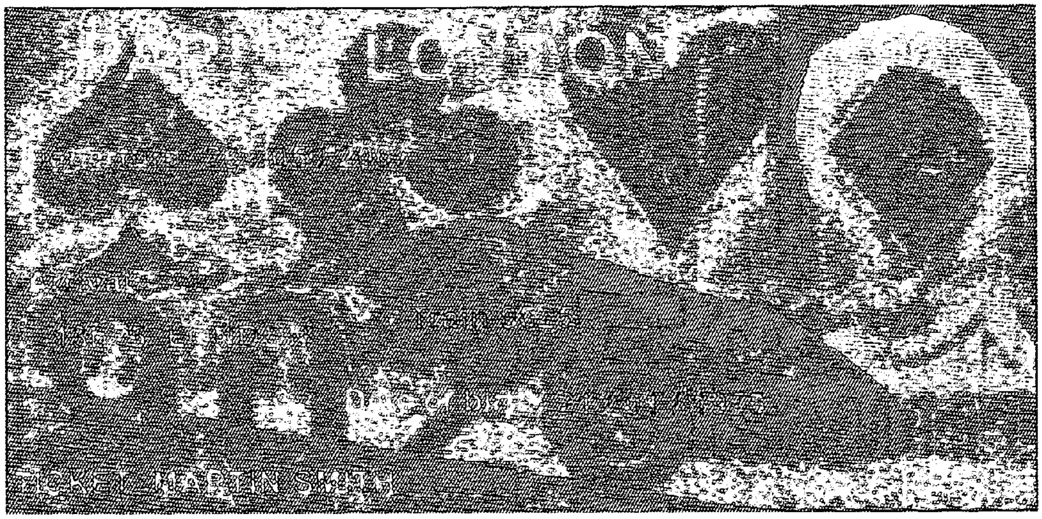
FIG. 54A shows shape level lines obtained by the superposition of the base layer shown in FIG. 53A and of a non-scaled instance of the revealing layer shown in FIG. 53B.
Figure 54B:
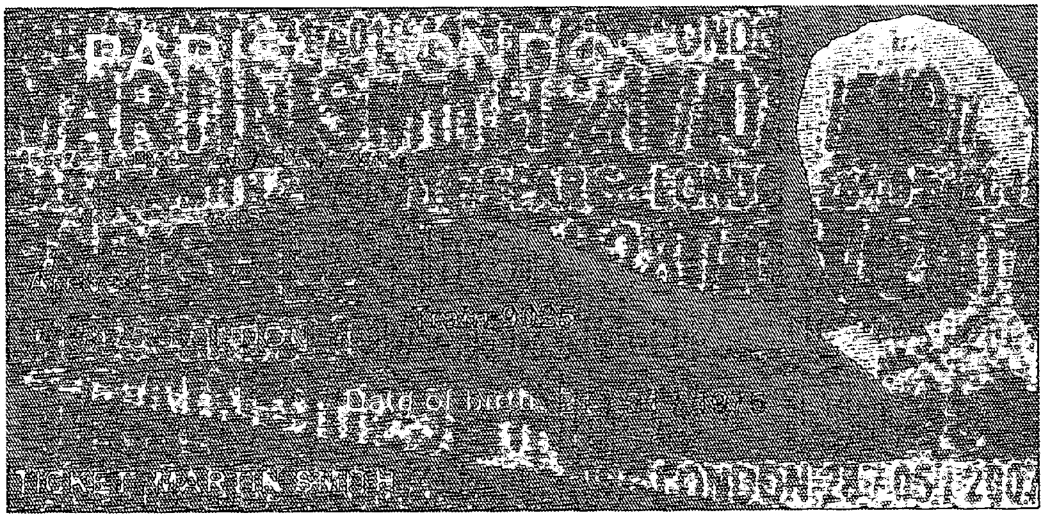
FIG. 54B shows other shape level lines obtained by the same superposition as in FIG. 54A, but with the revealing layer turned on its back face, with revealing lines having an orientation of 120 degrees.
Figure 63B:
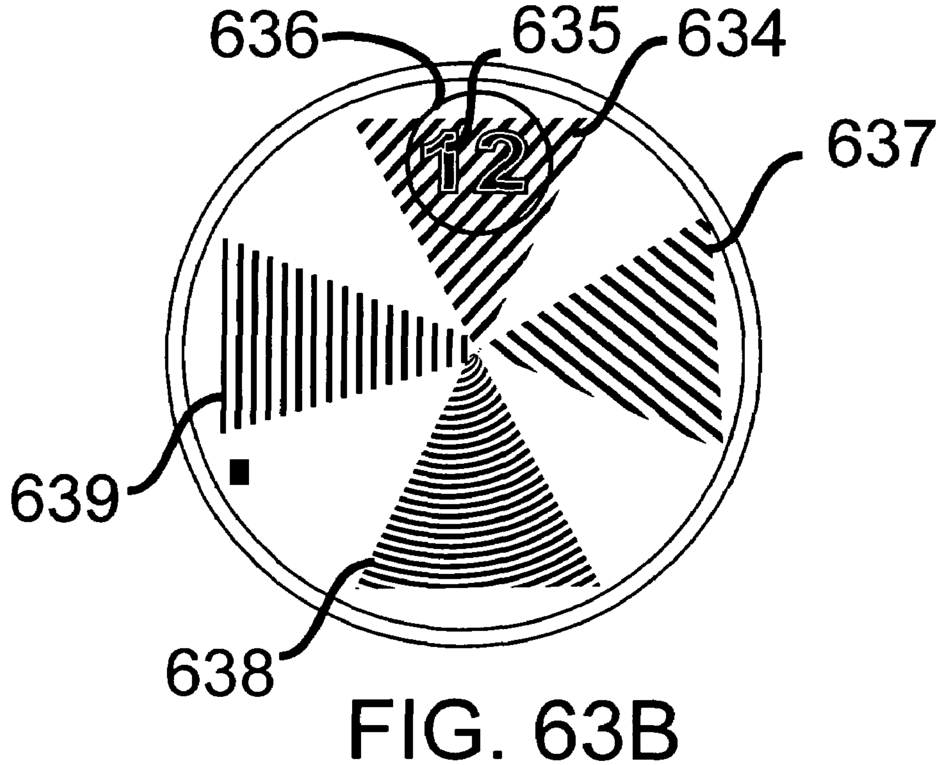
FIG. 63B shows a revealing line grating disk comprising 4 different revealing line gratings, each one revealing its specific superposition image.

Revealing Layer Covering Several Sectors of a Full Disk, Each Sector Incorporating its Own Geometrically Transformed Line Grating Revealing as Specific Dynamic Superposition Image a Number Representing for Example the Presently Pointed Hour Digits This embodiment (FIG. 63B) is similar to embodiment H, but since each sector of the revealing disk incorporates its specific layout, i.e. a geometrically transformed line grating, several numbers may be positioned at the same location 636, as in the base layers of FIGS. 54A and 54B. A given sector 634 of the revealing layer will then reveal exactly the number 635 (e.g. number 12) associated to its specific layout. This enables e.g. to have the revealing layer disk acting as a second hand and showing at the same position 636 successively the numbers representing the presently pointed hour digits, e.g. in case of 4 different sectors 634, 637, 638, 639, the numbers 12, 3, 6, and 9. The base layers may be embodied either with the band moiré synthesis methods or with the level lines synthesis methods. An alternative consists in placing the numbers at slightly different positions and to correspondingly adapt the layout of the revealing layer, ensuring thereby that a different number is shown for each different revealing layer sector.

Embodiment J

Rotating Spiral or Translational Revealing Layer Covering a Heart Symbol

Figure 64A:
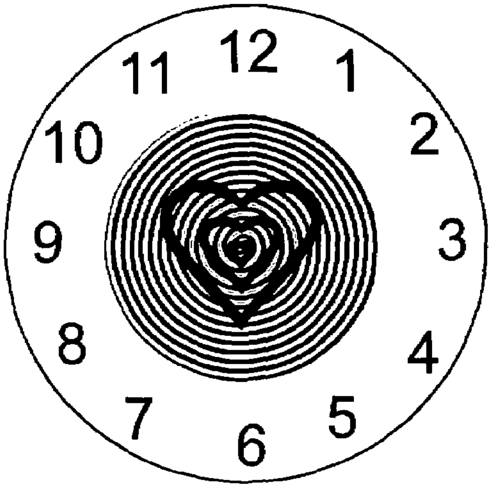
FIG. 64A shows a pulsing heart shape produced thanks to a spiral shape revealing line grating rotating in superposition with modified sets of lines embedding a heart shape elevation profile.
Figure 64B:
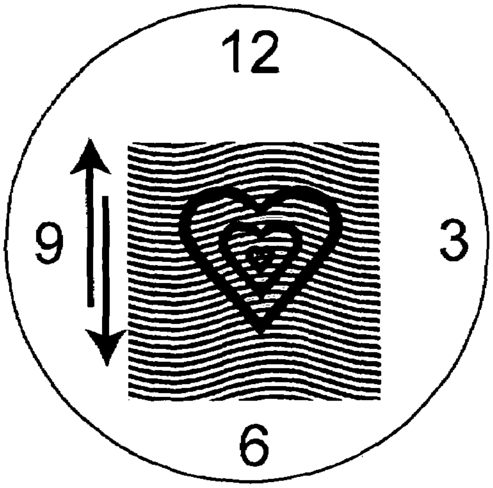
FIG. 64B shows a similar pulsing heart shape as in the previous figure, but produced thanks to the superposition with a back and forth moving cosinusoidal shape revealing line grating.

The heart symbolizes love and is therefore an appreciated symbol in watches and valuable articles. Depending on the embodiment of the base layer image (band moiré or elevation profile method, the heart may either move or show its pulsing shape thanks to the moving level lines (FIG. 64A: rotating spiral revealing layer). A variant of this embodiment is a translational revealing layer moving on top of the base layer and revealing as above, in case of a band moiré a moving heart or in case of an elevation profile a pulsing heart (FIG. 64B).

Embodiment K

Several Revealing Layers

Figure 65:
FIG. 65 shows two different revealing layers rotating back and forth and revealing different, possibly synchronized moiré shapes or shape level lines.

A watch has generally several rotating wheels and may therefore transfer a rotational movement, possibly back and forth movements, to several revealing layers (FIG. 65). Each revealing layer may yield its own dynamic superposition image (e.g pulsing heart, numbers, text message, etc.).

Embodiment L

Base Layers and Revealing Layers in Superposed Tissues

Figure 66:
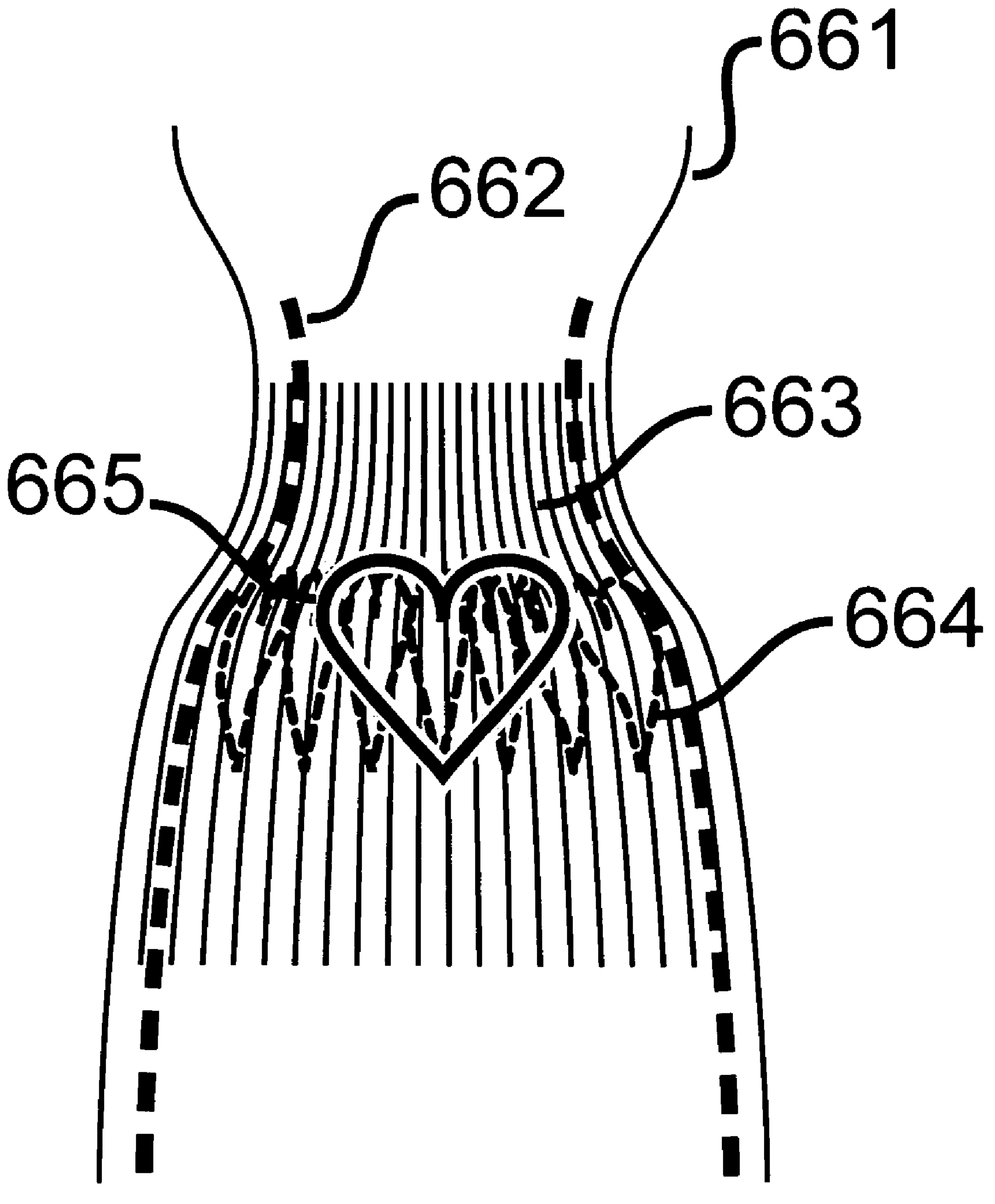
FIG. 66 shows a woman's dress comprising two superposed layers of tissue, one incorporating the base layer and the second one the revealing layer, where the natural movement of the woman's body creates the relative movement between base and revealing layer, yielding the dynamic superposition image.

Fashion clothes such dresses, skirts and shawls are often made of superposed layers of semi-transparent tissue (FIG. 66). One layer may 662 serve as the base layer and the other layer may serve a the revealing layer 663. The natural movement of a human body 661 will then create relative movements between base layer and revealing layer yielding dynamic superposition images 665, which depending on the method for generating the base layer (a base band grating 664 or modified sets of lines), are either dynamic band moiré images or dynamically evolving shape level lines.

Embodiment M

Dynamic Evolving Superposition Images Generated by Opening or Closing a Bottle Having a Lid (or a Screw-Top)

Figure 67:
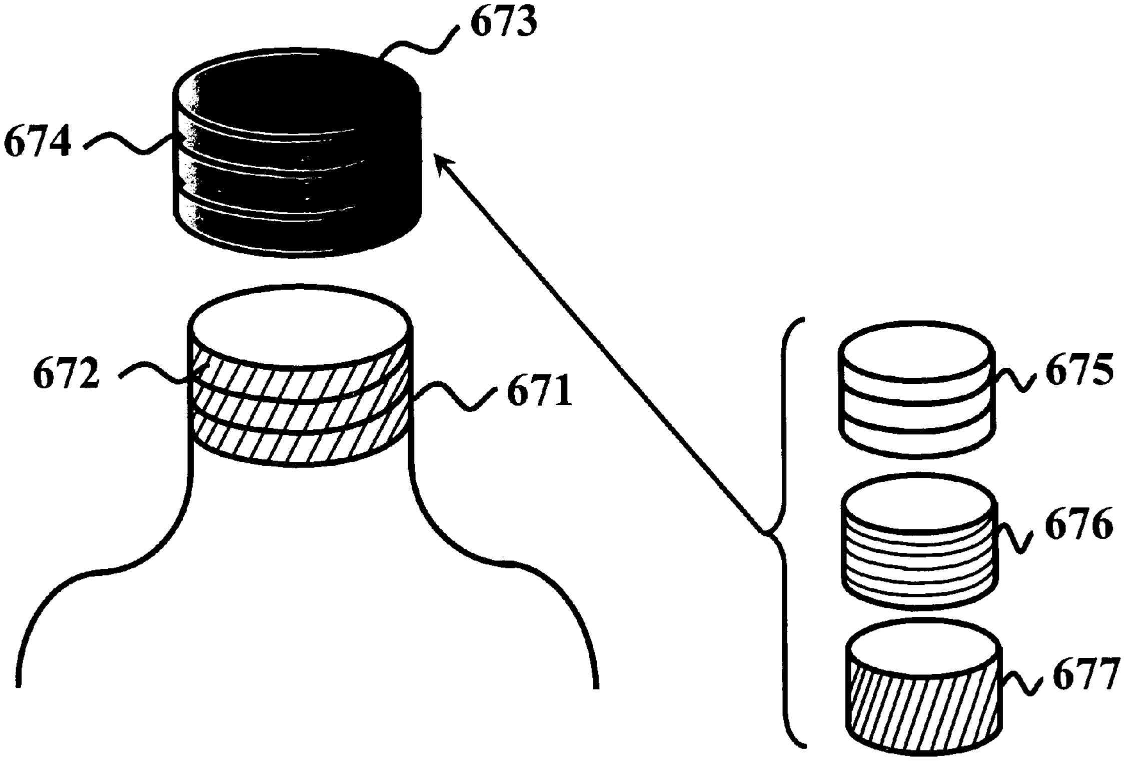
FIG. 67 shows the bottle of a valuable article with the bottle's collar incorporating the base layer and the screw-top the revealing layer, where closing or opening the bottle yields the dynamic superposition image.

Cosmetics, perfumes and drugs are often packaged within small bottles closed by a lid 673 or a screw-top as shown in FIG. 67. The bottle's collar 671 may comprise the base layer 672 and the part of the lid (or screw-top) superposed with the collar of the bottle may comprise the revealing layer 674 or vice-versa. By turning the lid (or screw-top) for closing or opening the bottle, the revealing layer moves on top of the base layer, thereby creating a dynamic superposition image, i.e. moving band moiré shapes or moving shape level lines. The revealing layer lid (or screw-top) may comprise a horizontal grating made of circular lines 675, which, when turning the lid (or screw-top), moves vertically and generates moiré shapes moving along a freely selected orientation. Alternately, one may have revealing line grating ellipses 676 laid out obliquely on the lid (or screw-top), spiral lines, a vertical line grating or a slightly oblique line grating 677. All these revealing layer layouts are capable of producing moving moiré shapes and/or pulsing shapes. Since it is difficult to reproduce exactly the same superposition shapes without knowing the exact parameters of the base layer layout and the revealing layer layout, the specific superposition shapes associated with a given article or article family also offer a means of preventing counterfeits.

Embodiment O

Dynamic Superposition Images Thanks to the Parallax Effect

The creation of a dynamic superposition image thanks to the parallax effect, i.e. by moving the eyes across a revealing layer separated by a small gap from the base layer can be used in any product. In the case of a watch (FIG. 64B), the assembly of base and revealing layers may be placed in the center, between the numbers located on the watch base. In the case of a car, the assembly of base and revealing layer may simply be fixed at a convenient location on the car's body. In the case of cosmetics, that base and revealing layer assembly may be fixed onto the bottle or onto the package. In the case of jewelry, small pieces of the base and revealing layer assembly may be affixed onto a part of the piece of jewelry or onto its bracelet. For publicity purposes, an assembly of base and revealing layer of any desired size may be created: publicity postcards, publicity in shop windows or large-scale street advertisements. When tilting the valuable article, the postcard or respectively walking along the advertisement, the observer's attention will be captured by the dynamic image message, either as a dynamic band moiré image or as dynamic shape level lines moving within the motif shape, thereby creating a pulsing text message (FIG. 64B, with a cosinusoidal revealing layer).

Additional variants of embodiments B to K above may also be created, by having at least one of the layers, preferably the revealing layer embodied by an electronic display (FIG. 52, 522) driven by a computer program (FIG. 52, 521). In such a case, the computer program contains the instructions for creating the base layer and/or the revealing layer according to the methods described in the present disclosure. The corresponding layer may then be imaged on a support, as described in section "Embodiments of base and revealing layers, in respect to band moiré and shape level line images".

Further Advantages of the Present Invention

The advantages of the methods disclosed in the present invention are numerous.

1. The band moiré layout model used in the present invention enables computing the exact layout of a band moiré image generated by the superposition of a base band grating and of a revealing line grating to which known geometric transformations are applied. The band moiré layout model also allows specifying a given revealing line grating layout and computing a base band grating layout yielding, when superposed with the revealing line grating, a desired reference band moiré image layout.

2. The presented method of embedding a shape elevation profile into a base layer by shifting repeated sets of lines by an amount proportional to the current elevation and of revealing the corresponding shape level lines by superposing on top of it a revealing layer line grating offers new means of creating a superposition image. By modifying the relative position of the revealing layer and the base layer (e.g. by a translation), the shape level lines move between foreground shape centers and the shape boundaries and between the background shape centers and the shape boundaries.

3. An unlimited number of geometric transformations being available, a large number of matching base layers and revealing line grating designs can be created according to different criteria. For example, the triplet formed by base layer layout, the revealing line grating layout and the superposition image layout (layout of the band moiré or the shape level lines) may be different for each class of products (watches). The immense number of variations in base layer grating layout, revealing line grating layout and superposition image layout allows creating many variants having each one its specific attractive features.

4. The band moiré layout model also allows predicting how displacing the revealing layer in superposition with the base layer or vice-versa affects the resulting band moiré shapes. Depending on the respective layouts of a pair of base band grating and revealing line grating layers and on the orientation of the base band replication vector t, the following situations may occur when displacing the revealing layer in superposition with the base layer (or vice-versa), or when tilting a composed layer in respect to an observer:

the revealing layer may move in superposition with the base layer without inducing new deformations of the revealed band moiré shapes;

the revealing layer may move in superposition with the base layer only along one predetermined direction without deforming the revealed band moiré shapes; in all other directions, the revealed band moiré shapes are subject to a deformation;

when displacing the revealing layer on top of the base layer, the revealed band moiré shapes are subject to a periodic deformation;

when displacing the revealing layer in superposition with the base layer, the revealed band moiré shapes are subject to a radial displacement and possibly a smooth deformation of their width to height ratio;

when displacing the revealing layer in superposition with the base layer, the revealed band moiré shapes are subject to a tangential displacement in respect to the band moiré image layout, i.e. a circular movement in case of a circular moiré image layout;

when displacing the revealing layer in superposition with the base layer, the revealed band moiré shapes are subject to a spiral displacement in respect to the band moiré image layout, i.e. a curved movement from the center to the exterior or vice-versa.

5. The band moiré layout model also allows to conceive base band grating and revealing line grating layouts, which generate, when displacing the revealing layer in superposition with the base layer, a desired reference dynamic movement of the resulting band moiré image. Example C shows that a straight revealing layer superposed in superposition with a correspondingly computed base layer yields circularly laid out band moiré images. When displacing the rectilinear revealing layer in superposition with the base layer, the moiré image component moves radially toward the exterior or the interior of the circular moiré image layout. Example E shows another example, where rotating the revealing layer in superposition with the base layer, at the coordinate system origin, yields moiré image shapes which move toward the exterior or the interior of the circular and moiré image layout, depending on the rotation direction. Example F and embodiments B, C and D show examples where upon displacement of the revealing layer, i.e. translation in case of a rectilinear revealing layer or rotation in case of a spiral shaped revealing layer, a moiré image moves tangentially to the moiré layout, performing a circular rotation. The same considerations may also lead to moiré components moving tangentially along an ellipse moiré layout (elliptic displacement).

6. A further important advantage of the present invention is that it can be used for placing the base layer (base bands, respectively sets of lines) on any kind of support, including paper, plastic materials, diffractive devices (holograms, kinegrams) etc., which may be opaque, semitransparent or transparent. Because it can be produced using standard original layer creation processes, the present method allows creating a large variety of products.

7. A further advantage lies on the fact that both the base layer and the revealing layer can be automatically generated by a computer. A computer program generating automatically the base and revealing layers needs as input an original desired reference band moiré image, respectively the original shapes from which an elevation shape profile is generated, parameters of the base layer and of the revealing line grating in the original space as well as the geometric transformations and related superposition image and revealing layer layout parameters enabling to create the base layer and the revealing line grating layer in the transformed space. This allows to create products such as watches, which are personalized according to the desire of the client, for example by incorporating his name or a symbol of his choice as a dynamically moving moiré image revealed by the rotation of the revealing layer disk incorporating the second watch hand.

8. A further advantage of revealing the shape level lines of the superposition of a transformed base layer and of a transformed revealing layer, where one of the layers is modified to embed the shape elevation profile, lies in the fact that modifying the relative superposition phase of the revealing layer in respect to the base layer may consist of a non-rigid relative superposition phase transformation of the revealing layer, i.e. a transformation different from a translation and/or a rotation, e.g. a circular line grating traveling outwards. Such a non-rigid relative superposition phase transformation can be performed with a revealing layer embodied by an electronic transmissive display driven by a computer program. Its functionalities, i.e. mainly the geometric transformations and the relative superposition phase transformations are carried out by the driving computer program in order to generate on the display the transformed revealing layer line gratings whose relative superposition phase varies dynamically. In addition, the geometric transformation of the revealing layer may also vary according to time. Such a dynamic functionality is especially interesting for electronic devices such as electronic watches and clocks.

9. In the present invention, the base layer may comprise both a base band grating comprising base band shapes and modified sets of lines embedding a shape elevation profile. Then, either the same or different revealing layer parts may reveal corresponding superposition images, i.e. moving moiré shapes and moving shape level lines. Special embodiments yielding striking visual effects may show at the same time moving moiré shapes of a certain kind (e.g. ornaments) and pulsing shapes of a different kinds (e.g. text). Merging (or blending) different base layer images into a single base layer can be achieved by existing image blending operators, e.g. the ones offered by standard imaging software packages such as Adobe PhotoShop.

9. The present invention is characterized by its visual attractiveness: moving band moiré images or shape level lines of various intensities or colors moving between shape boundaries and shape foreground and background centers create intriguing effects that capture the attention of the observer. This is of primordial importance for valuable articles such as watches, clocks, cosmetics, perfumes, fashion clothes as well as for publicity.

REFERENCES CITED

U.S. Patent Documents

U.S. Pat. No. 5,995,638 (Amidror, Hersch), November 1999. Methods and apparatus for authentication of documents by using the intensity profile of moiré patterns, due assignee EPFL.

U.S. Pat. No. 6,249,588 (Amidror, Hersch), June 2001. Method and apparatus for authentication of documents by using the intensity profile of moiré patterns, due assignee EPFL.

U.S. Pat. No. 6,819,775 (Amidror, Hersch) November 2004, Authentication of documents and valuable articles by using moiré intensity profiles.

U.S. Pat. No. 5,396,559 (McGrew), Mar. 7, 1995. Anti-counterfeiting method and device utilizing holograms and pseudorandom dot patterns.

U.S. Pat. No. 5,708,717 (Alasia), Jan. 13, 1998. Digital anti-counterfeiting software method and apparatus U.S. Pat. No. 5,790,703 (Wang), Aug. 4, 1998, Digital watermarking using conjugate halftone screens U.S. Pat. No. 5,999,280 (Huang), Dec. 7, 1999, Holographic anti-imitation method and device for preventing unauthorized reproduction, U.S. Pat. No. 5,694,229, (Drinkwater, B. W. Holmes), Dec. 2, 1997, Holographic Security Device U.S. Pat. No. 6,494,491, (Zeiter, Lütthi, and Lohwasser), Dec. 17, 2002, Object with an optical effect, U.S. Pat. No. 5,712,731 (Drinkwater et. al.), Jan. 27, 1998, Security device for security documents such as bank notes and credit cards.

U.S. Pat. No. 6,273,473, (Taylor et. al.) Self-verifying security documents, Aug. 14, 2001

U.S. Pat. No. 4,761,253 (Antes), Aug. 2, 1988, Method and apparatus for producing a relief pattern with a microscopic structure, in particular having an optical diffraction effect U.S. Pat. No. 3,321,905 (Krebs), May 30, 1967, Display device.

U.S. Pat. No. 3,890,777 (Stanish), Jun. 24, 1975, Display device

U.S. Pat. No. 4,653,930 (Schmid), Mar. 31, 1987, Timepiece with special aesthetic effects.

U.S. Pat. No. 7,054,038 (Ostromoukhov, Hersch), Method and apparatus for generating digital half-tone images by multi color dithering, filed 4 Jan. 2000, assignee EPFL.

U.S. patent application Ser. No. 10/995,859 (Steenblik, Hurt, Jordan), Micro-optic security and image presentation system, filed Nov. 22, 2004, U.S. patent application Ser. No. 09/810,971 (Huang, Wu), Optical watermark, filed Mar. 16, 2001

Parent Patent Applications:

Parent U.S. patent application Ser. No. 10/270,546, filed 16 Oct. 2002, "Authentication of documents and articles by moiré patterns", inventors Hersch and Chosson.

Parent U.S. patent application Ser. No. 10/879,218, filed 30 Jun. 2004 entitled "Model-based synthesis of band moiré images for authenticating security documents and valuable products", inventors Hersch and Chosson Parent U.S. patent application Ser. No. 11/149,017, filed 10 Jun. 2005, Authentication of secure items by shape level lines, inventors Chosson and Hersch.

Parent U.S. patent application Ser. No. 11/349,992, filed Feb. 9, 2006, entitled "Model-based synthesis of band moiré images for authentication purposes", inventors Hersch and Chosson.

Other Publications

I. Amidror and R. D. Hersch, Fourier-based analysis and synthesis of moirés in the superposition of geometrically transformed periodic structures, Journal of the Optical Society of America A, Vol. 15, 1998; pp. 1100-1113.

I. Amidror, The Theory of the Moiré Phenomenon, Kluwer Academic Publishers, 2000, Chapter 11, Problems 11.4 and 11.5., pp. 370-371.

I. Amidror, R. D. Hersch, Quantitative analysis of multichromatic moiré effects in the superposition of coloured periodic layers, Journal of Modern Optics, Vol. 44, No. 5, 1997, 883-899.

J. W. Harris and H Stocker, Handbook of Mathematics and Computational Science, Springer Verlag, 1998, 319-329.

R. D. Hersch and S. Chosson, Band Moiré Images", SIGGRAPH'2004, ACM Computer Graphics Proceedings, Vol. 23, No. 3, August 2004, pp. 239-248.

J. Huck, Mastering Moirés. Investigating Some of the Fascinating Properties of Interference Patterns, 2003, paper available by contacting the author, see http://pages.sbcglobal.net/joehuck/Pages/kit.html.

A. K. Jain, Fundamentals of Digital Image Processing, Prentice Hall, 1989, sections "Skeleton algorithms" and "thinning algorithms", pp. 382-383 and section "Morphological Processing", pp. 384-389.

J. S. Marsh, Contour Plots using a Moiré Technique, American Journal of Physics, Vol. 48, January 1980, 39-40.

J. F. Moser, Document Protection by Optically Variable Graphics (Kinemagram), in Optical Document Security, Ed. R. L. Van Renesse, Artech House, London, 1998, pp. 247-266.

G Oster, M. Wasserman and C. Zwerling, Theoretical Interpretation of Moiré Patterns. Journal of the Optical Society of America, Vol. 54, No. 2, 1964, 169-175.

K. Patorski, The moiré Fringe Technique, Elsevier 1993, pp. 14-21.

A. Rosenfeld and J. Pfaltz, "Sequential operations in digital picture processing," Journal of the Association for Computing Machinery, vol. 13, No. 4, 1966, pp. 471-494.

R. L. Van Renesse (Ed.), Optical Document Security, 2nd ed. 1998, Artech House, sections section 9.3.1 Parallax Images and section 9.3.2, Embossed Lens Patterns, pp. 207-210.

We claim:

1. A visually attractive article comprising (a) a base layer, (b) a revealing layer and upon superposition of said base layer and revealing layer, (c) a superposition image where the revealing layer comprises a revealing line grating, where the base layer comprises an item selected from the group of base band grating and modified sets of lines, where the base band grating comprises base bands that are repeated along one direction only, said base bands comprising a sequence of specific base band shapes, where said modified sets of lines are obtained by modifying initial sets of lines according to a shape elevation profile generated from a motif shape image, where in the case of a base layer comprising a base band grating, the superposition image comprises a band moiré image comprising moiré shapes which are transformed instances of the base band shapes, the transformation comprising at least an enlargement, and where in the case of a base layer comprising modified sets of lines, the superposition image comprises level lines of said shape elevation profile.

2. The visually attractive article of claim 1, where a relative displacement between the revealing layer and the base layer creates a dynamic evolution of the superposition image, where in the case of a base layer comprising a base band grating, the dynamically evolving superposition image comprises moiré shapes moving along a trajectory and where, in the case of a base layer comprising modified sets of lines, the dynamically evolving superposition image comprises level lines moving between the motif shape boundaries and respectively the motif shape foreground and the motif shape background centers.

3. The visually attractive article of claim 2, said article being selected from the group of dress, skirt, blouse, jacket, shawls and pants where one tissue layer forms the base layer, a second tissue layer forms the revealing layer, and where the relative displacement between base layer and revealing layer is induced by the movements of the person wearing said article.

4. The visually attractive article of claim 2, said article being a device for displaying publicity comprising a mechanical part creating the relative displacement between base layer and revealing layer, which in the case of a base layer comprising a base band grating, yields a moving text message and in the case of a base layer comprising modified sets of lines, yields the level lines moving within the motif shape, thereby creating a pulsing text message.

5. The visually attractive article of claim 2, said article being packed in a bottle having a lid, where the collar of the bottle comprises the base layer, where the part of the lid superposed with the collar of the bottle comprises the revealing layer, where when turning the lid for opening or closing the bottle, the dynamically evolving superposition image appears, yielding in case of a base layer made of a base band grating the moving moiré shapes and yielding in case of a base layer comprising modified sets of lines the level lines moving within the motif shape.

6. The visually attractive article of claim 2, where at least one of the layers is embodied by an electronic display driven by a computer program.

7. The visually attractive article of claim 1 whose base layer comprises a base band grating, where the base layer and the revealing layer are geometrically transformed, where respective layouts of the base band grating, the revealing line grating and the band moird image are related according to a band moiré image layout model, said band moird image layout model enabling to choose the layout of said band moiré image and of the revealing layer and to deduce the layout of the base layer by computation.

8. The visually attractive article of claim 7 where according to said band moire image layout model, the layout of the band moire image is expressed by a geometric transformation M which transforms the band moird image from a transformed space $(x_t,y_1)$ to an original space (x,y), where the layout of the revealing line grating is expressed by a geometric fransfonnation G which transfonus the revealing line grating from the transformed space $(x_t,y_t)$ into the original space (x,y), and where the layout of the base band grating is expressed by a geometric transformation H which transforms the base band grating from the transformed space $(x_t,y_t)$ to the original space (x,y), said transformation H being a function of the transformations M and H.

9. The visually attractive article of claim 8 where transformations M, G, and H are given as $M(x_t,y_t)=(m_1(x_t,y_t, m_2(x_t,y_t))$, $G(x_t,y_t)=( (h_1(x_t,y_t,h_2(x_t,y_t,))$, and where said transformation $H(x_t,y_t)$ is computed according to $$h_1(x_t, y_t) = (g_2(x_t, y_t) - m_2(x_t, y_t)) \cdot \frac{t_x}{T_r} + m_1(x_t, y_t)$$

$$h_2(x_t, y_t) = g_2(x_t, y_t) \cdot \frac{t_y}{T_r} + m_2(x_t, y_t) \cdot \frac{T_r - t_y}{T_r}$$

where $T_r$ is the period of the revealing line grating in the original space and where $(t_x, t_y)$ is the base band replication vector in the original space.

10. The visually attractive article of claim 7, where the revealing layer line grating layout is spiral shaped, where said revealing line grating rotates around its center point, and where its superposition with the transformed base layer, generates dynamically moving moiré shapes.

11. The visually attractive article of claim 10, where the dynamically moving moiré shapes perform movements selected from the group of rotations, circular displacements, elliptic displacements, radial displacements, spiral displacements, straight displacements, and displacements across a fish-eye transformation.

12. The visually attractive article of claim 11, said article being a time piece selected from the group of watches and clocks, and where several moiré shape displacements are synchronized to yield symbols of time selected from the group of gears and of moving shapes which periodically overlap.

13. The time piece of claim 12, where said spiral shaped revealing layer comnrises a second-hand, and where the time piece's second-band rotation mechanism rotates the revealing layer.

14. The visually attractive article of claim 7, where the base band grating and the revealing line grating are separated by a gap and form a fixed composed layer, where, due to the parallax effect, by tilting the composed layer in respect to an observer, successive positions of the base layer are sampled, yielding dynamically moving moiré shapes.

15. The visually attractive article of claim 14, where the movements of the dynamically moving moiré shapes are selected from the group of rotations, circular displacements, elllptic displacements, radial displacements, spiral displacements, straight displacements, and displacements across a fish-eye transformation.

16. The visually attractive article of claim 15, said article being a time piece selected from the group of watches and clocks, and where several moiré shape displacements are synchronized to yield symbols of time selected from the group of gears and of moving shapes which periodically overlap.

17. The visually attractive article of claim 15, said article being selected from the set of cosmetics, perfinnes, drugs, jewelry, bikes, cars, publicity display devices and postcards.

18. The visually attractive article of claim 3, where, due to a large variety of possible geometric transformations, creating counterfeits of the geometrically transformed base layer is difficult and therefore the moiré shape generated by the superposition of said base layer and of the revealing layer offers a means of checking that said visually attractive article is authentic.

19. The visually attractive article of claim 1 whose base layer comprises the modified sets of lines, where the base layer and the revealing layer are geometrically transformed and where modifying the initial sets of lines is performed by (a) locating the position $(x,y)=(h_x(x_t,y_t),h_y(x_t,y_t))$ in the original non-transfonned base lay associated to the current position $(x_t,y_t)$ in the transformed base layer, $h_x$ and $h_y$ expressing the transformation from the transformed base layer space back to the original base layer space, (b) locating the shifted position (x,y-z) within the original base layer according to the current value $z=f(x_t,y_t)$ of said elevation profile at the position $(x_t,y_t)$ of the transformed base layer space, é (c) reading the intensity, respectively color, at position (x,y-z) of the original non-transformed base layer and copying it into the transformed base layer at position $(x_t,y_t)$.

20. The visually attractive article of claim 19, where the revealing layer line grating layout is spiral shaped, where said revealing line grating rotates around its center point, and where its superposition with the transformed base layer generates said level lines moving between the motif shape boundaries and respectively the motif shape foreground and the motif shape background centers.

21. The visually attractive article of claim 20, said article being a time piece selected from the groap of watches and clocks, and where the level line displacements yield dynamically pulsing shapes whose pulsing period provides a symbolic reference to the running time.

22. The time piece of claim 21, where said spiral shaped revealing layer comprises the second-hand of the time piece, and where the second-hand rotation mechanism rotates the revealing layer.

23. The visually attractive article of claim 19, where the base layer and the revealing line grating are separated by a gap and form a fixed composed layer, where, due to the parallax effect, by tilting the composed layer in respect to an observer, successive positions of the base layer are sampled, yielding the level lines moving between the motif shape boundaries and respectively the motif shape foreground and the motif shape background centers.

24. The visually attractive article of claim 23, said article being a time piece selected from the group of watches and clocks, and where the level line displacements yield dynamically pulsing shapes.

25. The visually attractive article of claim 23, said article being a device for displaying publicity, where the level lines moving within the motif shape create a pulsing text message.

26. The visually attractive article of claim 1, where the revealing layer line grating comprises lines selected from the group of continuous lines, dotted lines, interrupted lines and partially perforated lines embodied by an element selected from the set comprising an opaque support with transparent lines, and lenticular lenses.

27. The visually attractive article of claim 1, where the base layer is imaged on an opaque support and the revealing layer on a transparent support.

28. The visually attractive article of claim 1, where the base layer is created by a process for transferring an image onto a support, said process being selected from the set comprising lithographic, photolithographic, photographic, electrophotographic, engraving, etching, perforating, embossing, ink jet and dye sublimation processes.

29. The visually attractive article of claim 1, where the base layer is embodied by an element selected from the set of transparent devices, opaque devices, diffusely reflecting devices, paper, metal, plastic, optically variable devices and diffractive devices.

30. The visually attractive article of claim 1, where the revealing layer is an element selected from the set comprising an opaque support with transparent lines, and Lenticular lenses.

* * * * *